(12) United States Patent  (10) Patent No.: US 8,170,906 B2
Von Schweber et al.  (45) Date of Patent: May 1, 2012

(54) METHOD AND APPARATUS FOR INFORMATION SURVEYING

(76) Inventors: Erick Von Schweber, Foster City, CA (US); Linda Von Schweber, Foster City, CA (US)

(*) Notice: Subject to any disclaimer, the term of this patent is extended or adjusted under 35 U.S.C. 154(b) by 1434 days.

(21) Appl. No.: 10/533,541

(22) PCT Filed: Nov. 14, 2003

(86) PCT No.: PCT/US03/36136
§ 371 (c)(1),
(2), (4) Date: Nov. 18, 2005

(87) PCT Pub. No.: WO2004/046854
PCT Pub. Date: Jun. 3, 2004

(65) Prior Publication Data
US 2006/0122876 A1 Jun. 8, 2006

Related U.S. Application Data

(60) Provisional application No. 60/426,624, filed on Nov. 15, 2002.

(51) Int. Cl.
*G06Q 30/00* (2012.01)
(52) U.S. Cl. .................................................. 705/7.32
(58) Field of Classification Search .................. 705/7.32
See application file for complete search history.

(56) References Cited

U.S. PATENT DOCUMENTS

| 5,452,468 A | 9/1995 | Peterson |
| 5,754,938 A | 5/1998 | Herz et al. |
| 6,591,266 B1* | 7/2003 | Li et al. .................................. 1/1 |
| 2004/0210545 A1* | 10/2004 | Branke et al. .................. 706/45 |
| 2004/0230572 A1* | 11/2004 | Omoigui ........................... 707/3 |

FOREIGN PATENT DOCUMENTS

JP 11184872 A 7/1999

OTHER PUBLICATIONS

Solveig Haugland, Floyd Jones, OpenOffice.org 1.0 Resource Kit, Feb. 2003, Prentice Hall, 789-792.*
Search Report, "International Searching Authority", PCT/US2003/36136, (Dec. 28, 2004), 7 pgs.

* cited by examiner

*Primary Examiner* — Beth V Boswell
*Assistant Examiner* — William Porter
(74) *Attorney, Agent, or Firm* — Blakely Sokoloff Taylor & Zafman LLP

(57) ABSTRACT

A method and apparatus are presented with which to conduct information surveys. Contemporary methods of accessing and exploiting information resources, including search techniques and category browsing, have become less effective and efficient at these tasks due to the growing infoglut and the widening knowledge gap between the content, structure, and navigational paths of information resources on the one hand, and what users know and desire of these on the other. The information survey method and apparatus disclosed herein enables a user to survey information in order to rapidly discover the area of the information resource that is most useful to them, the survey niche, and evaluate the knowledge and information found there.

37 Claims, 27 Drawing Sheets

Enhanced Survey Table

| | Partitions | | | | | |
|---|---|---|---|---|---|---|
| Survey Niche | ☐ | ☑ (U7) | ☐ | ☐ | ☐ | ☐ |
| Predicates | Par 1 | Par 2 | Par 3 | Par 4 | Par 5 | Par 6 |
| Predicate 1 | Y/N | Y/N | Y/N | Y/N | Y/N | Y/N |
| Predicate 2 | Y/N | Y/N | Y/N | Y/N | Y/N | Y/N |
| Predicate 3 | Y/N | Y/N | Y/N | Y/N | Y/N | Y/N |
| Predicate 4 | Y/N | Y/N | Y/N | Y/N | Y/N | Y/N |
| Monitors (U20) | | | | | | |
| # of Entities | Value | Value | Value | Value | Value | Value |
| Survey Monitor 1 | Null/Stats/ abstraction | Null/Stats/ abstraction | Null/Stats/ abstraction | Null/Stats/ abstraction | Null/Stats/ abstraction | Null/Stats/ abstraction |
| Survey Monitor 2 | Null/Stats/ abstraction | Null/Stats/ abstraction | Null/Stats/ abstraction | Null/Stats/ abstraction | Null/Stats/ abstraction | Null/Stats/ abstraction |

| | Entities for Selected Partition (U8) (U21) | | | | | |
|---|---|---|---|---|---|---|
| Survey Niche | ☑ | ☐ | ☐ | ☐ | ☑ | ☐ |
| Predicates | Ent 1 | Ent 2 | Ent 3 | Ent 4 | Ent 5 | Ent 6 |
| Predicate 1 | value | value | value | value | value | value |
| Predicate 2 | value | value | value | value | value | value |
| Predicate 3 | value | value | value | value | value | value |
| Predicate 4 | value | value | value | value | value | value |
| Monitors (U22) | | | | | | |
| Link to Resource | link 1 | link 2 | link 3 | link 4 | link 5 | link 6 |
| Survey Monitor 1 | value | value | value | value | value | value |
| Survey Monitor 2 | value | value | value | value | value | value |

[Modify] (U6)     (U2) [Survey]

Drag and drop columns or rows to reorganize table
Scroll to see more rows or columns (scroll bars not shown)
Check box ☑ at top of column(s) to select Partition(s_ or entities

FIG. 22

Survey Niche Manager

| Survey Niche | Source | Mandatory |
|---|---|---|
| Predicates | | |
| Predicate 1 | U/T | Y/N |
| Predicate 2 | U/T | Y/N |
| Predicate 3 | U/T | Y/N |
| Predicate 4 | U/T | Y/N |
| | | |
| Examples | | |
| Example Entity 1 | U/T | Y/N |
| Example Entity 2 | U/T | Y/N |
| | | |
| Monitors | | |
| Survey Monitor 1 | U/T | Y/N |
| Survey Monitor 2 | U/T | Y/N |
| | | |

- U4 → Survey Niche
- U15 → Source, Mandatory
- U16 → View Ontology
- U17 → Transform this
- U18 → Mandatory
- U19 → Bind
- U13 → Undo
- U14 → OK
- U2 → Survey Source: U=User, T=Transformation
Select a predicate or monitor, then the appropriate button.
To add a predicate or monitor, type it into an empty cell.
To remove a predicate or monitor, delete it from the cell.

FIG. 24

Survey Lattice Tables (U23)

| Survey Niche | Minimal Unsatisfiable Survey Lattice Elements | | | | | |
|---|---|---|---|---|---|---|
| Predicates | Min 1 | Min 2 | Min 3 | Min 4 | Min 5 | Min 6 |
| Predicate 1 | Value/null | Value/null | Value/null | Value/null | Value/null | Value/null |
| Predicate 2 | Value/null | Value/null | Value/null | Value/null | Value/null | Value/null |
| Predicate 3 | Value/null | Value/null | Value/null | Value/null | Value/null | Value/null |
| Predicate 4 | Value/null | Value/null | Value/null | Value/null | Value/null | Value/null |

(U7) (U24)

| | Maximal Satisfiable Survey Lattice Elements | | | | | |
|---|---|---|---|---|---|---|
| Survey Niche | ☑ | ☐ | ☐ | ☐ | ☐ | ☐ |
| Predicates | Max 1 | Max 2 | Max 3 | Max 4 | Max 5 | Max 6 |
| Predicate 1 | Y/N | Y/N | Y/N | Y/N | Y/N | Y/N |
| Predicate 2 | Y/N | Y/N | Y/N | Y/N | Y/N | Y/N |
| Predicate 3 | Y/N | Y/N | Y/N | Y/N | Y/N | Y/N |
| Predicate 4 | Y/N | Y/N | Y/N | Y/N | Y/N | Y/N |

| Monitors | | | | | | |
|---|---|---|---|---|---|---|
| # of Entities | Value | Value | Value | Value | Value | Value |
| Survey Monitor 1 | Null/Stats/ abstraction | Null/Stats/ abstraction | Null/Stats/ abstraction | Null/Stats/ abstraction | Null/Stats/ abstraction | Null/Stats/ abstraction |
| Survey Monitor 2 | Null/Stats/ abstraction | Null/Stats/ abstraction | Null/Stats/ abstraction | Null/Stats/ abstraction | Null/Stats/ abstraction | Null/Stats/ abstraction |

| | Entities for Selected Max | | | | | |
|---|---|---|---|---|---|---|
| Survey Niche | ☐ | ☑ | ☐ | ☑ | ☐ | ☐ |
| Predicates | Ent 1 | Ent 2 | Ent 3 | Ent 4 | Ent 5 | Ent 6 |
| Predicate 1 | value | value | value | value | value | value |
| Predicate 2 | value | value | value | value | value | value |
| Predicate 3 | value | value | value | value | value | value |
| Predicate 4 | value | value | value | value | value | value |

| Monitors | | | | | | |
|---|---|---|---|---|---|---|
| Link to Resource | link 1 | link 2 | link3 | link 4 | link 5 | link 6 |
| Survey Monitor 1 | value | value | value | value | value | value |
| Survey Monitor 2 | value | value | value | value | value | value |

[Modify] (U6)  (U2) [Survey]

Drag and drop columns or rows to reorganize table
Scroll to see more rows or columns (scroll bars not shown)
Check box ☑ at top of column(s) to select Partition(s) or entities

FIG. 25

Sports Car Survey Lattice Tables — U25

| Survey Niche | Minimal Unsatisfiable Survey Lattice Elements | | |
|---|---|---|---|
| Predicates | Min 1 | Min 2 | Min 3 |
| 6 cylinders | 6 cyl | | |
| 8 cylinders | 8 cyl | | 8 cyl |
| Front Wheel Dr | | FWD | FWD |
| Real Wheel Dr | | RWD | |
| Sunroof | | | |

U26

| | Maximal Satisfiable Survey Lattice Elements | | |
|---|---|---|---|
| Survey Niche | ☐ | ☐ | ☑ |
| Predicates | Max 1 | Max 2 | Max 3 |
| 6 cylinders | Y | Y | N |
| 8 cylinders | N | N | Y |
| Front Wheel Dr | Y | N | N |
| Real Wheel Dr | N | Y | Y |
| Sunroof | Y | Y | Y |
| Monitors | | | |
| # of Entities | 2 | 2 | 3 |

U27

| | Entities for Selected Max = Max 3 | | |
|---|---|---|---|
| Survey Niche | ☐ | ☐ | ☐ |
| Predicates | Ent 1 | Ent 2 | Ent 3 |
| 6 cylinders | N | N | N |
| 8 cylinders | Y | Y | Y |
| Front Wheel Dr | N | N | N |
| Real Wheel Dr | Y | Y | Y |
| Sunroof | Y | Y | Y |
| Monitors | | | |
| Link to Resource | link 1 | link 2 | link3 |
| Name | Aston Martin | Jaquar | Lexus |
| Primary Key | 63225 | 89725 | 42895 |

[Modify] — U6     U2 — [Survey]

Drag and drop columns or rows to reorganize table
Scroll to see more rows or columns (scroll bars not shown)
Check box ☑ at top of column(s) to select Partition(s) or entities

METHOD AND APPARATUS FOR INFORMATION SURVEYING

CROSS-REFERENCES TO RELATED APPLICATIONS

The present patent application is a national phase application of International Application No. PCT/US2003/036136 filed Nov. 14, 2003, which claims priority from Provisional Application No. 60/426,624 filed Nov. 15, 2002.

FIELD OF THE INVENTION

The present invention relates generally to the field of accessing and exploiting information resources and, more particularly, to method and system to survey information.

BACKGROUND

Infoglut is a present and growing concern, affecting not only the computer industry but also most nearly all industries and areas of society.

First observed in 1995, Infoglut is a product of increasing information volume, volatility, complexity, opacity, and overload. One need only look to the rapid rise of the web for evidence of increasing volume. What is not as blatantly obvious is the rapid rate of change in information resources, where information can, and does, come and go in the blink of an eye. Deepening infoglut still further is the nature of information being retained, as it is becoming more complex with multiple relationships, dependencies, and object interactions, no longer simply independent, structured records. Furthermore, less and less information is visible "on the surface" as more and more information is buried deeper within complex structures and challenging access paths, and this is only getting worse as the volume of information grows, much as the surface/volume ratio of a sphere decreases as the sphere grows larger.

All this would be a boon, not a glut, were it not for information overload. Unfortunately, humans are not naturally equipped to handle this rising volume, volatility, complexity, and opacity, and information systems have not managed to keep up with these exponential curves of infoglut. The cost of the overload is significant. In 2000, IDC estimated the annual cost of infoglut, just to US Fortune 500 corporations, at $12 billion. Delphi Group, in 2002, determined that the typical knowledge worker looses 1 hour/day due to infoglut, and by knowledge worker Delphi includes not only managers but also those in sales and marketing, research and development, financial workers, and professionals, such as in law and health care. Lest one think the cost is confined to the office, 27% of lost sales, according to Delphi Group, are attributable to consumers being unable to find what they wish to purchase, a cost both to consumer and producer. Infoglut is significant.

The core problem with infoglut, then, is not so much the increase on all fronts described above, but rather our inability to deal with these increases. This is the knowledge gap: the gap between information and what the user knows about that information. On one side of the knowledge gap is the user's knowledge and desires, on the other side is information content, structure, and traversal paths. The knowledge gap prevents users from effectively and efficiently exploiting information resources and similarly prevents information resources from exposing themselves in a manner that they can be exploited The knowledge gap increases the pain of infoglut and the infoglut widens the knowledge gap—as information grows in volume, complexity, etc., the user knows less and less about what is there, increasing the gap and therefore making infoglut that much more costly and pernicious.

Any problem so significant does not go unaddressed for very long. Two advanced technologies have been lobbed at infoglut, namely search and category browsing. The goal of search is to reduce the volume of information the user needs to handle through a process of filtering, with the user of search providing the filter. Category browsing and categorization, on the other hand, reduces the volume of information by abstraction, replacing a volume of detailed information with a category, repeating this process for all relevant information, and then organizing the resulting categories into a structure that can stand-in for the entire body of information.

For a time, search and categorization helped reduce the knowledge gap, and in turn infoglut, by reducing the volume, complexity, and opacity. But the underlying information resources did not stand still—infoglut continued to drive them bigger, made them more complex, made them change faster. The result: search results and category systems have become their own infoglut.

Search produces too many results, with web searches routinely returning hundreds, thousands, often millions of hits. Even when the user can manage to filter the results down to manageable size, they often contain too many irrelevant results, and totally wrong results, that waste time.

Categorization has not faired better, with category systems and taxonomies having from tens of thousands to millions of categories that the user may wade through without help. Users are unable to navigate these immense category hierarchies, there are too many paths through them, organizational structures of categories that make sense to their creator often seem misleading to users who frequently run into dead ends and may backtrack, another time and effort sink.

Where before there was a knowledge gap between the user and an information resource, now there is also a growing knowledge gap between the user and search results and systems of categories, as these technologies have become information resources in their own right and part of the growing infoglut.

SUMMARY OF THE INVENTION

According to the invention there is provided a method that includes transforming a survey niche using a computing system to produce a transformed survey niche; and identifying at least one characterized partition of entities in the transformed survey niche, using the computing system.

Further in accordance with the invention, there is provided a method to generate a survey lattice as a specialization of a predicate lattice Further in accordance with the invention, there is provided a method to form a predicate lattice, the method including identifying one or more facts for the satisfiability of each predicate; grouping the one or more facts by point of evidence to generate one or more groups of facts; sorting the one or more groups of facts by the number of predicates satisfied; rejecting duplicate groups of facts from the one or more groups of facts; and using group containment of the one or more groups of facts as a partial order of the lattice.

Still further in accordance with the invention, there is provided a method to represent predicate lattice elements, the method including putting predicates which are atoms of a predicate lattice into a strict order, using a computing system; and associating a predicate lattice element with a predicate in the strict order using the computing system, where the associated predicate lattice element contains the predicate.

According to one aspect of the invention, there is provided a method to augment an index by associating a predicate lattice element with an index entry, where the predicate lattice element contains the index entry.

According to a further aspect of the invention, there is provided a method to augment a conceptual structure by associating a predicate lattice element with a component of a conceptual structure, where the predicate lattice element contains the component of the conceptual structure.

According to a further aspect of the invention, there is provided a method to augment a category system by associating a predicate lattice element with a category of a category system, where the predicate lattice element contains the category of the category system.

According to a further aspect of the invention, there is provided a method to augment a database system by associating a predicate lattice element with an attribute of a database system, where the predicate lattice element contains the attribute of the database system.

The invention extends to a data structure wherein survey lattice elements are based on a source from a group of sources including an index, a conceptual structure, a database, and a category system.

The invention further extends to a system of an information structure augmented with a predicate lattice element, wherein the information structure belongs to a group including an index, a conceptual structure, a database, and a category system.

The invention still further extends to a system to conduct an information survey, the system including an information resource manager to identify a plurality of information entities, the plurality of information entities being associated with the survey niche; a survey niche manager to manage at least one generation of a survey niche; a partition manager to identify at least one characterized partition associated with the survey niche; and a transformation manager to manage transformation of the survey niche.

The invention still further extends to a user interface to enable a user to survey an information resource, the user interface including a means for capturing user input to initialize a survey niche; and a displaying means for presenting a plurality of characterized partitions to the user.

Other features of the present invention will be apparent from the accompanying drawings and from the detailed description, which follows.

BRIEF DESCRIPTION OF THE DRAWINGS

The present invention is illustrated by way of example and not limitation in the figures of the accompanying drawings and in which:

FIG. 22 is a diagrammatic representation of enhanced user interface, according to one embodiment of the present invention.

FIG. 24 is a diagrammatic representation of an interface for a survey niche manager, according to one embodiment of the present invention.

FIG. 25 is a diagrammatic representation of an interface for survey lattice tables, according to one embodiment of the present invention.

FIG. 27 is a diagrammatic representation a survey lattice table for the sports car example, according to one embodiment of the present invention.

DETAILED DESCRIPTION

Surveying Applied to Information

Figure 1:
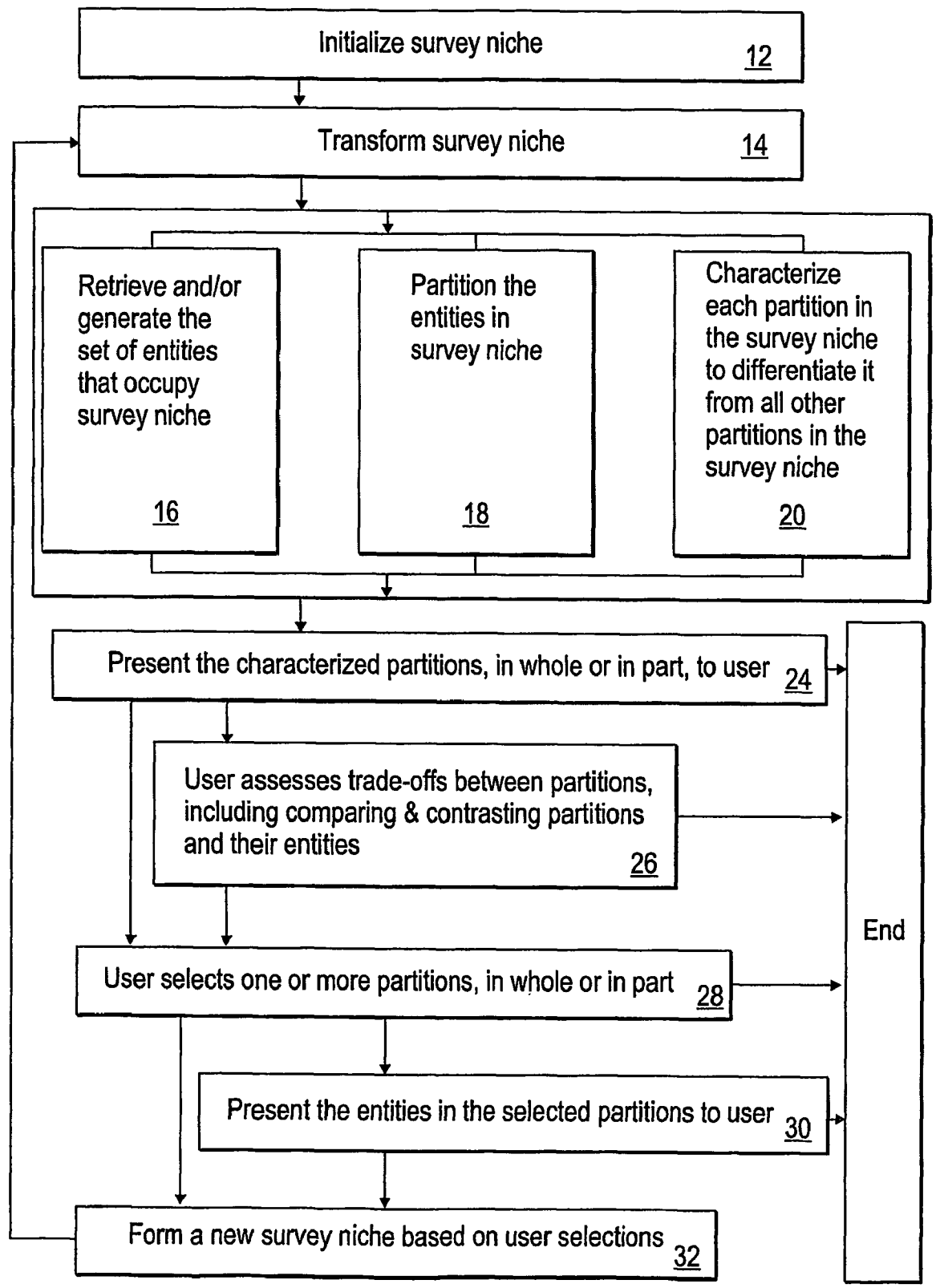
FIG. 1 is a schematic representation of a system according to one embodiment of the present invention for information surveying.

There is a need for a system that acknowledges and accepts infoglut and empowers users to deal with it in a way that reduces rather than increases the knowledge gap without producing more infoglut itself. To that end we investigate the tradition of surveying, which has long collected and analyzed masses of data, and apply it to information.

In many fields of human endeavor there has been the need to understand a resource in order to support exploitation of that resource. Energy resources are a prototypical example, as in oil and gas exploration. Land is another resource that may be understood before it can be exploited, i.e., built on. It is not surprising that to accomplish such understanding we have satellite and GPS Surveyors, Oil Exploration Surveyors, Land Surveyors and surveys, and even The Mars Global Surveyor. One can also consider public opinion polls, i.e., surveys, as a means to understand in order to exploit markets.

Surveying is more intentioned, formal, controlled, detailed, and complete than either searching or browsing. A search is often tightly focused on a small area and ignores the surrounding areas. Browsing is like casually walking about, generally on paths provided by others, depending on serendipity to find things of interest. In contrast, a surveyor overlooks and surveys the surrounding country with a scrutinizing eye, noting not only features and their details but also the relationship between features.

Introducing Information Surveying

A method and system to survey information, according to an exemplary embodiment of the present invention, are described below. In the following description, for purposes of explanation, numerous specific details are set forth in order to provide a thorough understanding of the present invention. It will be evident, however, to one skilled in the art that the present invention may be practiced without these specific details.

It is into the above-described tradition that we introduce a new concept in information technology, adding to the arsenal that already includes searching and browsing. This new technology may conveniently be called information surveying, and a system to accomplish such, an information surveyor.

Just as traditional surveying has been used to make vast uncharted and unseen regions and resources graspable and exploitable, be they oil reserves, mineral deposits, sea floors, planetary internal structures, and even markets, information surveying is used to target, understand, and exploit areas of interest in information resources.

An information survey, according to an exemplary embodiment of the present invention and like a traditional survey, may seek to characterize not only the surface but also the sub-surface in order to narrow down the number of drilling targets, identify potential traps, and identify what is missing. Like all surveys, it may contain a short descriptive summary as well as a detailed critical inspection that will compare and contrast various features. The net result is that an information survey seeks to support consolidation, differentiation, evaluation, selection, and variation of many, even millions of results at once.

An information survey can, however, be applied to search results and can utilize the taxonomies inherent in category browsing systems, making it a powerful addition to traditional search and browsing systems.

Search and browsing support only retrieval of information but information surveying may optionally also be used to support insert, delete, and update operations and/or data definition operations on an information resource.

All information resources can be surveyed including but not limited to: products, services, people, Web pages, documents, media databases, data warehouses, software objects and components, XML files, and even Web Services.

To effectively address the knowledge gap, information surveying may attempt to adapt an information resource to the user and adapt the user to the information resource. To this end it may seek to adapt to the user's current knowledge and desires and teach the user what they need to know as they survey. Information surveying may exploit the user's capacity for critical analysis and judgment and may require only natural interaction—explicit weights, priorities, premature choices, knowledge of dead-ends, and formulation of Booleans and queries are generally not required of the user.

Methodology of Information Surveys

We now present and then discuss an exemplary general method of conducting an information survey.

Terminology

The term user refers to a single user of an information system or a plurality of users, where a user may be a human, a machine, device, or system, or a suitably trained non-human life form.

By information resource we mean any single or plurality of systems capable of providing information to a user, be that provision in response to a request or a "push" of information to a user. Sample information resources are listed in Appendix I.

The term entity refers to any object of information accessible via an information resource, for example, a relational database tuple, a software component, a product, a web page, or a paragraph, sentence, or phase of a file. The entity needn't be stored but may have a virtual existence until manifested by a request, by processing, by communication, by interaction, etc. Examples of such include an entity that can be inferred based on facts and rules in a rule based system or produced by an artificial neural network when provided with suitable input.

By predicate we mean any functionally equivalent representation of a property, trait, attribute, characteristic, relationship, measurement, constraint, action, semantic property, coding sequence, etc., fuzzy or non-fuzzy, explicit or implied, expressed or latent.

A survey niche represents one or more identifiable portions, areas, or regions of an information resource that is being surveyed.

A partition refers to a grouping of entities that reside within the survey niche.

A characterized partition is characterized in such a way so as to differentiate it from other partitions in the survey niche.

Fully informed refers to the characterization of partitions that differentiate (fully or partially) each partition in the survey niche from others.

Transformation modifies the survey niche by any of a number of transformation techniques, for example to bring it into better alignment with an information resource and the user's desires.

The General Survey Method

Referring to FIG. 1, a survey niche is initialized at operation 12 when the survey is begun. A survey niche represents one or more identifiable portions, areas or regions of an information resource that is being surveyed. Initialization may be effectuated directly by a set of predicates or their functional equivalents, or indirectly through example entities. The initialized niche is a starting point that will undergo change and transformation over the course of the survey. It is not a hard and fast constraint, as is a query filter, and it needn't be right on target to begin with. Initialization may also be accomplished by identifying an existing survey niche.

At operation 14, the survey niche undergoes transformation in order to better address the knowledge gap. Transformation may bring the niche, initialized by the user, into alignment with an information resource, exploiting the knowledge possessed by the resource but not the user. Transformation may expand, contract, shift or otherwise modify the survey niche. Transformation may be conducted to accomplish specific ends or implement specified policies, e.g., to achieve or facilitate specific partitioning and characterization goals. Means for transformation include but are not limited to the interaction of users, the application of functions and processes, and/or the application of information. At operation 16, the entities that occupy the survey niche are retrieved.

At operation 18, the survey niche of entities is partitioned. Partitioning may be strict, where an entity may only belong to a single partition, or it may be soft, where partitions overlap. The end result is to abstract over what may be numerous individual entities and to produce less numerous partitions.

Partitions may, however, be regarded as being a broader identification of entities than what is commonly understood to be a "category". Consider for example that labeled categories may presuppose an understanding of and agreement with what the category label means, and such understanding cannot be assumed due to the knowledge gap. Certain "categories" cannot be unambiguously compared and analyzed for the same reason.

At operation 20, each partition is characterized by predicates, which may represent attributes shared by entities within the partition, or represent relationships, properties, characteristics, etc. All the partitions within the survey niche are so characterized—the complete characterization of each partition serves to differentiate it from all other partitions in the niche. Each partition may accordingly, in the exemplary embodiment, be thought of as a complex neologism, e.g., a composition of predicates composed on the fly. Just as the word teapot is the composition of the words tea and pot, a survey partition can be the composition of predicates such as "red 1997 corvette sunroof rear_wheel_drive". Partitions may also be characterized in ways not unique to a single partition, i.e., non-differentiating. We call such characteristics survey monitors. The value of a survey monitor may not be shared by all entities within a partition, in which case the survey monitor for such a partition would be a statistic, such as a mean, median, mode, or standard deviation of the monitor across all the entities in the partition. The principle role of a survey monitor is to provide a user with additional information on a partition and its entities for aspects the user wishes to be aware of but does not wish to constrain.

Partitions, and optionally the entities within each, are then presented to the user at operation 24. At operation 26, the user may compare and contrast partitions by their unique characterizations as well as by the entities present within them. They may observe the trade-offs that would occur were they to select one partition of entities over another. Functionally, this is similar to a well-designed features table that enables products, cars or computers, for example, to be compared and contrasted. But while a features table compares individual entities, the survey compares partitions of entities, providing the abstraction needed to handle the large numbers of entities within the information resources.

At operation 28, the fully informed user is enabled to apply their capacity for critical judgment in selecting one or more partitions, in whole or in part, either as the end product of the survey, or for further development of the survey. The entities are presented to the user at operation 30.

Should the user decide to continue, the survey method proceeds by reforming a new survey niche based on the partitions selected by the user at operation 32. This new niche may then be transformed at operation 14 in order to expand, contract, and/or shift the niche, and the operations 16 through 30 may then be repeated. Operations 14 through 32 may be repeated an arbitrary number of times.

Comparing Information Surveying with Searching and Browsing for Information

Compared with searching and browsing, an information survey, in one exemplary embodiment, may not require the user to navigate a structure, pose a query, or to know how to express a constraint. In fact, the user needn't have anything but a vague idea of what they want, only enough to get the survey started.

Search, by comparison, typically requires each user to know what they are looking for in advance of finding it, a requirement rarely met due to the knowledge gap. All too often, search systems return dozens to millions of items and present these one by one to the user, providing no additional assistance in selecting amongst those items. Search then requires users to reformulate queries—a skill most users lack.

Category systems portray a resource in a fixed form, rigidly defined by an unknown $3^{rd}$ party according to principles not necessarily shared with the user, and often constitute 10,000 to a million nodes, an immense infoglut in themselves. Category systems and taxonomies provide only limited informing by offering paths but do not help the user understand how the paths or their destinations differ, with the consequence that users of such systems often run into dead ends or find themselves lost, and in either case must backtrack.

According to one exemplary embodiment of the present convention, an information survey groups the entities in a region of the information resource, the survey niche, into partitions according similarities and differences and presents them to the user. Thus informed, the user is able to appreciate how the characteristics of each partition are different from every other partition. The user then chooses those partitions that have characteristics they find desirable and uses the survey to continue to differentiate them. All the information survey user may be required to do is make decisions, decisions that are fully informed by the survey.

Surveying seeks not only to find and characterize resources but also to aid the user in where to look for those resources to begin with, something neither searching nor browsing even attempt to do. The survey user need not have previous knowledge of the resource, either physically (as in what is near what) or conceptually (as in what is related to what). Surveying specifically assists the user in identifying the most useful and appropriate niche of an information resource to survey, in addition to revealing the most useful information on the entities within that niche.

Therefore, information surveys can be used to characterize and understand the similarities and differences amongst many entities, taking them beyond search systems that only retrieve entities. Furthermore, the survey method may assume there will be many entities, and uses abstraction to enable the user to handle the infoglut rather than become overloaded by it. But unlike category systems, the abstraction is based on a characterization initialized and steered by the user and uniquely suited to the information resource. A survey may partition millions of entities into ten to a thousand partitions, for instance, which contain those millions of entities and shows how they are related and how they differ, and therefore how well targeted they are to the user's needs. A user may confidently discard millions of entities by simply not selecting a given partition and continue to differentiate millions by selecting the partitions in which they arise.

The survey method is particularly suited to networks where communication and bandwidth are sporadic, bursty, unreliable, and generally intermittent and non-continuous. Wireless networks are one example where the survey method presents physical advantages over searching and browsing. Even for networks with continuous availability, the survey method can reduce network utilization, compared with search and browse. This is due to the fact that search and browsing, when conducted over a network of any type, are extremely chatty means of seeking and navigating information, requiring many sequential round trips to the information resource under study. The survey method, by comparison, may utilize far fewer round trips, where each round trip performs many operations in parallel, potentially anticipating the user's needs by including operations the user would never even conceive of, due to the knowledge gap.

Varieties of the Survey Methodology

The method of information surveying can be implemented in a great many ways. In one exemplary embodiment, there are three choices that determine the kind of implementation: what the survey niche represents and how it is represented; how characterized partitions are formed; and how transformation and reformation of the survey niche is accomplished.

While there are a multitude of ways each of these choices can be made, and many more combinations of these ways, for illustrative purposes we now examine several exemplary "themes" of the survey methodology. These themes introduce ways of making these choices, which can be combined ad infinitum in implementation of the survey method.

Surveying with an Evolutionary Theme

Evolutionary computing (EC) may, by way of analogy, be regarded as applying the principles of biology's "origin of species by natural selection" to evolution of computational entities. EC includes genetic algorithms and interactive genetic algorithms, Alife, artificial evolution, evolutionary programming, and evolutionary strategies.

With EC, a number of computational entities are supplied, each with a machine-readable representation from which it can be generated. This representation may be thought of as the entity's "genome". The entities may be caused to "mate" whereby they exchange genetic material in a process called crossover. The new genomes that result may also undergo transformation via a mutation process that can add genetic material to a genome, remove material, or modify material. A new generation of entities is spawned from these new genomes. This new generation of entities may then undergo a selection process—the computational equivalent of competing for survival. In standard EC, the selection may be performed by an algorithm implementing a fitness function, which assigns a fitness value to each new entity, and those entities with a sufficiently high fitness value are selected to mate in the next generation. In interactive EC, such as artificial evolution and interactive genetic algorithms, the selection may be performed by a user who decides which new entities will go on to mate to create a new generation, and which will die without passing on their genetic material.

Implementing the survey method in an EC context means that a survey niche represents traits of entities and/or genetic coding sequences that a user has interest in surveying (traits and coding sequences may also be specified indirectly by having a user indicate example entities of interest and having the survey system find and use the traits and/or coding sequences of those entities). Transformation of the survey niche may be accomplished by applying crossover and mutation operators (but note: EC only employs random crossover and mutation operators, but when applied to the survey method crossover and mutation may be random, non-random, or partly random). Partitioning may be accomplished by segregating entities by their species or other segmentation basis, e.g., clustering. Partitions may then be characterized by traits and/or coding sequences, enabling them to be compared, contrasted, traded-off, and selected. Lastly, when a new generation of entities is to be generated, crossover operator(s) may be employed to take selected partitions (selected by a user, a fitness function, or by other means) and form a new niche that contains them but excludes partitions not selected. The process may then be iterated for an arbitrary number of generations.

Figure 2:
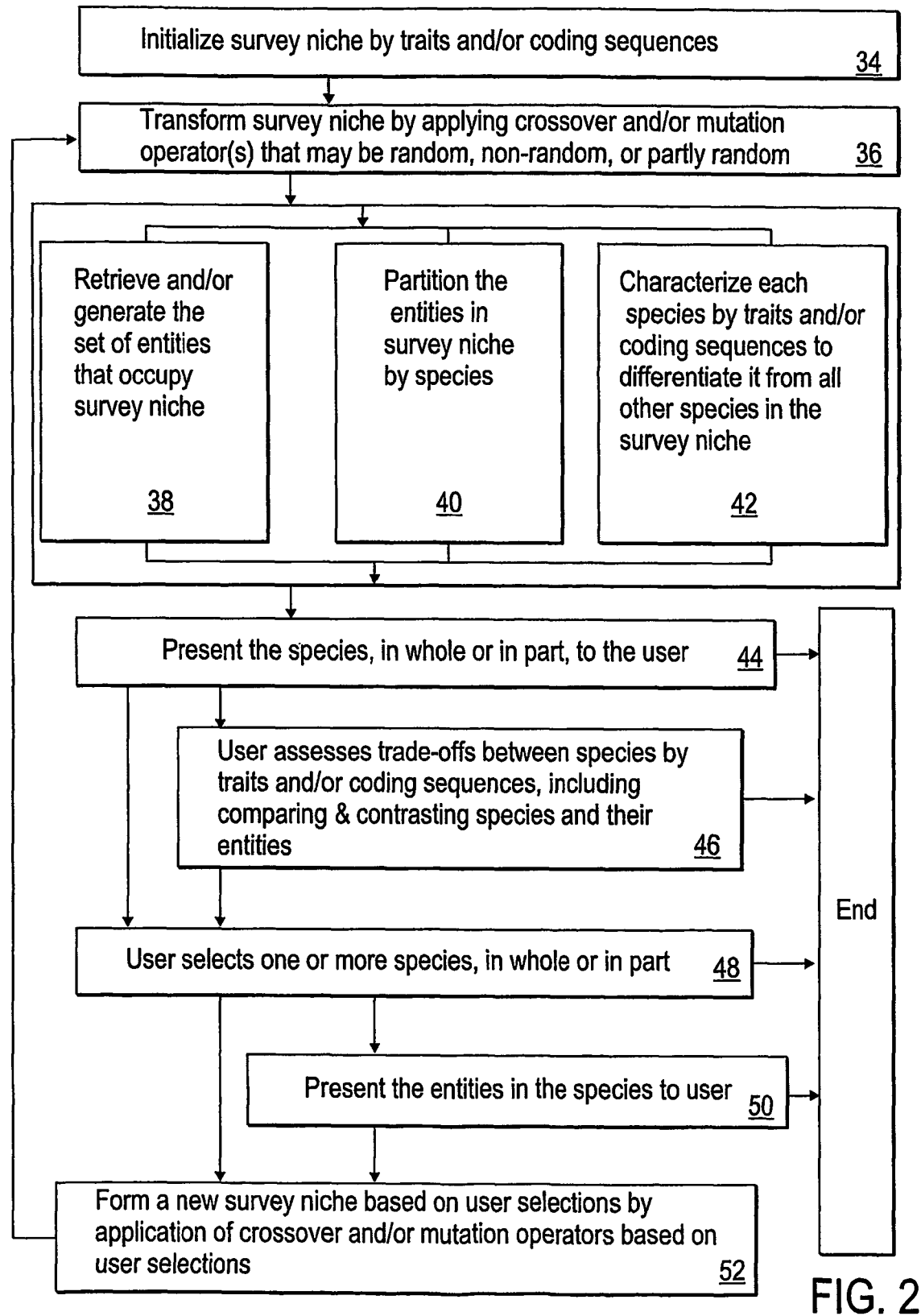
FIG. 2 is a schematic representation of a system according to one embodiment of the present invention for information surveying with an evolutionary theme.

An exemplary implementation of the general survey method within the context of the evolutionary computing theme may be illustrated with reference to FIG. 2. A survey niche is initialized at operation 34. The exemplary survey niche represents traits of entities and/or coding sequences that a user has interest in surveying (traits and coding sequences may also be specified indirectly by having a user indicate example entities of interest and having the survey system find and use the traits and/or coding sequences of those entities). At operation 36, the survey niche is transformed by applying crossover and/or mutation operator(s) that may be random, non-random, or partly random. Entities that occupy the niche are retrieved at operation 38. At operation 40, the survey niche of entities is partitioned. Partitioning can be accomplished by segregating entities by their species or other segmentation basis, e.g., clustering, at operation 40. At operation 42, the species are characterized by traits and/or coding sequences to differentiate them from each other. Partitions, and optionally the entities within each partition, are then presented to the user at operation 44. At operation 46, the user may assess tradeoffs between species by comparing and contrasting the species and their entities. At operation 48, the user may select one or more species. At operation 50, the entities of the species are presented to the user. Should the user decide to continue, the survey method may reform the survey niche, its species, and its entities by application of crossover and/or mutation operators based on user selections, at operation 52, and iterate.

Surveying with a Semantic/Conceptual Theme

Artificial intelligence, knowledge representation, natural language processing, cognitive science, connectionism, database management, and related fields have generated a plethora of means to capture and represent semantic information, i.e., information that has clearly, unambiguously defined meaning. While the number of representational formalisms for semantic information is too vast to review here, for the most part they all revolve around a central notion—a concept. A concept simultaneously defines a collection of related existents (e.g., entities, attributes, relationships, properties, aggregates, etc.), called the concept's extent or extension, and a set of traits shared by these existents, called the concept's intent or intention. Most semantic systems then relate concepts by a conceptual structure, examples of which include semantic networks, frame systems, rules bases, topic maps, conceptual graphs, etc. Even database management systems and software design systems carry semantic information, although typically of a more limited nature, as schema information, models, and metadata, which can be employed in this survey theme. Furthermore, many such systems offer means to support concept formation, employing lexical, semantic, and/or statistical techniques to accomplish such.

Figure 3:
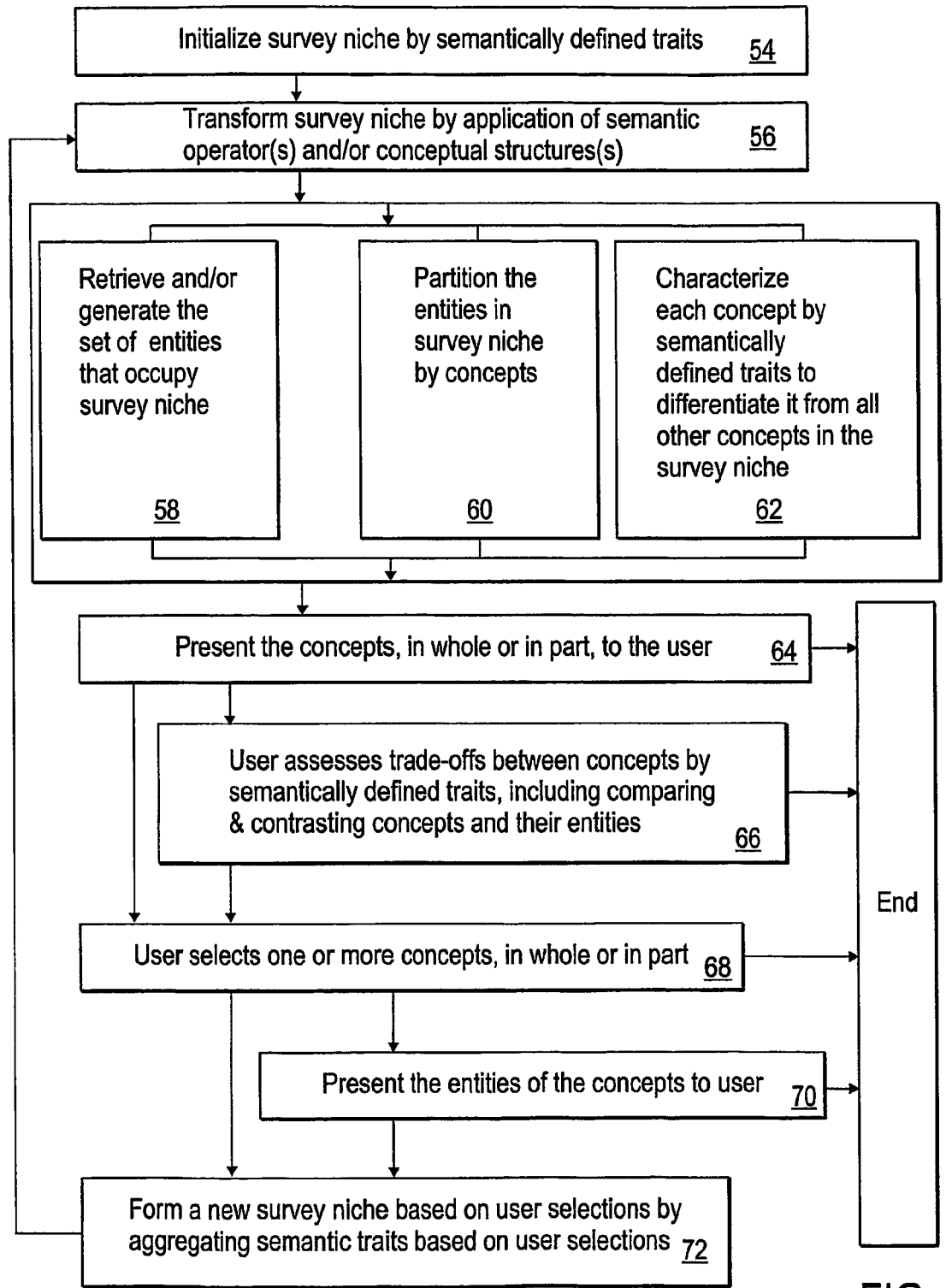
FIG. 3 is a schematic representation of a system according to one embodiment of the present invention for information surveying with a semantic/conceptual theme.

With reference to FIG. 3, an exemplary implementation of the general survey method in the context of the semantic/conceptual theme yields a method to conduct a semantic/conceptual information survey. A survey niche of an information resource is initialized at operation 54. For the purpose of realizing the survey method in a semantic/conceptual context, a survey niche captures semantic traits, e.g., attributes, characteristics, relationships, properties, actions, and aggregates that a user wishes to survey. There are numerous means by which such traits are represented across the gamut of semantic systems, including predicates and their functional equivalents.

The survey niche is transformed by applying semantic operator(s) and/or conceptual structure(s) at operation 56. In one exemplary embodiment, the traits of the niche can be generalized (e.g., an SUV is generalized as a truck), specialized (e.g., a truck is specialized as a pickup), analyzed into component parts (e.g., a drive train analyzed into engine, transmission, drive shaft, etc.), assembled with other traits into aggregates, modified by application of a relationship (e.g., a wheel is replaced or supplemented by that which surrounds it, e.g., a tire). These semantic operators may be combined singularly and in plural. They may also be applied deterministically or non-deterministically, e.g., as in evolutionary computing, or partly non-deterministically.

Concepts are formed at operations 58-62 and employed as survey partitions, as they provide a natural and direct means to partition entities, by concept extent, and characterize each partition, and therefore the entities within, by concept intent. Even databases and software design systems, with their more limited semantics, provide rudimentary concepts: database tables (e.g., relations) possess an extent, their tuples, and an intent, their schema; software objects include subtypes and instances as extent and their class definition, including their supertypes, and methods, as intent.

At operation 64 the concepts are presented to the user in whole or in part. At operations 66 and 68, the user is enabled to compare, contrast, and conduct tradeoff analyses of the concepts and their entities by semantically defined traits, and select one or more of the concepts. The entities of the concepts are presented to the user at operation 70. A new survey niche may be formed by aggregating the semantic traits of all selected concepts at operation 72. The process may then be iterated for any number of generations.

Surveying with a Topological Theme

In this theme we focus on the mathematical notions of nearness and connectedness to realize the survey method. Specifically we employ the mathematical structure of a lattice to drive partitioning and characterization of resulting partitions. This is detailed in the section below, "Partitioning by Lattice". In that section we generalize an existing notion to produce a predicate lattice and introduce a survey lattice. For the topological theme we choose predicates, or their functional equivalents, as a theme-neutral form with which to represent the survey niche, and transformation can be accomplished by any means, such as the crossover and mutation operators of evolutionary computing and/or the semantic operators of the semantic/conceptual theme.

Figure 4:
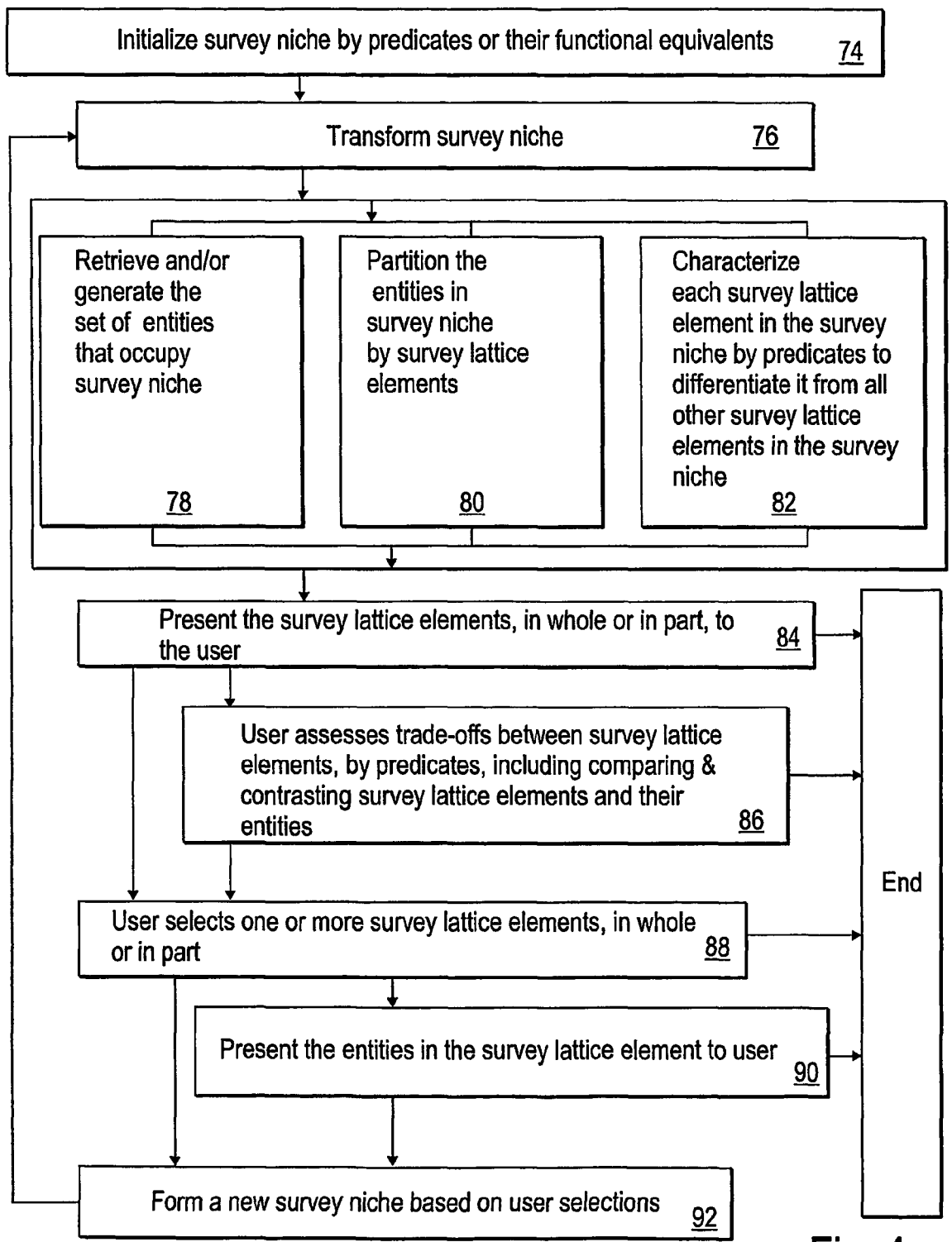
FIG. 4 is a schematic representation of a system according to one embodiment of the present invention for information surveying with a topological theme.

Referring to FIG. 4, an exemplary implementation of the general survey method within the context of the topological theme yields a method to conduct a topological information survey by initializing a survey niche of an information resource at operation 74 by predicates or their functional equivalents, transforming the survey niche at operation 76, and forming and presenting survey lattice elements belonging to said niche at operations 78-82. The user is enabled to compare, contrast, and conduct tradeoff analyses of elements of the lattice and their entities by predicates at operation 84 and 86, select one or more of the elements at operation 88, present the entities of the elements at operation 90, and reform said survey niche, its survey lattice, and its entities at operation 92, based on user selections. The process may then be iterated for a number of generations.

Combining Survey Themes

As noted previously, the way the three exemplary choices are made within each theme can be combined in numerous ways in implementing the survey methodology.

Figure 5:
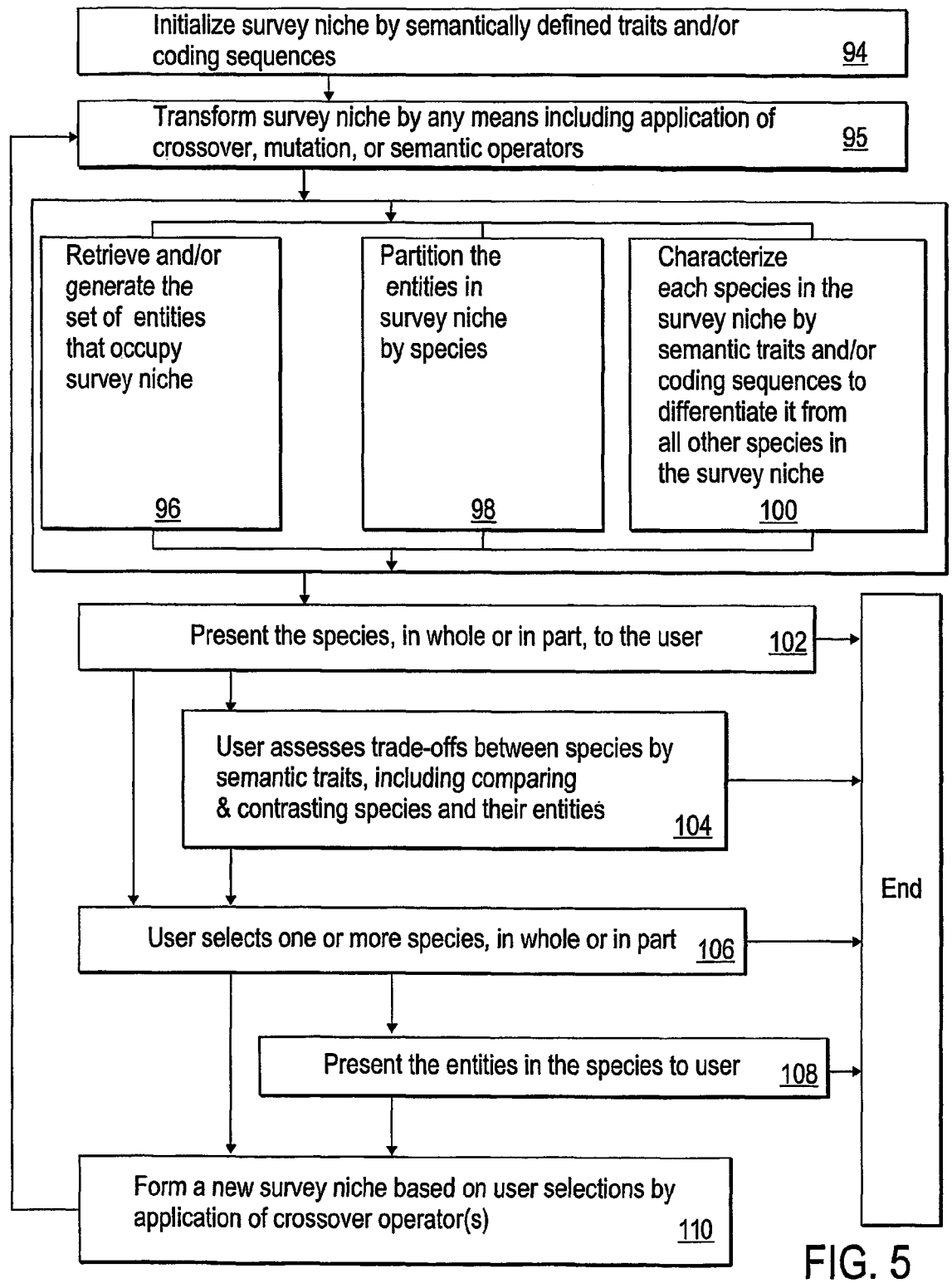
FIG. 5 is a schematic representation of a system according to one embodiment of the present invention for information surveying with a combined semantic/conceptual and evolutionary theme.

Referring to FIG. 5, an exemplary implementation of the general survey method within the context of a combined semantic/conceptual and evolutionary computing theme yields a method to conduct a semantic/conceptual and evolutionary information survey by initializing a survey niche of an information resource at operation 94 by semantically defined traits and/or coding sequences and transforming said survey niche at operation 95 by any means including application of crossover operator(s), mutation operator(s), or semantic operator(s), forming and presenting species of entities belonging to said niche at operations 96-100. The species are presented to the user at operation 102. At operations 104-106 the user may compare, contrast, and conduct tradeoff analyses of said species and their entities by semantic traits and/or coding sequences, and select one or more said species, in whole or in part. At operation 108, the entities of the species are presented to the user. The survey niche, its species, and its entities may be reformed at operation 110 by, e.g., application of crossover operators, based on user selections. The process may then be iterated for any number of generations.

Figure 6:
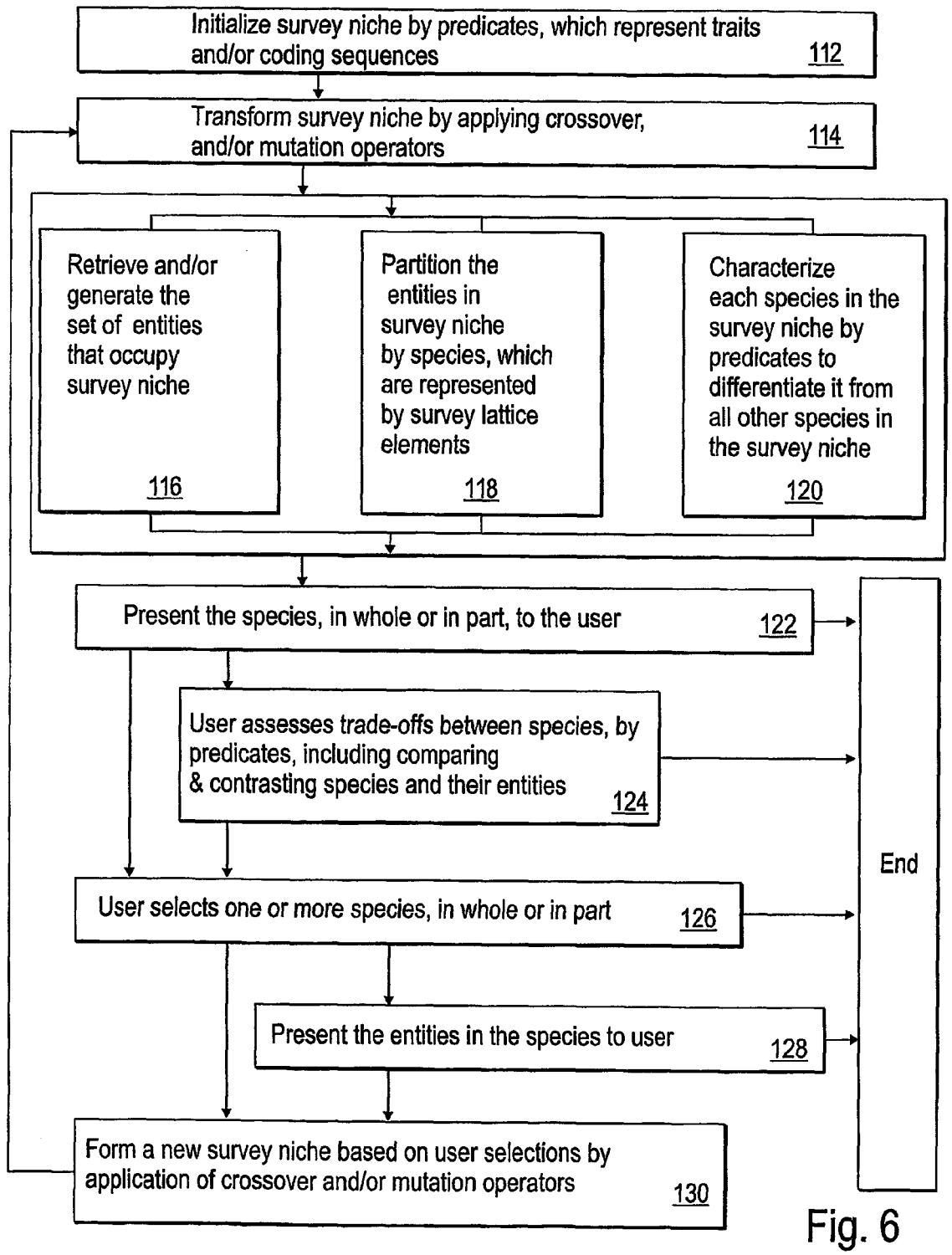
FIG. 6 is a schematic representation of a system according to one embodiment of the present invention for information surveying with a combined evolutionary and topological theme.

Referring to FIG. 6, an exemplary implementation of the general survey method within the context of a combined evolutionary computing and topological theme yields a method to conduct an evolutionary and topological information survey. At operation 112, a survey niche of an information resource is initialized by predicates, which represent traits and/or coding sequences, and transformed at operation 114 by applying crossover operator(s) and/or mutation operator(s). The species of entities belonging to said niche are formed and presented at operations 116-120, where the species are represented by survey lattice elements. At operation 122 the species are presented to the user in whole or in part. At operations 124, 126 the user may compare, contrast, and conduct tradeoff analyses of said species and their entities by predicates, and select one or more said species. At operation 128, the entities in the species are presented to the user. At operation 130, the survey niche, its species, and its entities may be reformed by application of crossover and/or mutation operators based on user selections. The process may then be iterated for any number of generations.

Figure 7:
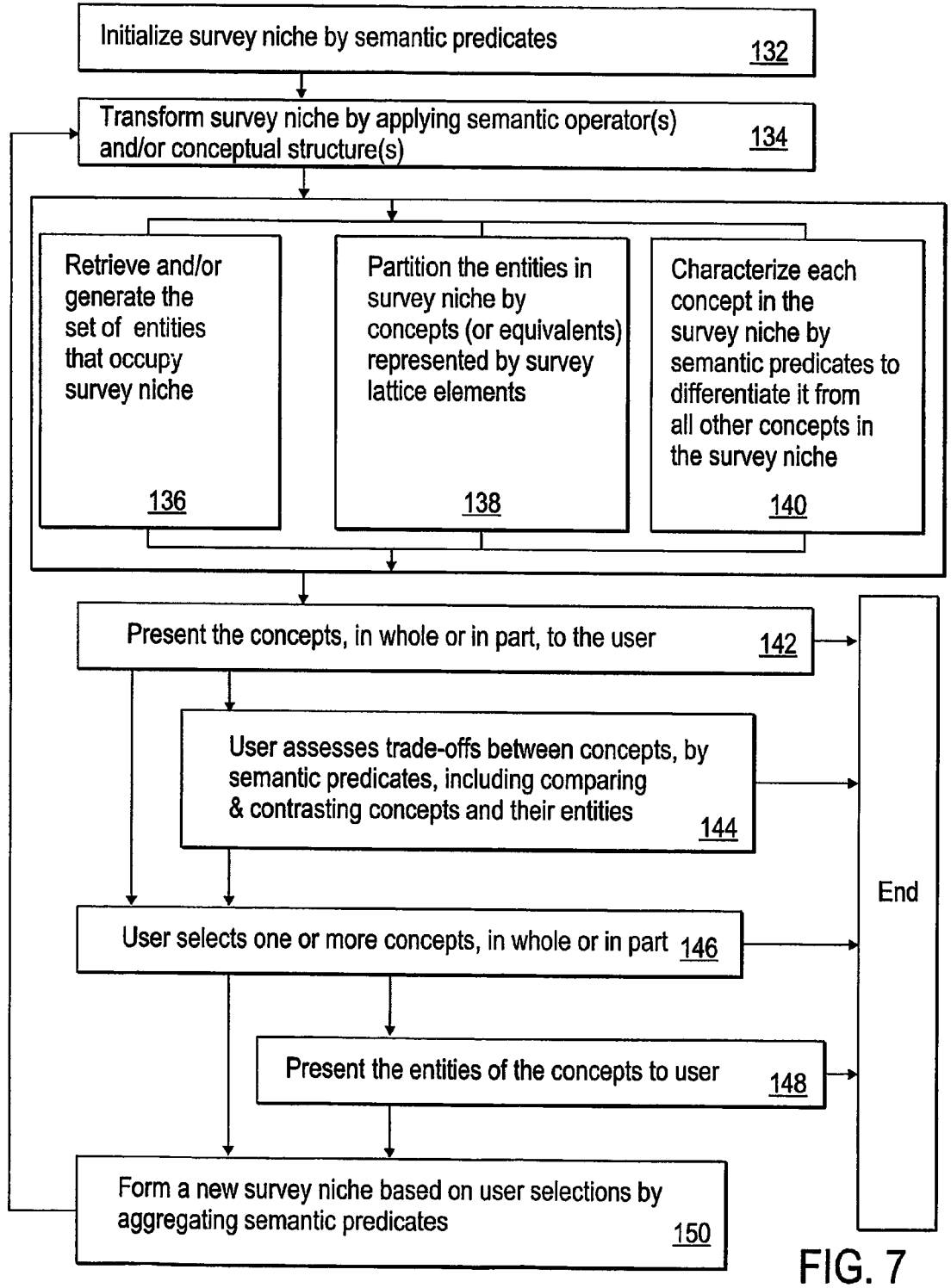
FIG. 7 is a schematic representation of a system according to one embodiment of the present invention for information surveying with a combined semantic/conceptual and topological theme.

Referring to FIG. 7, an exemplary implementation of the general survey method within the context of a combined semantic/conceptual and topological theme yields a method to conduct a semantic/conceptual and topological information survey by initializing a survey niche of an information resource by semantic predicates at operation 132, and transforming said survey niche by applying semantic operator(s) and/or conceptual structure(s) at operation 134. The concepts or their functional equivalents of entities belonging to said niche are formed and presented at operations 136-140, where concepts are represented by survey lattice elements. At operation 142 the concepts are presented to the user in whole or in part. At operations 144-146 the user may compare, contrast, and conduct tradeoff analyses of said concepts and their entities by semantic predicates, and select one or more said concepts. At operation 148, the entities of the concepts are presented to the user. At operation 150, the survey niche, its concepts, and its entities may be reformed by aggregating semantic predicates based on user selections. The process may then be iterated for any number of generations.

Figure 8:
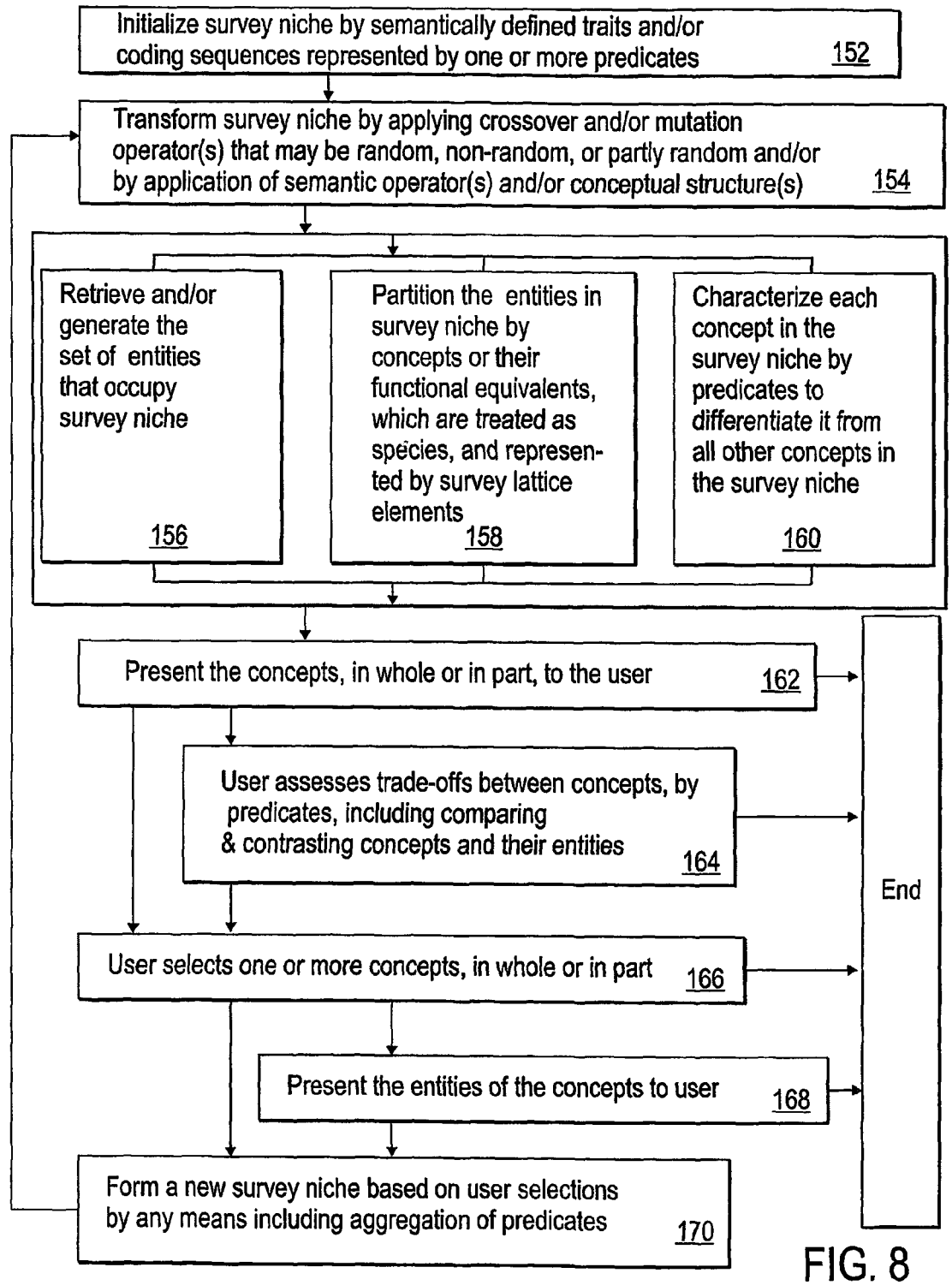
FIG. 8 is a schematic representation of a system according to one embodiment of the present invention for information surveying with a combined semantic/conceptual, evolutionary, and topological theme.

Referring to FIG. 8, an exemplary implementation of the general survey method within the context of a combined semantic/conceptual, evolutionary, and topological theme yields a method to conduct a semantic/conceptual, evolutionary and topological information survey by initializing a survey niche of an information resource by semantically defined traits and/or coding sequences represented by predicates at operation 152, and transforming said survey niche at operation 156 by applying a crossover operator, a mutation operator, a semantic operator, and/or a conceptual structure. The concepts or their functional equivalents of entities belonging to said niche are formed and presented at operations 156-160, where concepts are treated as species and are represented by survey lattice elements. At operation 162 the concepts are presented to the user in whole or in part. At operations 164-166, the user may compare, contrast, and conduct tradeoff analyses of said concepts and their entities by predicates, and select one or more of said concepts. At operation 168, the entities of the concepts are presented to the user. At operation 170, the survey niche, its concepts, and its entities are reformed by any means including aggregation of predicates, based on user selections. The process may then be iterated for any number of generations.

Walk-Thru of the Survey Method

We next present an example of the combined semantic/conceptual, evolutionary, and topological information survey method in action. Operation references are to the General Survey Method above.

First the user establishes the survey niche (operation a) by listing desired characteristics that express the known objectives. These characteristics can be incomplete and inconsistent, brief or thorough, and provided at various levels of abstraction.

Initialized Survey Niche: purple, steel, widget, <=6 lbs

Next, automatic variation transformation (operation b) takes place to vary the survey niche by adding/removing characteristics according to the variation preferences the user has set. This variation can broaden, narrow, shift, integrate, and/or differentiate the characteristics in the survey niche and can optionally be performed under user control.

Varied Survey Niche: purple, widget, wicket, steel, plastic, wood, <=6 lbs, >6 lbs This variation informs the user of objects similar to widgets, namely wickets, because wickets are often lighter than widgets and the user expressed a weight constraint. The variation transformation also adds plastic and wood, typical alternative materials for lightweight widgets. The characteristic >6 lbs was added by random variation to enable the survey to inform the user of more alternatives should the user decide that weight is not the most important feature.

Species are then formed by retrieving individuals that possess any or all niche characteristics, partitioning those individuals by using a survey lattice, and characterizing the survey lattice elements according to satisfied niche characteristics (operation c).

The survey lattice table of dominant species is presented to the user along with a table of fundamental not available combinations of niche characteristics (operation d). Species that are presented also have links to their individuals.

| Generation 1: | | | | |
|---|---|---|---|---|
| Dominant Species | | | | |
| Niche | Species A | Species B | Species C | Species D |
| Purple | Y | Y | Y | Y |
| Widget | Y | Y | Y | |
| Wicket | | | | Y |
| Steel | Y | | | Y |
| Plastic | | Y | | |
| Wood | | | Y | |
| <=6 lbs | | Y | Y | Y |
| >6 lbs | Y | | | |

| Fundamental not available combinations of characteristics - partial listing | | | | | | | |
|---|---|---|---|---|---|---|---|
| Niche | NA 1 | NA 2 | NA 3 | NA 4 | NA5 | NA6 | NA7 |
| Purple | | | | | | | |
| Widget | X | | X | | | | |
| Wicket | | | X | | | | |
| Steel | X | | | | X | X | |
| Plastic | | X | | | X | | X |
| Wood | | | | | | X | X |
| <=6 lbs | X | | | X | | | |
| >6 lbs | | X | | X | | | |

This completes the most basic survey.

The user next uses the survey lattice table presentation to understand the survey niche, observe relationships side-by-side, and assess the trade-offs they may make. They are able to observe characteristics in context, noting that they cannot get a steel widget that is <=6 lbs but that they can get one that is >6 lbs. The user can notice that the color purple is always available and therefore understand that they do not need to modify that characteristic to get what they want. They can compare and contrast, noting that steel widgets tend to be heavier than plastic and wooden widgets although steel wickets are lightweight.

In order to better grasp the other features of the species, they may sample the individuals of each species, bringing forth additional information such as the manufacturers, prices, and part numbers.

Based on their evaluation, the user selects dominant species B and D to evolve. This will reinforce the user's most desired niche characteristics and reshape the survey niche.

A crossover operator creates a new survey niche by aggregating the niche characteristics of the selected species.

The new survey niche: purple, widget, wicket, steel, plastic, <=6 lbs.

The system then transforms the new survey niche through variation, adding characteristics such as gadgets and gizmos, which are kinds of widgets. Subtypes of steel are provided by the automatic variation, as are lower weight differentiators. Wood has been rejected, so it is removed from the survey niche.

The varied new survey niche: purple, widget, gadget, gizmo, wicket, steel, stainless steel, carbon steel, plastic, <=4.6 lbs, and >4.6 but <-6 lbs.

The system identifies the individuals in this survey niche for the second generation, once again forming and characterizing species using a survey lattice, and presenting the survey tables to the user.

| Generation 2: | | | | |
|---|---|---|---|---|
| Dominant Species | | | | |
| Niche | Species E | Species F | Species G | Species H |
| Purple | Y | Y | Y | Y |
| Widget | Y | Y | | |
| Gadget | | Y | | |
| Gizmo | | Y | | |
| Wicket | | | Y | Y |
| Steel | | | Y | Y |
| Stainless steel | | | Y | |
| Carbon steel | | | | Y |
| Plastic | Y | Y | | |
| <=4.6 lbs | Y | | | Y |
| >4.6, <=6 lbs | | Y | Y | |

| Fundamental Not available combinations of characteristics - partial listing | | | | |
|---|---|---|---|---|
| Niche | NA 8 | NA 9 | NA 10 | NA 11 |
| Purple | | | | |
| Widget | X | | | |
| Gadget | | | | |
| Gizmo | | X | | |
| Wicket | | | X | |
| Steel | X | X | | X |
| Stainless steel | | | | |
| Carbon steel | | | | |
| Plastic | | | X | X |
| <= 4.6 lbs | X | | | |
| >4.6, <= 6 lbs | X | | | |

The user now continues their evaluation by adding survey monitors for torque capacity, weather rating, and average price.

| | Species E | Species F | Species G | Species H |
|---|---|---|---|---|
| Survey Monitors | | | | |
| Torque capacity (ft lbs) | 10 | 25 | 30 | 45 |
| Weather rating | 5 | 5 | 10 | 2 |
| Avg. MSRP | $0.50 | $0.60 | $1.75 | $0.90 |

The dominant species table augmented with the related survey monitors table now shows that Species E has purple gizmo widgets made of plastic, <=6 lbs with a torque capacity of 25 ft lbs, a weather rating of 5 years, and an average price of $0.60. The user decides that the difference in cost is more important than the difference in weight and that the weather rating and torque capacity are sufficient to the job.

The user then requests a presentation of the individuals in the species and is able to select one of them.

| Individuals in Species F | | | | |
|---|---|---|---|---|
| | 1 | 2 | 3 | 4 |
| Manufacturer | American | Acme | Southern | J&J |
| Part Number | 45T-931 | 654997 | 500-991 | |
| MSRP | $.55 | $.65 | $.60 | $.60 |
| URL to resource | Link1 | Link2 | Link3 | Link4 |

The user is now in a position to recommend, specify, or purchase one of these individuals, confident that they have found the individuals with all the characteristics they need. This includes information they were not aware of prior to conducting the information survey, such as various types, materials, and ratings.

Partitioning by Lattice

Now we will drill down into an exemplary topological partitioning method, which is applicable, as we have discussed, across many themes of information surveys. We begin by reviewing the concept of query lattice as a means of partitioning and surface it's limitations for this purpose. Next, we generalize the notion of a query lattice to a predicate lattice to free it of these limitations. We then specialize predicate lattice for the purpose of information surveys. We call this a survey lattice.

Query Lattices

The concept of a query lattice was introduced by researchers in natural language recognition and cooperative information systems during the late 1970's and early 1980's. The purpose of forming and using a query lattice was to provide more useful information to a user when a user's query failed to return any results. Specifically, a query lattice was generated only when a query, as formulated by a person, failed to return a result set, i.e., returning only the empty set.

A query lattice can reveal what these researchers referred to as false presumptions or presuppositions, and they labeled lattice elements that reflected these as failing subqueries. Some researchers also identified partial answers to a user's failing query, based on those subqueries of the user's query that succeed.

Regarding these two classes of query lattice elements, researchers identified the minimal failing subquery(ies) and the maximal succeeding subquery(ies) as providing the most useful information to a user when their original query failed. Specifically, when a user's query failed as formulated, the query lattice for that query would be generated. Presenting the minimal failing subqueries of the query lattice would inform the user directly about the false presupposition(s) the user holds, while presenting the maximal succeeding subqueries would provide the user with partial or approximate results to their request.

Query Lattice Example
Failing query:
Dog, long hair, meow, bark
Minimal failing subqueries:
Bark, meow
Dog, meow
Maximally succeeding subqueries:
Dog, long hair, bark
Long hair, meow Note that with a query lattice, however, false presuppositions held by a user are only identified when the user's query fails as formulated. A user may, and often does hold false presuppositions and false knowledge about an information resource, or lacks such knowledge nearly altogether or in general, even when they are able to phrase a successful query. That a query succeeds is not grounds for concluding that what the user means by their query is equivalent to how the information resource interprets that query—the two can differ without causing query failure—and when this occurs a query lattice is valueless.

Another way of saying this is that a user's query may succeed even when it based on a false understanding of the information resource. But a query lattice only provides value when a user's understanding is catastrophically out of alignment with an information resource. However, most times there is not catastrophic misalignment. Thus, in most interactions with information resources, query lattices do not provide value.

We can summarize this discussion by noting two limitations of query lattices. The first limitation is that a query lattice can only provide value in the presence of a query—browsing and discovery-driven exploration are not aided by query lattices. The second limitation is that a query lattice requires the query on which it is based to fail—a query that, as formulated by a user, succeeds does not lead to a query lattice (i.e., all subqueries of a succeeding query also succeed).

A third limitation of query lattices stems from how a subquery is decided to succeed or fail. In all utilizations of query lattices, whether from research or development, academic, government, or commercial organizations, a subquery only succeeds when at least a single entity can be retrieved or inferred that meets all conditions of the query. This overlooks numerous situations when multiple related entities, when aggregated and taken as a unit, can be retrieved or inferred to meet all conditions of the query. One need only consider assemblies of parts and networks of people to see this gaping hole left by query lattices.

The world has changed in the 20 plus years since query lattices were introduced. Today, the problem of queries returning no results has practically vanished, replaced by infoglut, with huge repositories of information that are becoming exponentially larger, more complex, more volatile, and more opaque. Instead of queries that fail by returning no results, today we have queries that return far too many results, with results often numbering in the millions (e.g., for web searches).

The idea of applying a lattice structure to information is still relevant, however there are advantages to the lattice structure being driven by something other than directly by a query that fails as formulated, if the lattice is to provide useful information in most circumstances, not just in the most pathological cases.

Predicate Lattices

We now generalize the concept of query lattice to produce a predicate lattice, according to one exemplary aspect of the present invention. A predicate lattice is generated by taking a given set of predicates or their functional equivalents, forming the power set of the set of predicates (i.e., the power set of a given set is the set of all subsets of the given set), then ordering the elements of the power set in a partial ordering by set subsumption (i.e., an element A is less than or equal to an element B if A is a subset of B). In this usage a predicate of any sort, or any functional equivalent, can represent a property, trait, characteristic, relationship, measurement, constraint, semantic property, action, coding sequence, etc. This role may also be filled by any computational object(s), function(s), procedure(s), rule(s), or process(es) whose evaluation produces a predicate or any functional equivalent. Furthermore, predicates can be fuzzy.

Two classes of predicate lattice elements are identified, namely satisfiable predicate lattice elements and unsatisfiable predicate lattice elements. Satisfiability, and likewise unsatisfiability, may be defined in a plurality of ways, including single entity satisfiability and related entity satisfiability.

Figure 9:
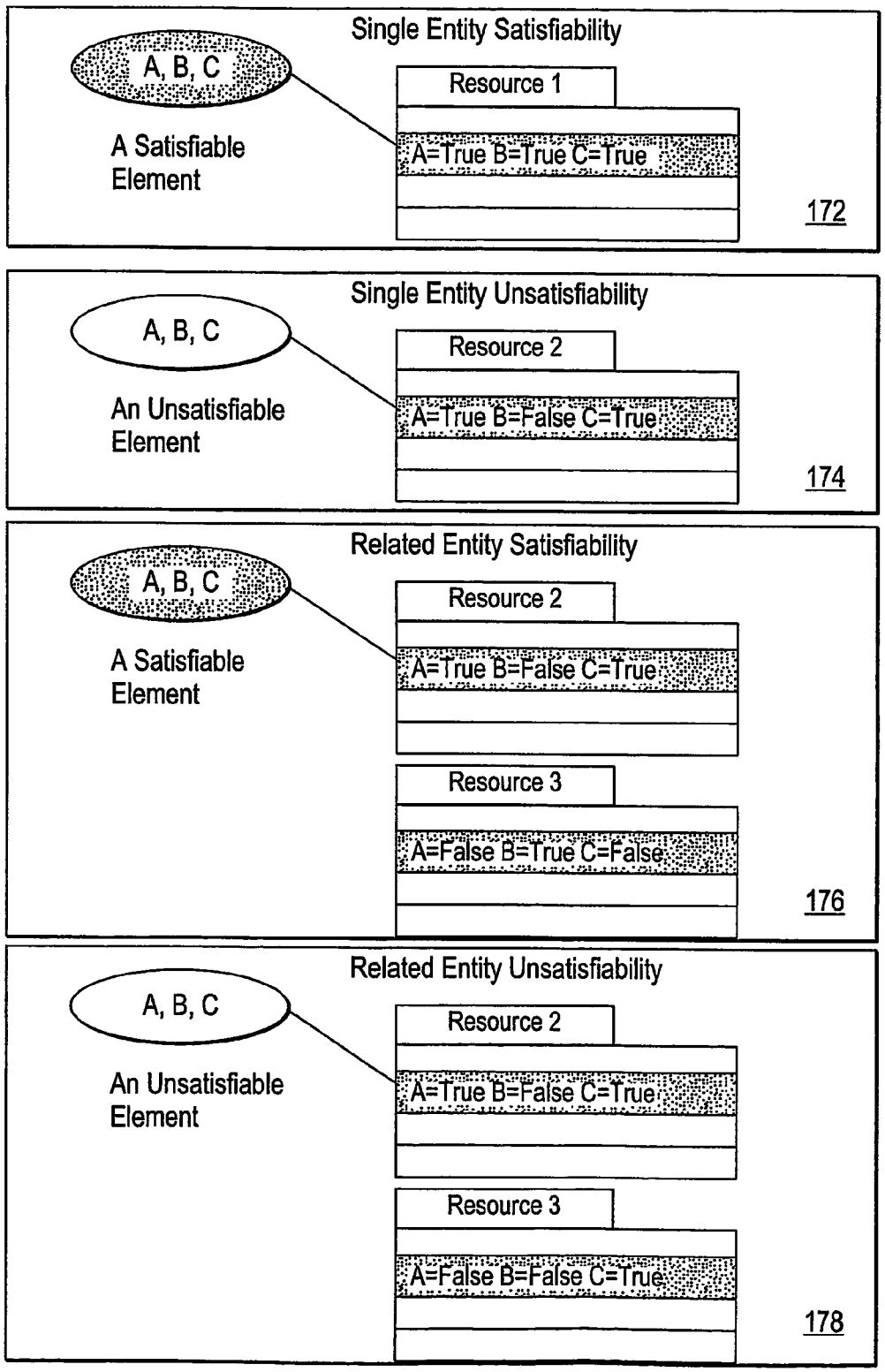
FIG. 9 is a schematic representation of entity satisfiability, according to one embodiment of the present invention.

Referring to FIG. 9, block 172 is an example of single entity satisfiability. A predicate lattice element is single entity satisfiable if there is at least one entity in an information resource that satisfies every predicate of the predicate lattice element. Block 174 is an example of single entity unsatisfiability. A predicate lattice element is single entity unsatisfiable if it is not single entity satisfiable. Block 176 is an example of related entity satisfiability. A predicate lattice element is related entity satisfiable if there exists two or more information resource entities and these entities are related within the information resource and/or related by external information resources or processes such that each predicate of the predicate lattice element evaluates to true for at least one of the related entities. Block 178 is an example of related entity unsatisfiability. A predicate lattice element is related entity unsatisfiable if it is not related entity satisfiable.

Note 1: Single entity satisfiability may be regarded as a special case (the trivial case) of related entity satisfiability where the relationship between entities is the identity relationship, i.e., all of the related entities, that together satisfy the predicates in the set of predicates, are the same single entity.

Note 2: Additional forms of satisfiability and unsatisfiability may be produced by specifying constraints on the type and extent of the relationship in related entity satisfiability and unsatisfiability (single entity satisfiability is an example of this).

Each of these means of determining predicate lattice element satisfiability (or unsatisfiability) depends on the satisfiability (or unsatisfiability) of the individual predicates that constitute a predicate lattice element, which can be determined in a great many ways, including any or all of the following, singularly or in any combination: a lookup operation against stored information, inference, computation in general, communication, interaction with people, or interaction with the physical world aside from computing systems and devices, e.g., through sensors or by performing an experiment or measurement.

Regarding these two classes of predicate lattice elements, satisfiable and unsatisfiable, maximal satisfiable predicate lattice elements and minimal unsatisfiable predicate lattice elements may be identified, where maximal and minimal are defined in terms of the partial ordering on the predicate lattice.

We may now compare query lattice with predicate lattice. A query lattice is an instance of predicate lattice where the set of predicates upon which the predicate lattice is formed is provided directly by a user's query that fails as formulated and where satisfiability is determined strictly by single entity satisfiability. A minimal failing subquery of a query lattice is an instance of a minimal unsatisfiable predicate lattice element. Similarly, a maximal succeeding subquery is an instance of a maximal satisfiable predicate lattice element.

Survey Lattices

In one exemplary embodiment of the present invention, a survey lattice is any instance of predicate lattice where the set of predicates upon which the lattice is based is obtained from any source other than a direct usage of the predicates of a query that, as formulated, fails single entity satisfiability.

| | Types of predicate lattices | |
|---|---|---|
| Source of set of predicates | Related entity satisfiability (non-single) | Single entity satisfiability (only) |
| Non-query | Survey lattice | Survey lattice |
| Query succeeds as formulated | Survey lattice | Survey lattice |
| Query fails as formulated | Survey lattice | Query lattice |

For example, a survey lattice can be formed based on a set of predicates obtained from each distinct value of each distinct attribute and relationship in a database—no query is required. A predicate obtained from each distinct value is an example of a single-value predicate. See the survey lattice example below for an illustration of single-value predicates derived from an information resource.

A slight variant of single-value predicate is set-value predicate, where the predicate is satisfied by any of the values in the set. Another variant of single valued predicate is range-value predicate, where one range predicate is satisfied by multiple values in an information resource (e.g., the range predicate "2 meters<length(X)<=5 meters" would be satisfied for X=2.5 meters, X=3 meters, and X=5 meters).

As a second example, a survey lattice can be formed based on a set of predicates obtained from each distinct entry in an index, such as terms in an inverted full text index. This too, like the preceding example, can use ranges and sets. Once again, no query, failing or otherwise, is required.

As a third example, a survey lattice can be formed based on a set of predicates obtained by taking user input, such as a query, request, or command, and transforming it through means deterministic, non-deterministic, or partially non-deterministic, and this can be done independent of whether the user input, as entered by the user, fails or succeeds. Such transformation(s) may modify predicates in the set of predicates as well as add new predicates and/or delete existing predicates.

As a fourth example, a survey lattice can be formed based on a set of predicates obtained by taking one or more entities from an information resource and identifying and using the predicates, of any type, that characterize the entity or entities. This indirect method may be combined with the approaches in the previous examples.

As a fifth example, any of the previous means may be augmented by abstraction, including generalization and specialization, and/or meta-abstraction, to produce one or more predicates. For an information resource with distinct values of cat, dog, goldfish, and gerbil, a valid predicate could be house_pet(x). For additional means of forming predicates via abstraction, see the section farther below on transformation.

As a sixth example, many types of information resources, including rule systems and logic systems, employ predicates or their functional equivalents directly as their form of representation. Predicates, and even whole lattice elements, may be obtained directly or with little modification from such resources.

As these examples illustrate, a survey lattice can be generated from a user's succeeding query, and moreover, can be employed even in scenarios where there is no query at all. Means of obtaining a set of predicates, upon which a survey lattice is formed, include but are not limited to derivation from or association with: data values and metadata, data structures, conceptual structures, communications, processes of any type (computational and non-computational) and their structure, symbolic reasoning, non-classical-logic, heuristics, events, tasking, objectives, criteria, and queries.

A survey lattice provides a user with an abstraction of an information resource that culls out information that may be useful for understanding and navigating that resource and summarizes such information in a loss-less manner. Maximal satisfiable and minimal unsatisfiable survey lattice elements are the root of a survey lattice's power of abstraction.

Maximal satisfiable survey lattice elements focus a user's attention on the essential commonalities and differences amongst entities of interest. They inform the user of the tradeoffs involved, where satisfaction of one or more requirements leads to foregoing others. In addition, each maximal satisfiable element represents potentially very many entities, enabling the user to handle the huge numbers associated with infoglut. Furthermore, the entities of a maximal satisfiable survey lattice element can be considered exemplars or prototypes, e.g., each of these entities is crucially distinct (compared with the entities of other maximal satisfiable survey lattice elements). By selecting and examining one or more entities from all maximal satisfiable survey lattice elements one obtains a concrete understanding of that region of the information resource circumscribed by the set of predicates, i.e., survey niche. And the "maximal" in maximal satisfiable survey lattice elements means they do all this without redundancy—all redundant and less informative characterization is already stripped away so as not to waste time, effort, or resources.

Minimal unsatisfiable survey lattice elements, on the other hand, inform the user of areas of an information resource that are vacuous. They identify, in a condensed form, areas of exploration that will yield no results. Any exploration or request that includes all the predicates of a minimal unsatisfiable survey lattice element is certain to fail, and by being informed of this the user can avoid wasting time, effort, and resources looking for the wrong things in the wrong places.

Because it does not require a query, a survey lattice can be used for browsing as well as for focused searching. Furthermore, succeeding queries can serve as kernels to seed a survey lattice, where transformation means, deterministic and otherwise, as noted above, are used to drive the set of predicates of such a succeeding query into unsatisfiability. Such a query could never be used to form a query lattice as a query lattice is only defined for a query that fails as formulated.

All of this makes a survey lattice a powerful tool for understanding, navigating, and summarizing/abstracting information resources under many conditions, not just under the most catastrophic.

Survey Lattice Example

Figure 10:
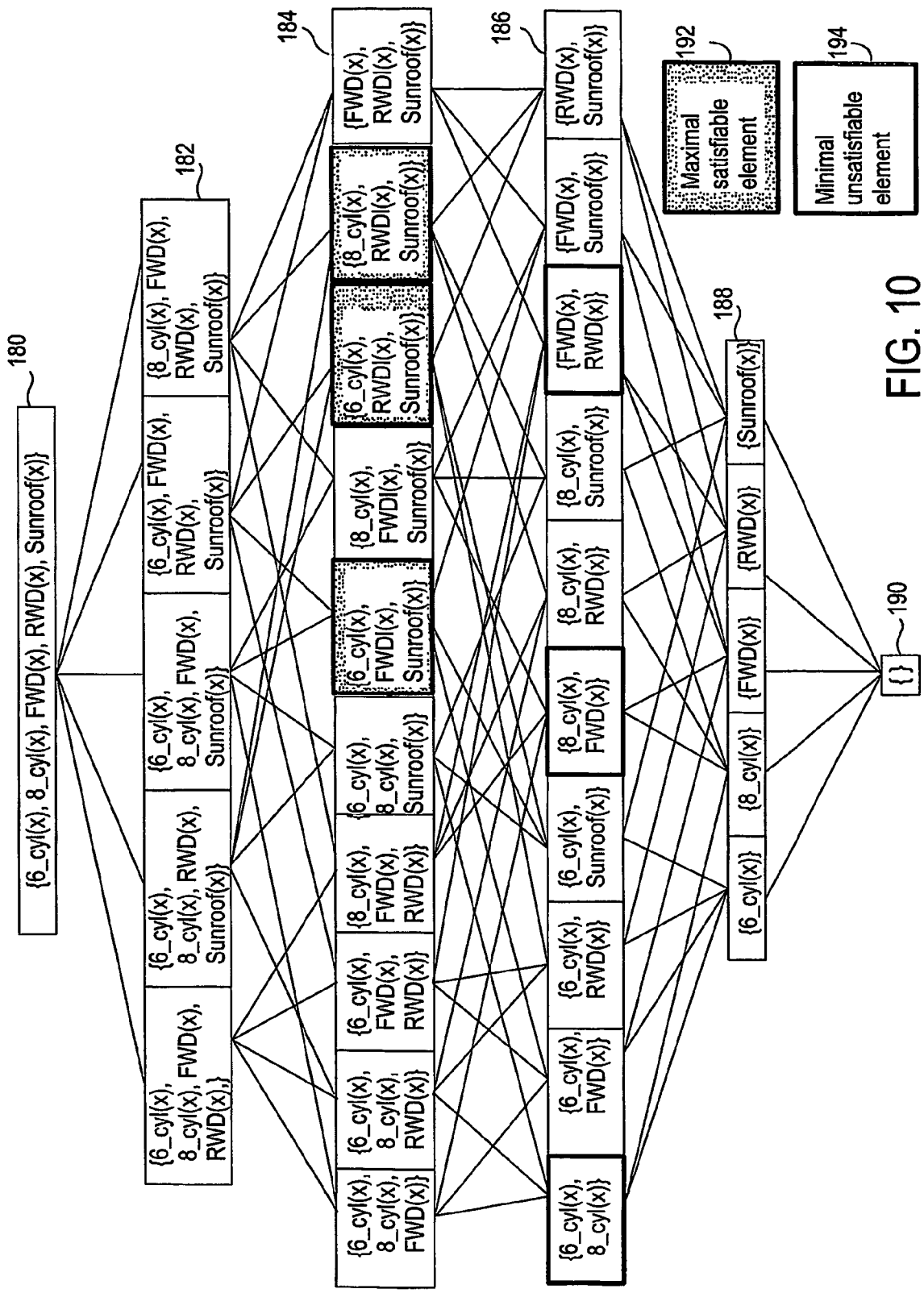
FIG. 10 is a schematic representation of survey lattice showing maximal satisfiable and minimal unsatisfiable elements, according to one embodiment of the present invention.
Figure 11:
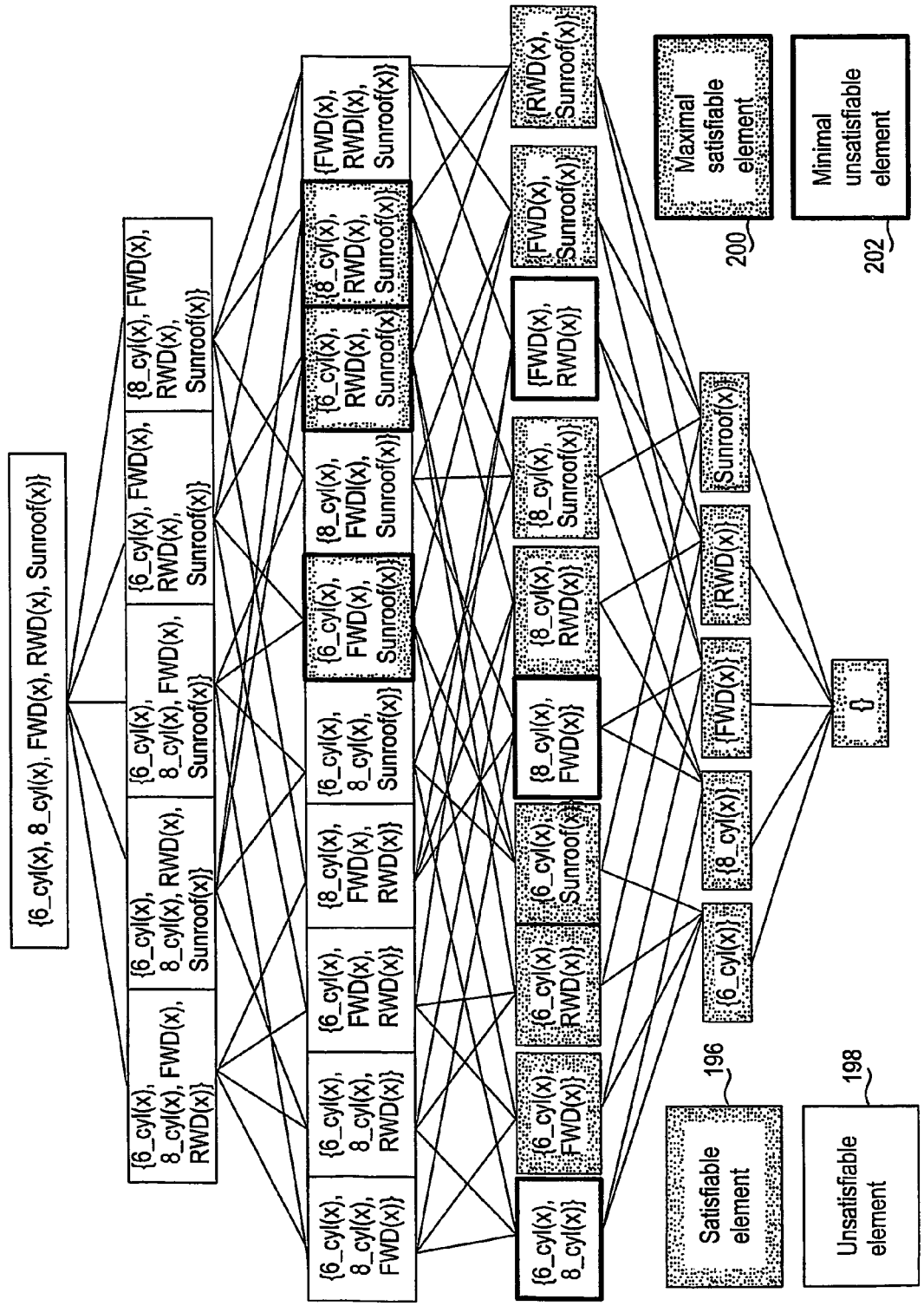
FIG. 11 is a schematic representation of survey lattice showing all satisfiable and unsatisfiable elements, according to one embodiment of the present invention.

For the following example we utilize the sample explicit information resource below (all information is explicitly recorded and stored, only retrieval is required, no inference is required). We then form a set of predicates by defining a predicate for each distinct value of each attribute of the information resource. We then enumerate all the elements of the survey lattice generated by this niche, based on single entity satisfiability. FIGS. 10-11 illustrate the survey lattice including its satisfiable elements, unsatisfiable elements, maximal satisfiable elements, and minimal unsatisfiable elements.

Row 180 of FIG. 10 represents the top element, in this case the set of predicates that constitutes the survey niche. Row 182 represents the five elements, each element consisting of four predicates. Row 184 represents the ten elements, each element consisting of three predicates. Row 186 represents the ten elements, each element consisting of two predicates. Row 188 represents the five elements, each element, called an atom of the lattice, consisting of one predicate. Row 190 represents one element, the one element consisting of zero predicates.

Blocks identified by shading with a heavy border as in block 192, represent the maximal satisfiable survey lattice elements. Blocks identified without shading but with a heavy border, as in block 194, represent the minimal unsatisfiable survey lattice elements.

Referring to FIG. 11, blocks identified by shading with a thin border, as in block 196 represent satisfiable survey lattice elements, blocks identified without shading with a thin a border, as in block 198 represent unsatisfiable survey lattice elements, blocks identified by shading with a heavy border, as in block 200 represent maximal satisfiable survey lattice elements, and blocks identified by without shading with a heavy border, as in block 202, represent minimal unsatisfiable survey lattice elements.

Sports cars information resource

| Primary Key | Name | #_cyl | Drive layout | Sunroof |
|---|---|---|---|---|
| 10123 | Eclipse | 6 | FWD | Y |
| 20728 | Corvette | 8 | RWD | N |
| 20729 | Corvette | 8 | RWD | N |
| 70291 | Firebird | 8 | RWD | N |
| 63225 | Aston Martin | 8 | RWD | Y |
| 10135 | Porsche 911 | 6 | RWD | Y |
| 11222 | Nissan | 6 | FWD | Y |
| 38423 | Toyota | 6 | RWD | Y |
| 89724 | Jaguar | 8 | RWD | N |
| 89725 | Jaguar | 8 | RWD | Y |
| 42895 | Lexus | 8 | RWD | Y |

Survey Niche (of Single Valued Predicates)
  6_cyl(x)
  8_cyl(x)
  FWD(X)
  RWD(x)
  Sunroof(x)
Lattice Elements
Top element (=the set of predicates that constitutes the survey niche) {6_cyl(x), 8_cyl(x), FWD(x), RWD(x), Sunroof(x)}
5 elements of 4 predicates
  {6_cyl(x), 8_cyl(x), FWD(x), RWD(x)}
  {6_cyl(x), 8_cyl(x), FWD(x), Sunroof(x)}
  {6_cyl(x), 8_cyl(x), RWD(x), Sunroof(x)}
  {6_cyl(x), FWD(x), RWD(x), Sunroof(x)}
  {8_cyl(x), FWD(x), RWD(x), Sunroof(x)}
10 elements of 3 predicates
  {6_cyl(x), 8_cyl(x), FWD(x)}
  {6_cyl(x), 8_cyl(x), RWD(x)}
  {6_cyl(x), FWD(x), RWD(x)}
  {8_cyl(x), FWD(x), RWD(x)}
  {6_cyl(x), 8_cyl(x), Sunroof(x)}
  {6_cyl(x), FWD(x), Sunroof(x)}
  {8_cyl(x), FWD(x), Sunroof(x)}
  {6_cyl(x), RWD(x), Sunroof(x)}
  {8_cyl(x), RWD(x), Sunroof(x)}
  {FWD(x), RWD(x), Sunroof(x)}
10 elements of 2 predicates
  {6_cyl(x), 8_cyl(x)}
  {6_cyl(x), FWD(x)}
  {6_cyl(x), RWD(x)}
  {6_cyl(x), Sunroof(x)}
  {8_cyl(x), FWD(x)}
  {8_cyl(x), RWD(x)}
  {8_cyl(x), Sunroof(x)}
  {FWD(x), RWD(x)}
  {FWD(x), Sunroof(x)}
  {RWD(x), Sunroof(x)}
5 elements of 1 predicate (atoms)
  {6_cyl(x)}
  {8_cyl(x)}
  {FWD(x)}
  {RWD(x)}
  {Sunroof(x)}
1 element of 0 predicates
  { }

Maximal Satisfiable Survey Lattice Elements
{6_cyl(x), Sunroof(x)}

| | |
|---|---|
| 10123 | Eclipse |
| 11222 | Nissan |

{6_cyl(x), Sunroof(x)}

| | |
|---|---|
| 10135 | Porsche 911 |
| 38423 | Toyota |

{8_cyl(x), Sunroof(x)}

| | |
|---|---|
| 63225 | Aston Martin |
| 89725 | Jaguar |
| 42895 | Lexus |

Minimal Unsatisfiable Survey Lattice Elements
{6_cyl(x), 8_cyl(x)}
{FWD(x), RWD(x)}
{8_cyl(x), FWD(x)}
Forming Predicate Lattices Any method capable of enumerating lattice elements can be employed, recalling that each lattice element is an element of the power set of the set of predicates provided by the survey niche. Such methods include iterative and recursive functions and procedures which can construct the lattice element by element, beginning either at the bottom and working upwards or beginning at the top and working downwards.

Numerous heuristics can be applied as well, e.g., pruning. As one enumerates lattice elements one may also check them for satisfiability. When an element is enumerated that is satisfiable then it may be assumed that all elements that are less than this element (less than as defined by the partial order on the lattice) will also be satisfiable and hence non-maximal. If one is only seeking to identify the maximal satisfiable elements, for example, then this branch may be pruned and thus given no further consideration and require no further computation.

A Method to Enumerate Satisfiable Predicate Lattice Elements

We now introduce an exemplary method to enumerate all satisfiable lattice elements, ultimately enumerating all maximal satisfiable predicate lattice elements. This method is applicable to any predicate lattice, not just survey lattices.

In one exemplary embodiment of the present invention the maximal and non-maximal satisfiable elements of a predicate lattice are formed. The method applies to all predicate lattices, including survey lattices and query lattices, and also enables the forming of the minimal and non-minimal unsatisfiable elements. In the method, facts for each predicate's satisfiability are obtained. The facts are grouped by point of evidence. The groups of facts are sorted by the number of predicates satisfied. Duplicate groups as well as contained groups are rejected.

Figure 12:
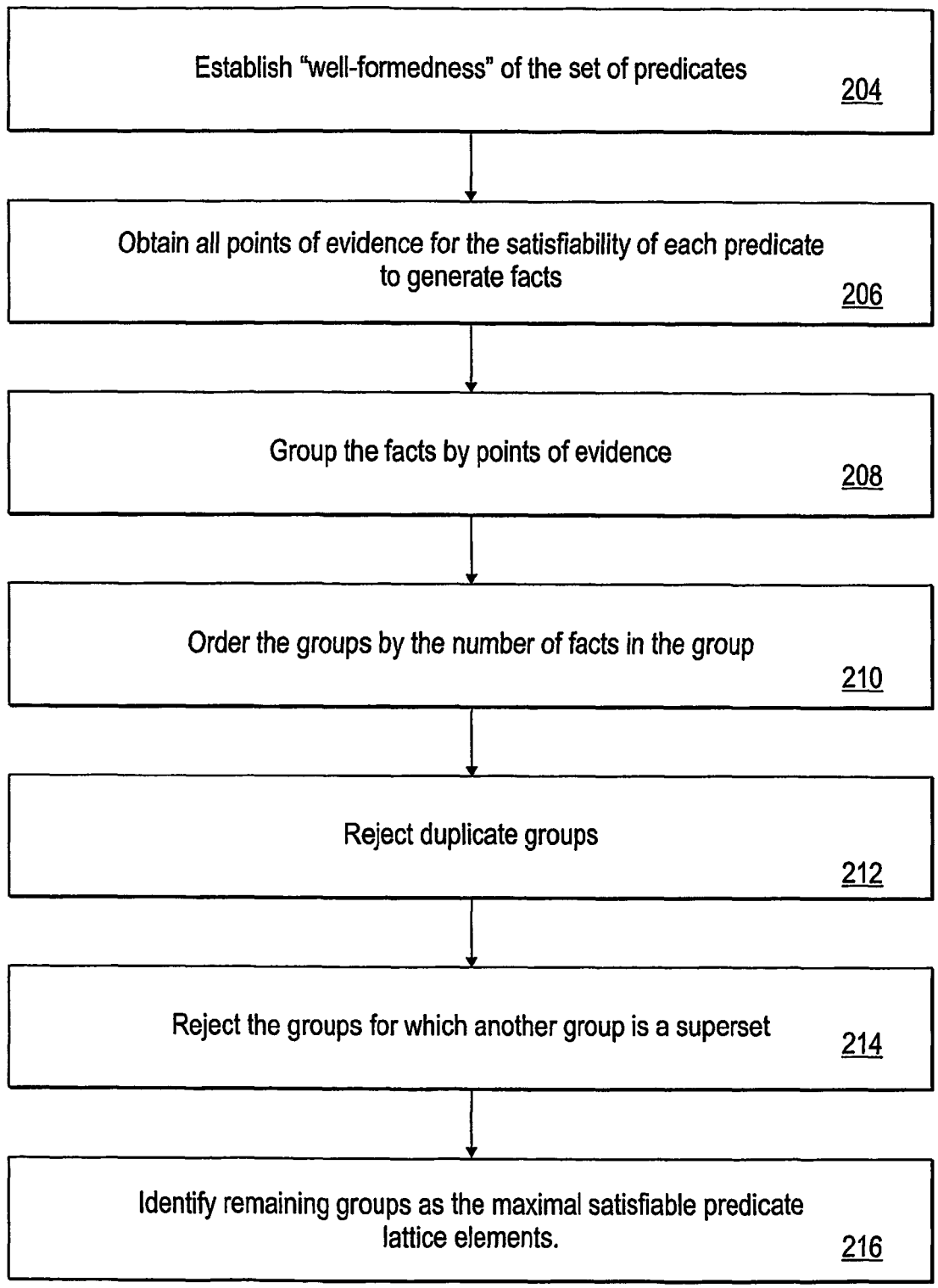
FIG. 12 is a schematic operational flow diagram of an exemplary method to identify the maximal satisfiable predicate lattice elements, according to one embodiment of the present invention.

FIG. 12 is a block diagram of the operations performed to form a predicate lattice, according to an exemplary embodiment of the present invention. At operation 204 the "well-formedness" of the set of predicates is established. This means that each predicate in the set of predicates is individually satisfiable. When this enumeration method is conducted within the survey method described earlier, the well-formedness may be enforced within a transformation operation. At operation 206, all points of evidence for the satisfiability of each predicate in the set of predicates are obtained. Obtaining the points of evidence may utilize operations such as retrieval, inference, general computation, communication, user interaction, interaction with the physical world (as in a measurement or use of a sensor), or a combination of these operations. In one exemplary embodiment, the results of this operation may be a relation of tuples. Each tuple of the relation uniquely designates a predicate and uniquely designates a point of evidence that satisfies the predicate. We conveniently call each tuple, or any functionally equivalent embodiment, a fact. At operation 208, the facts are grouped by point of evidence. In the relational embodiment above, the fact tuples may be grouped by a unique identifier for point of evidence. At operation 210, the groups are ordered by the number of facts in the group in descending order. The groups that contain the same subset of the set of predicates are rejected at operation 212. The groups that remain constitute the satisfiable predicate lattice elements. The groups for which another group is a superset (in terms of predicates satisfied) are rejected at operation 214. The groups that remain constitute the maximal satisfiable predicate lattice elements, and are identified at operation 216.

A Relational Embodiment of a Method to Enumerate Satisfiable Lattice Elements

We now illustrate the exemplary method by applying it with a relational embodiment to generate the survey lattice shown in the previous drawings.

Given: Sports Car information resource

Set of predicates={6_cyl(x), 8_cyl(x), FWD(x), RWD(x), Sunroof(x)}

Well-formedness: each predicate in the set of predicates is individually satisfiable over the Sports Car information resource.

Create fact table; Group fact table by point of evidence (in this case, by Evidence key)

| Evidence key | Satisfied Predicate | Group ID |
|---|---|---|
| 10123 | 6_cyl(x) | 1 |
| 10123 | FWD(x) | 1 |
| 10123 | Sunroof(x) | 1 |
| 20728 | 8_cyl(x) | 2 |
| 20728 | RWD(x) | 2 |
| 20729 | 8_cyl(x) | 3 |
| 20729 | RWD(x) | 3 |
| 70291 | 8_cyl(x) | 4 |
| 70291 | RWD(x) | 4 |
| 63225 | 8_cyl(x) | 5 |
| 63225 | RWD(x) | 5 |
| 63225 | Sunroof(x) | 5 |
| 10135 | 6_cyl(x) | 6 |
| 10135 | RWD(x) | 6 |
| 10135 | Sunroof(x) | 6 |
| 11222 | 6_cyl(x) | 7 |
| 11222 | FWD(x) | 7 |
| 11222 | Sunroof(x) | 7 |
| 38423 | 6_cyl(x) | 8 |
| 38423 | RWD(x) | 8 |
| 38423 | Sunroof(x) | 8 |
| 89724 | 8_cyl(x) | 9 |
| 89724 | RWD(x) | 9 |
| 89725 | 8_cyl(x) | 10 |
| 89725 | RWD(x) | 10 |
| 89725 | Sunroof(x) | 10 |
| 42895 | 8_cyl(x) | 11 |
| 42895 | RWD(x) | 11 |
| 42895 | Sunroof(x) | 11 |

Order, in descending order, groups so obtained by the number of facts in the group (i.e., the number of predicates satisfied).

| Evidence key | Satisfied Predicate | Group ID | Count of facts in group |
|---|---|---|---|
| 10123 | 6_cyl(x) | 1 | 3 |
| 10123 | FWD(x) | 1 | 3 |
| 10123 | Sunroof(x) | 1 | 3 |
| 63225 | 8_cyl(x) | 5 | 3 |
| 63225 | RWD(x) | 5 | 3 |
| 63225 | Sunroof(x) | 5 | 3 |
| 10135 | 6_cyl(x) | 6 | 3 |
| 10135 | RWD(x) | 6 | 3 |
| 10135 | Sunroof(x) | 6 | 3 |
| 11222 | 6_cyl(x) | 7 | 3 |
| 11222 | FWD(x) | 7 | 3 |
| 11222 | Sunroof(x) | 7 | 3 |
| 38423 | 6_cyl(x) | 8 | 3 |
| 38423 | RWD(x) | 8 | 3 |
| 38423 | Sunroof(x) | 8 | 3 |
| 89725 | 8_cyl(x) | 10 | 3 |
| 89725 | RWD(x) | 10 | 3 |
| 89725 | Sunroof(x) | 10 | 3 |
| 42895 | 8_cyl(x) | 11 | 3 |
| 42895 | RWD(x) | 11 | 3 |
| 42895 | Sunroof(x) | 11 | 3 |
| 89724 | 8_cyl(x) | 9 | 2 |
| 89724 | RWD(x) | 9 | 2 |
| 20728 | 8_cyl(x) | 2 | 2 |
| 20728 | RWD(x) | 2 | 2 |
| 20729 | 8_cyl(x) | 3 | 2 |
| 20729 | RWD(x) | 3 | 2 |
| 70291 | 8_cyl(x) | 4 | 2 |
| 70291 | RWD(x) | 4 | 2 |

Reject groups that contain the same subset of the set of predicates. This rejection operation benefits from the ordering. The groups that remain constitute the satisfiable lattice elements.

| Evidence key | Satisfied Predicate | Group ID | Count of facts in group |
|---|---|---|---|
| 10123 | 6_cyl(x) | 1 | 3 |
| 10123 | FWD(x) | 1 | 3 |
| 10123 | Sunroof(x) | 1 | 3 |
| 63225 | 8_cyl(x) | 5 | 3 |
| 63225 | RWD(x) | 5 | 3 |
| 63225 | Sunroof(x) | 5 | 3 |
| 10135 | 6_cyl(x) | 6 | 3 |
| 10135 | RWD(x) | 6 | 3 |
| 10135 | Sunroof(x) | 6 | 3 |
| 89724 | 8_cyl(x) | 9 | 2 |
| 89724 | RWD(x) | 9 | 2 |
| 20728 | 8_cyl(x) | 2 | 2 |
| 20728 | RWD(x) | 2 | 2 |
| 20729 | 8_cyl(x) | 3 | 2 |
| 20729 | RWD(x) | 3 | 2 |
| 70291 | 8_cyl(x) | 4 | 2 |
| 70291 | RWD(x) | 4 | 2 |

Reject groups for which another group is a superset (in terms of predicates satisfied). This rejection also benefits from the ordering.

| Primary key | Satisfied Predicate | Group ID | Count of facts in group |
|---|---|---|---|
| 10123 | 6_cyl(x) | 1 | 3 |
| 10123 | FWD(x) | 1 | 3 |
| 10123 | Sunroof(x) | 1 | 3 |
| 63225 | 8_cyl(x) | 5 | 3 |
| 63225 | RWD(x) | 5 | 3 |
| 63225 | Sunroof(x) | 5 | 3 |
| 10135 | 6_cyl(x) | 6 | 3 |
| 10135 | RWD(x) | 6 | 3 |
| 10135 | Sunroof(x) | 6 | 3 |

The groups that remain constitute the maximal satisfiable lattice elements.

| Maximal satisfiable lattice element ID | Satisfied Predicate |
|---|---|
| 1 | 6_cyl(x) |
| 1 | FWD(x) |
| 1 | Sunroof(x) |
| 2 | 8_cyl(x) |
| 2 | RWD(x) |
| 2 | Sunroof(x) |
| 3 | 6_cyl(x) |
| 3 | RWD(x) |
| 3 | Sunroof(x) |

While this example has obtained points of evidence from an information resource of retrievable entities, as the method states a point of evidence may also be obtained from an information resource that employs rules/constraints and that requires inference. We refer to such information resources as non-explicit or not strictly explicit, as facts may need to be inferred based on other facts and rules or constraints. Expert systems and configurators fall in this category. Overall, the method of forming a predicate lattice over a non-explicit or not strictly explicit information resource is the same, only differing in how facts are obtained. In some of these cases shortcuts may be taken without functional impact, such as a rule or constraint that can be directly converted into a predicate lattice element.

Note that this method does not require all operations to be performed as separate commands in strict order, e.g., embodied with SQL several operations may be combined in a single command. This is left to the discretion of the programmer and may be influenced by choice of programming model and language. Furthermore, the method, relying on retrieval operations, grouping operations, sorting operations, and uniqueness enforcing operations, may be embodied as a serial or parallel algorithm, distributed or localized.

Extending the Method to Enumerate Minimal Unsatisfiable Lattice Elements

We now continue our explication of the exemplary method in order to enumerate minimal unsatisfiable predicate lattice elements.

Obtain all points of evidence, within the niche, that establishes an occurrence of unsatisfiability of a predicate belonging to the set of predicates. In a relational embodiment, this produces a relation of tuples, one tuple for each predicate in the niche that is not satisfied by a point of evidence, a tuple designating a point of evidence and a predicate that it does not satisfy, designation by unique identifier. We conveniently call such a tuple, or any functionally identical embodiment, a negative fact.

Group negative facts by point of evidence. In a relational embodiment the negative fact tuples would be grouped on the unique identifier for point of evidence.

Order, in ascending order, groups so obtained by the number of negative facts in a group.

Reject groups that contain the same subset of the set of predicates.

Reject groups for which another group is a subset. Groups that remain are candidate minimal unsatisfiable predicate lattice elements.

Reject groups that are subsets of maximal satisfiable predicate lattice elements.

A negative fact table tells us that, having gathered together all points of evidence that substantiate the satisfiability of at least one predicate of the set of predicates, these same points of evidence constitute facts that other predicates are not satisfied, and therefore provide clues that certain predicates are not simultaneously satisfiable.

We are looking for such unsatisfiable combinations, but just because one point of evidence says that a particular combination of predicates is unsatisfiable does not mean this combination is globally unsatisfiable (e.g., is unsatisfiable within the area of the information resource delineated by the set of predicates or survey niche). So when a clue tells us something that we know, from other knowledge, not to be globally true, then we may reject that clue. To effect this rejection we may apply our global knowledge, which we possess in the form of maximal satisfiable lattice elements.

For instance, the entity with key 20728 substantiates the satisfiability of two predicates, namely 8_cyl(x) and RWD(x). At the same time this entity is evidence that 6_cyl(x), FWD(x), and Sunroof(x) are not satisfied. But we have a maximal satisfiable lattice element, enumerated previously, that tells us such a combination is satisfiable, so this clue may be rejected.

It should be noted that this is likely that there are other points of evidence (in this case entities) not present in the negative fact table, but that establish one or more predicates in the set of predicates as not satisfied. However, such points of evidence do not substantiate any of the predicates in the set of predicates (because any point of evidence that substantiates at least one predicate in the set of predicates is already present in the table), and therefore may be excluded from consideration for the present purposes.

We continue the previous example by forming the negative fact table, grouped on point of evidence, with groups sorted in descending order by count of the negative facts in each group.

| Evidence key | Unsatisfied Predicate | Group ID | Count of negative facts in group |
|---|---|---|---|
| 10123 | 8_cyl(x) | 1 | 2 |
| 10123 | RWD(x) | 1 | 2 |
| 10135 | 8_cyl(x) | 2 | 2 |
| 10135 | FWD(x) | 2 | 2 |
| 11222 | 8_cyl(x) | 3 | 2 |
| 11222 | RWD(x) | 3 | 2 |
| 38423 | 8_cyl(x) | 4 | 2 |
| 38423 | FWD(x) | 4 | 2 |
| 42895 | 6_cyl(x) | 5 | 2 |

-continued

| Evidence key | Unsatisfied Predicate | Group ID | Count of negative facts in group |
|---|---|---|---|
| 42895 | FWD(x) | 5 | 2 |
| 63225 | 6_cyl(x) | 6 | 2 |
| 63225 | FWD(x) | 6 | 2 |
| 89725 | 6_cyl(x) | 7 | 2 |
| 89725 | FWD(x) | 7 | 2 |
| 20728 | 6_cyl(x) | 8 | 3 |
| 20728 | FWD(x) | 8 | 3 |
| 20728 | Sunroof(x) | 8 | 3 |
| 20729 | 6_cyl(x) | 9 | 3 |
| 20729 | FWD(x) | 9 | 3 |
| 20729 | Sunroof(x) | 9 | 3 |
| 70291 | 6_cyl(x) | 10 | 3 |
| 70291 | FWD(x) | 10 | 3 |
| 70291 | Sunroof(x) | 10 | 3 |
| 89724 | 6_cyl(x) | 11 | 3 |
| 89724 | FWD(x) | 11 | 3 |
| 89724 | Sunroof(x) | 11 | 3 |

Next we reject duplicate fact groups. Notice how this rejection process benefits from the ordering.

| Evidence key | Unsatisfied Predicate | Group ID | Count of negative facts in group |
|---|---|---|---|
| 10123 | 8_cyl(x) | 1 | 2 |
| 10123 | RWD(x) | 1 | 2 |
| 10135 | 8_cyl(x) | 2 | 2 |
| 10135 | FWD(x) | 2 | 2 |
| 42895 | 6_cyl(x) | 5 | 2 |
| 42895 | FWD(x) | 5 | 2 |
| 20728 | 6_cyl(x) | 8 | 3 |
| 20728 | FWD(x) | 8 | 3 |
| 20728 | Sunroof(x) | 8 | 3 |

Then we reject containing groups, also benefiting from the ordering.

| Evidence key | Unsatisfied Predicate | Group ID | Count of negative facts in group |
|---|---|---|---|
| 10123 | 8_cyl(x) | 1 | 2 |
| 10123 | RWD(x) | 1 | 2 |
| 10135 | 8_cyl(x) | 2 | 2 |
| 10135 | FWD(x) | 2 | 2 |
| 42895 | 6_cyl(x) | 5 | 2 |
| 42895 | FWD(x) | 5 | 2 |

Reject groups contained in maximal satisfiable lattice elements.

| Evidence key | Unsatisfied Predicate | Group ID | Count of negative facts in group |
|---|---|---|---|
| 10135 | 8_cyl(x) | 2 | 2 |
| 10135 | FWD(x) | 2 | 2 |

The remaining groups—just one in this example—represent minimal unsatisfiable lattice elements, but there may be others not identified here (though they are of a less valuable variety). This is because the negative fact table we started with, derived from the original fact table, did not represent all negative facts (as delineated by the set of predicates or survey niche).

For applications where all minimal unsatisfiable lattice elements are required, this method may be modified by replacing the negative fact table with an exhaustive negative fact table and proceeding as above. The end result is enumeration of all minimal satisfiable lattice elements.

Enumeration of all maximal satisfiable lattice elements and minimal unsatisfiable lattice elements may use significant computational resources, depending on the algorithms employed, the heuristics applied, the number of predicates in the set of predicates, the number of entities in the information resource, the distribution of traits amongst the entities in the information resource, and the presence and sophistication of indexes (see the later subsection on optimizations).

A number of methods, including the methods presented above, are amenable to high levels of parallelization and thus can exploit massively parallel computer and network architectures, including SMP, NUMA, clusters, grids, computing fabrics, data flow, marker and bit passing, message passing, MIMD, and SIMD.

Technologies in research at the time of this filing, such as quantum computing, optical computing, and biomolecular and nano computing, portend near real-time computation of NP hard problems, making computation of comprehensive, fully detailed predicate lattices of even the largest information resources realistic.

Survey Lattice Usage

Survey lattices may be interacted with and communicated, in whole or in part, through numerous means, including but not limited to programmatic access methods, interfaces of a hardware and/or software variety, communication protocols, presentation displays and forms utilizing any or all sensory modalities, and/or manipulation methods, direct or indirect.

Wherever a survey lattice is utilized, it may be localized in a single address space or distributed and/or replicated across multiple address spaces, e.g., over a disk array, multiprocessor machine, network, cluster, grid, or fabric.

Figure 13:
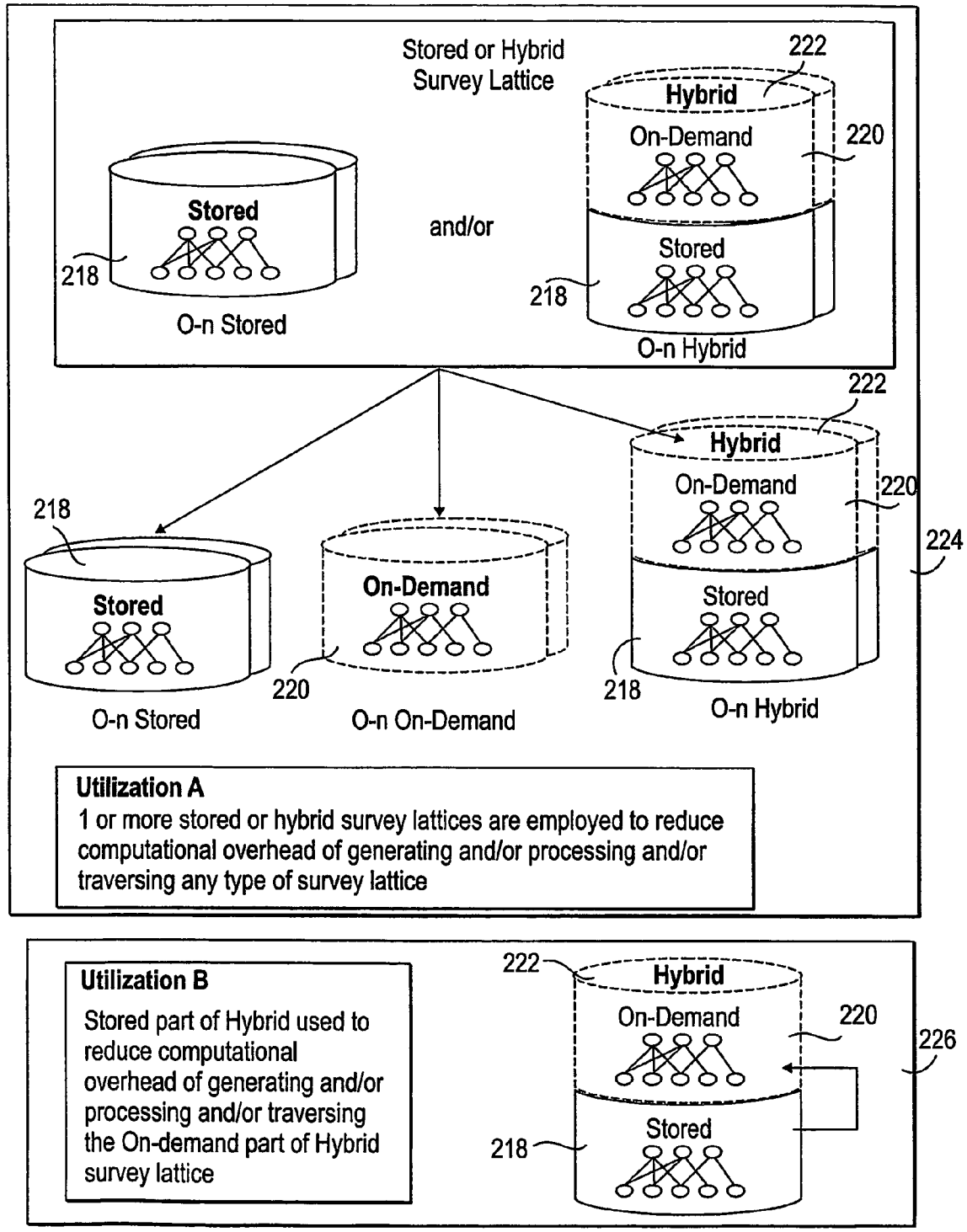
FIG. 13 is a diagrammatic representation of utilization of survey lattices, according to one embodiment of the present invention.

Referring to FIG. 13, survey lattices, in whole or in part, may be formed in advance of their use, stored in volatile storage or non-volatile persistent storage, and optionally maintained (so as to keep their elements, based as they are on satisfiability, accurate). We call this a stored survey lattice 218. Survey lattices and their elements may be stored, e.g., in files, databases, and as programmatic objects or components.

Survey lattices, in whole or in part, may also be formed on an as needed basis rather than in advance of their use. These are called on-demand survey lattices 220. While they are in use, an on-demand survey lattice 220 may reside in a machine readable form, for example, in processor registers or buffers, in a cache, in main memory, or literally formed in part as needed and then discarded. An on-demand survey lattice 220 may be converted into a stored survey lattice 218 by aggregating its parts, if needed, and storing it.

A survey lattice may be partly formed in advance of use and that part stored in the same ways as a stored survey lattice, with all or some of the remaining part formed on-demand. This is called a hybrid survey lattice.

Survey lattices based on a set of predicates obtained from an information resource, e.g., using single-value predicates, set-value predicates, range-value predicates, and semantic-value predicates, will often be stored and maintained. On the other hand, survey lattices based on a set of predicates obtained by transforming specific user input (as in the survey methodology that begins with niche initialization) will often be formed on-demand (formed only when the input becomes available). These are the simplest scenarios, involving strictly stored or strictly on-demand survey lattices. However, survey lattice elements from stored, on-demand, and hybrid survey lattices may be used together in various and numerous combinations and to various affect.

FIG. 13 shows two classes of survey lattice utilization. In utilization class A at block 224, the stored survey lattices 218 and hybrid survey lattices 222 are used to reduce the computational overhead of generating, processing, and traversing any type of survey lattice. In utilization class B at block 226, the stored part 218 of a hybrid survey lattice 222 is used to accomplish the same with the on-demand part 220.

Any application or system that embodies the survey method, in any of its themes, will require methods and apparatus to specify and attach the information resource(s) to be surveyed, specify transformation means and source(s) (e.g., conceptual structures), possibly map information resources to each other (e.g., map the concepts of a conceptual structure to the schema or index of an information resource), provide administrative functions, and configuration and customization facilities for the user. These are not a part of the core invention and are left up to the application implementer who is versed in the art.

Beyond the employment of survey lattices within the context of the survey method and its plurality of themes (as discussed elsewhere), survey lattices may be employed, in whole or in part, to present, interact with, understand, navigate, index, browse, search, integrate, manipulate, persist, communicate, summarize/abstract, proxy, and/or compress an information resource. Below we illustrate these applications in a number of examples.

An Index of Survey Lattice Elements

We now take maximal satisfiable and minimal unsatisfiable elements of a survey lattice and organize these to ease direct access, be it in an interactive or non-interactive (e.g., printed) form. We illustrate with the sports car information resource. We note in passing that while the following examples are in terms of survey lattices the methods are equally applicable to the more general predicate lattices.

Predicates, belonging to the set of predicates on which the survey lattice is based, are organized by a strict ordering, e.g., alphanumerically. For each predicate, all of the maximal satisfiable and minimal unsatisfiable survey lattice elements that include said predicate are then listed, with predicates within each lattice element ordered by the strict order and the lattice elements themselves ordered by the strict order.

Note that, within each predicate, survey lattice elements are segregated and signified by whether they are maximal satisfiable or minimal unsatisfiable.

EXAMPLE 1

Index of Survey Lattice Elements by Predicate Satisfied

6_cyl(x)
 {6_cyl(x), FWD(x), Sunroof(x)} Max
 {6_cyl(x), RWD(x), Sunroof(x)} Max
 {6_cyl(x), 8_cyl(x)} Min
8_cyl(x)
 {8_cyl(x), RWD(x), Sunroof(x)} Max
 {6_cyl(x), 8_cyl(x)} Min
 {8_cyl(x), FWD(x)} Min
FWD(x)
 {6_cyl(x), FWD(x), Sunroof(x)} Max
 {8_cyl(x), FWD(x)} Min
 {FWD(x), RWD(x)} Min
RWD(x)
 {6_cyl(x), RWD(x), Sunroof(x)} Max
 {8_cyl(x), RWD(x), Sunroof(x)} Max
 {FWD(x), RWD(x)} Min
Sunroof(x)
 {6_cyl(x), FWD(x), Sunroof(x)} Max
 {6_cyl(x), RWD(x), Sunroof(x)} Max
 {8_cyl(x), RWD(x), Sunroof(x)} Max We may take this index and include references to the entities belonging to each maximal satisfiable survey lattice element.

EXAMPLE 2

Index of Survey Lattice Elements and Their Entities by Predicate Satisfied 6_cyl(x)

Maximal Satisfiable
 {6_cyl(x), FWD(x), Sunroof(x)}

| 10123 | Eclipse |
| 11222 | Nissan |

{6_cyl(x), RWD(x), Sunroof(x)}

| 10135 | Porsche 911 |
| 38423 | Toyota |

Minimal Unsatisfiable
 {6_cyl(x), 8_cyl(x)}
8_cyl(x)
 Maximal Satisfiable
 {8_cyl(x), RWD(x), Sunroof(x)}

| 63225 | Aston Martin |
| 89725 | Jaguar |
| 42895 | Lexus |

Minimal Unsatisfiable
 {6_cyl(x), 8_cyl(x)}
 {8_cyl(x), FWD(x)}
FWD(x)
 Maximal Satisfiable
 {6_cyl(x), FWD(x), Sunroof(x)}

| 10123 | Eclipse |
| 11222 | Nissan |

Minimal Unsatisfiable
   {8_cyl(x), FWD(x)}
   {FWD(x), RWD(x)}
RWD(x)
   Maximal Satisfiable
      {6_cyl(x), RWD(x), Sunroof(x)}

| | |
|---|---|
| 10135 | Porsche 911 |
| 38423 | Toyota |

{8_cyl(x), RWD(x), Sunroof(x)}

| | |
|---|---|
| 63225 | Aston Martin |
| 89725 | Jaguar |
| 42895 | Lexus |

Minimal Unsatisfiable
   {FWD(x), RWD(x)}
Sunroof(x)
   Maximal Satisfiable
      {6_cyl(x), FWD(x), Sunroof(x)}

| | |
|---|---|
| 10123 | Eclipse |
| 11222 | Nissan |

{6_cyl(x), RWD(x), Sunroof(x)}

| | |
|---|---|
| 10135 | Porsche 911 |
| 38423 | Toyota |

{8_cyl(x), RWD(x), Sunroof(x)}

| | |
|---|---|
| 63225 | Aston Martin |
| 89725 | Jaguar |
| 42895 | Lexus |

EXAMPLE 3

Augmenting a Conventional Index

Furthermore, we may use this index to augment a conventional inverted index of an information resource. First we present a conventional index of the Sports Car information resource, indexed by satisfied predicate. These same augmentation methods may be applied using predicate lattices and their elements

| Conventional index | |
|---|---|
| 6_cyl(x) | 10123 Eclipse |
| | 10135 Porsche 911 |
| | 11222 Nissan |
| | 38423 Toyota |
| 8_cyl(x) | 20728 Corvette |
| | 20729 Corvette |
| | 70291 Firebird |
| | 63225 Aston Martin |
| | 89724 Jaguar |
| | 89725 Jaguar |
| | 42895 Lexus |
| FWD(x) | 10123 Eclipse |
| | 11222 Nissan |
| RWD(x) | 20728 Corvette |
| | 20729 Corvette |
| | 70291 Firebird |
| | 63225 Aston Martin |
| | 10135 Porsche 911 |
| | 38423 Toyota |
| | 89724 Jaguar |
| | 89725 Jaguar |
| | 42895 Lexus |
| Sunroof(x) | 10123 Eclipse |
| | 63225 Aston Martin |
| | 10135 Porsche 911 |
| | 11222 Nissan |
| | 38423 Toyota |
| | 89725 Jaguar |
| | 42895 Lexus |

Next, we present the index augmented with survey lattice elements.

| Augmented Conventional Index | |
|---|---|
| 6_cyl(x) | 10123 Eclipse |
| | 10135 Porsche 911 |
| | 11222 Nissan |
| | 38423 Toyota |
| | Maximal Satisfiable |
| |   {6_cyl(x), FWD(x), Sunroof(x)} |
| |     10123 Eclipse |
| |     11222 Nissan |
| |   {6_cyl(x), RWD(x), Sunroof(x)} |
| |     10135 Porsche 911 |
| |     38423 Toyota |
| | Minimal Unsatisfiable |
| |   {6_cyl(x), 8_cyl(x)} |
| 8_cyl(x) | 20728 Corvette |
| | 20729 Corvette |
| | 70291 Firebird |
| | 63225 Aston Martin |
| | 89724 Jaguar |
| | 89725 Jaguar |
| | 42895 Lexus |
| | Maximal Satisfiable |
| |   {8_cyl(x), RWD(x), Sunroof(x)} |
| |     63225 Aston Martin |
| |     89725 Jaguar |
| |     42895 Lexus |
| | Minimal Unsatisfiable |
| |   {6_cyl(x), 8_cyl(x)} |
| |   {8_cyl(x), FWD(x)} |
| FWD(x) | 10123 Eclipse |
| | 11222 Nissan |
| | Maximal Satisfiable |
| |   {6_cyl(x), FWD(x), Sunroof(x)} |
| |     10123 Eclipse |
| |     11222 Nissan |
| | Minimal Unsatisfiable |
| |   {8_cyl(x), FWD(x)} |
| |   {FWD(x), RWD(x)} |
| RWD(x) | 20728 Corvette |
| | 20729 Corvette |
| | 70291 Firebird |
| | 63225 Aston Martin |
| | 10135 Porsche 911 |
| | 38423 Toyota |
| | 89724 Jaguar |
| | 89725 Jaguar |
| | 42895 Lexus |

-continued

| Augmented Conventional Index |
|---|
| Sunroof(x)     Maximal Satisfiable<br>         {6_cyl(x), RWD(x), Sunroof(x)}<br>            10135 Porsche 911<br>            38423 Toyota<br>         {8_cyl(x), RWD(x), Sunroof(x)}<br>            63225 Aston Martin<br>            89725 Jaguar<br>            42895 Lexus<br>    Minimal Unsatisfiable<br>         {FWD(x), RWD(x)}<br>            10123 Eclipse<br>            63225 Aston Martin<br>            10135 Porsche 911<br>            11222 Nissan<br>            38423 Toyota<br>            89725 Jaguar<br>            42895 Lexus<br>    Maximal Satisfiable<br>         {6_cyl(x), FWD(x), Sunroof(x)}<br>            10123 Eclipse<br>            11222 Nissan<br>         {6_cyl(x), RWD(x), Sunroof(x)}<br>            10135 Porsche 911<br>            38423 Toyota<br>         {8_cyl(x), RWD(x), Sunroof(x)}<br>            63225 Aston Martin<br>            89725 Jaguar<br>            42895 Lexus |

EXAMPLE 4

Augmenting Conceptual Structures and Category Systems

Another application is to associate survey lattice elements to a conventional conceptual structure or category system, such as an ontology, taxonomy, semantic network, topic map, or conceptual graph, noting that this method may also associate predicate lattice elements to a conceptual structure of category system.

Conceptual Structure Augmented with Maximal Satisfiable Survey Lattice Elements

Figure 14:
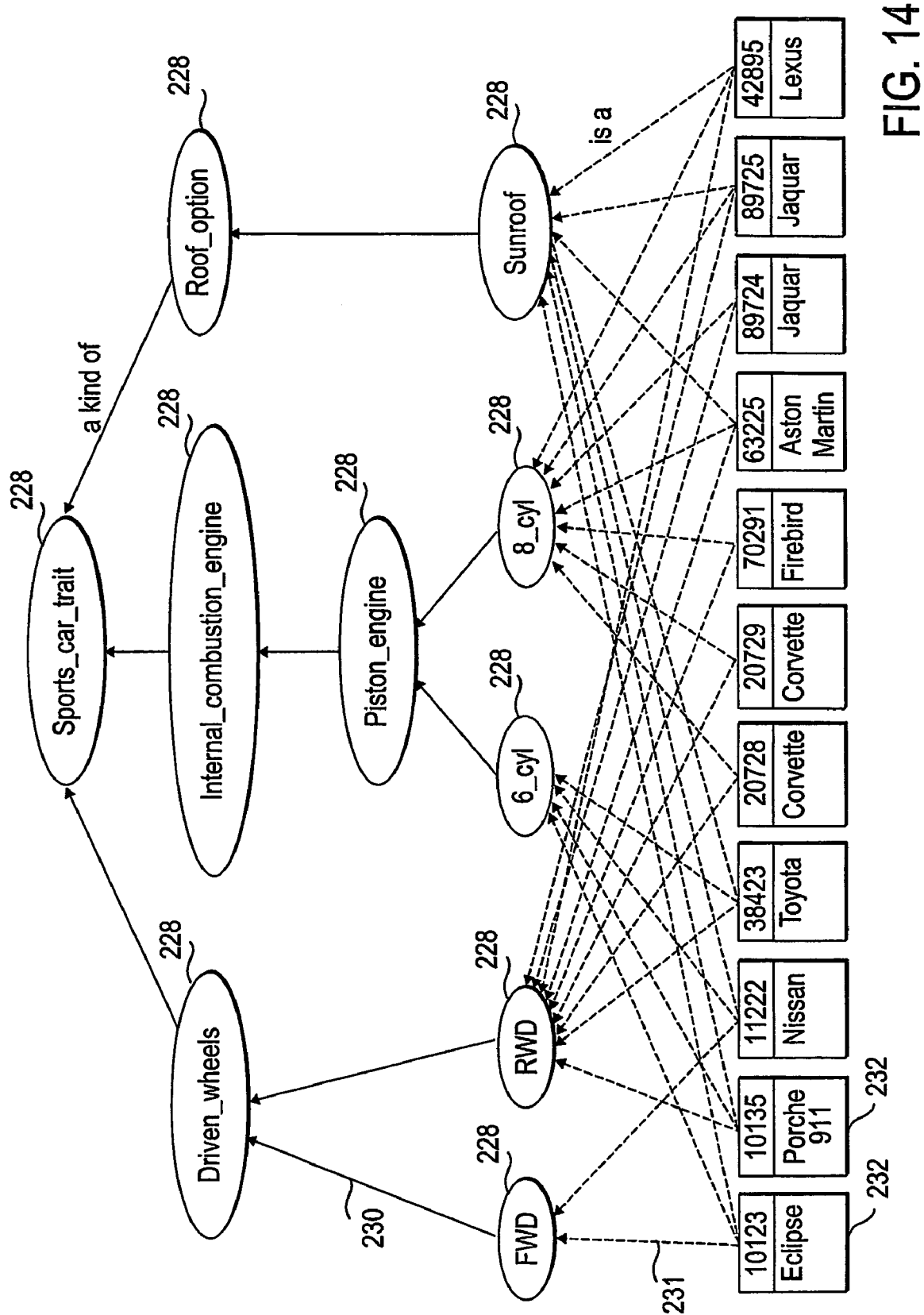
FIG. 14 is a diagrammatic representation of a conventional conceptual structure with instance data, according to one embodiment of the present invention.
Figure 15:
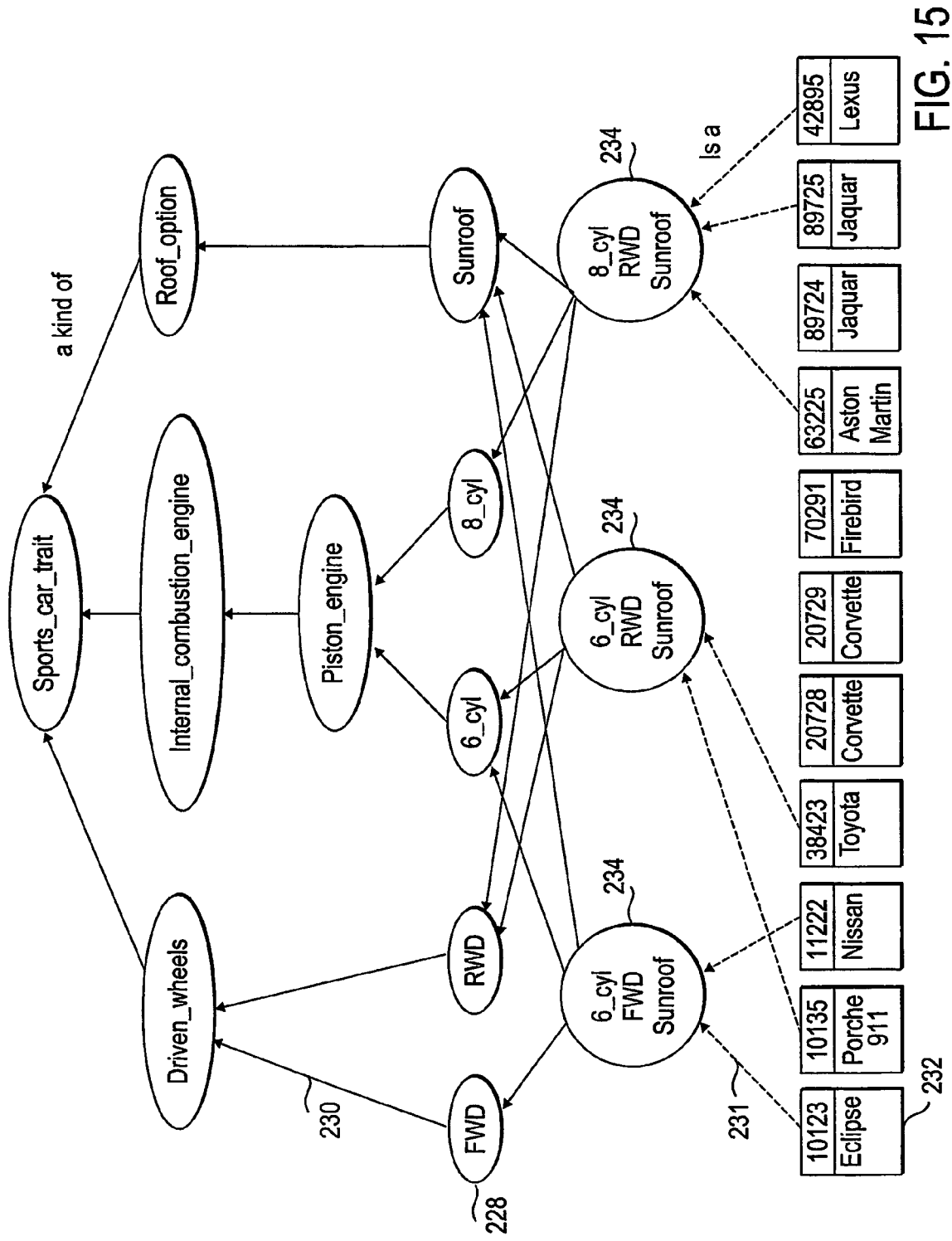
FIG. 15 is a diagrammatic representation of a conceptual structure with instance data, augmented with maximal satisfiable survey lattice elements, according to one embodiment of the present invention.

FIG. 14 represents a conventional conceptual structure of nodes 228, relationships 230 and 231, and instance data 232. Referring to FIG. 15, the same conceptual structure is augmented with maximal satisfiable survey lattice elements 234 added as nodes. Conceptual structures that admit to and support exceptions (e.g., non-monotonic logic and defeasible reasoning systems) may also be augmented with minimal unsatisfiable survey lattice elements as nodes and exception links used to represent that a minimal unsatisfiable survey lattice element does not inherit from certain other nodes.

Figure 16:
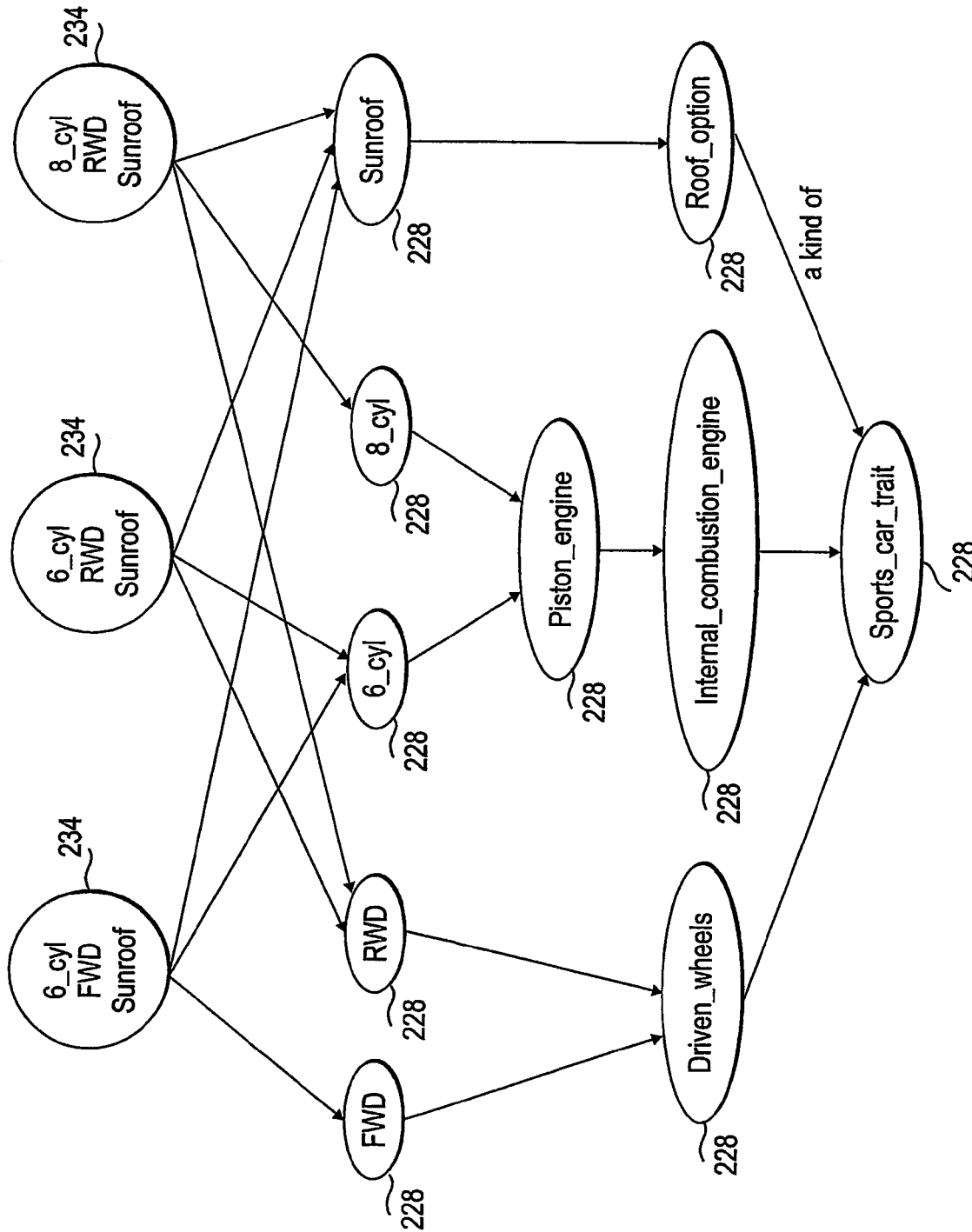
FIG. 16 is a diagrammatic representation of an augmented conceptual structure reorganized around the survey lattice elements, according to one embodiment of the present invention.

In these exemplary applications, the augmented conceptual structure may be reorganized around the survey lattice elements to enhance presentation, navigation, and general utilization of the conceptual structure. For example, referring to FIG. 16, one may "pick up" an augmented conceptual structure by its survey lattice elements 234 and use these as access paths to concepts 228 and their corresponding instances.

Optimizations in Using Survey Lattices

The exemplary method of generating survey lattice elements presented earlier utilizes facts, where a point of evidence substantiates the satisfiability of a predicate or its functional equivalent. Performance in generating survey lattice elements may be improved by forming and maintaining specific machine-readable data structures that capture facts and applying these in the generation of survey lattice elements.

We call such a structure a fact structure. A scenario where this is particularly valuable is where a survey niche is formed around user input, such as a command or request, and the survey may be generated for that niche. We now provide several examples that illustrate this concept. Again, these same methods may be applied in generating predicate lattices and their elements, not just in generating survey lattices and survey lattice elements.

Our first two examples use the sports car information resource. In the first example, we assemble a fact table (a tabular fact structure), sort it on satisfied predicate, and employ it as an index structure with which to find all points of evidence that satisfy a given predicate. This same information may be stored in other forms and utilized to the same ends, for example, as a B-tree index or a hash table.

Given a fact table as a starting point, the method of generating survey lattice elements may proceed to the grouping operation in order to identify satisfiable survey lattice elements, and the remainder of the method to identify maximal satisfiable survey lattice elements. Note that an inverted index, such as in example 3 of the section "An index of survey lattice elements", may serve as a fact table.

EXAMPLE 1

Fact Table as Index

| Satisfied Predicate | Evidence key |
|---|---|
| 6_cyl(x) | 10123 |
|  | 10135 |
|  | 11222 |
|  | 38423 |
| 8_cyl(x) | 20728 |
|  | 20729 |
|  | 70291 |
|  | 63225 |
|  | 89724 |
|  | 89725 |
|  | 42895 |
| FWD(x) | 10123 |
|  | 11222 |
| RWD(x) | 20728 |
|  | 20729 |
|  | 70291 |
|  | 63225 |
|  | 10135 |
|  | 38423 |
|  | 89724 |
|  | 89725 |
|  | 42895 |
| Sunroof(x) | 10123 |
|  | 63225 |
|  | 10135 |
|  | 11222 |
|  | 38423 |
|  | 89725 |
|  | 42895 |

EXAMPLE 2

Maximal Satisfiable Fact Table as Index

In the second example, the maximal satisfiable survey lattice elements have been formed and are used to form a condensed fact table, where maximal satisfiable survey lattice elements are used as points of evidence for the satisfiability of a predicate or its equivalent. It is used just as it is in the first example as regards the method of generating survey lattice elements. As in the first example, this same information may be stored in forms other than a table.

This structure may optionally be supplemented with a third column that provides the evidence keys for each maximal satisfiable survey lattice element. The supplemented table will have additional rows as well—one row for each evidence key belonging to a maximal satisfiable survey lattice element that includes a satisfied predicate.

| Satisfied Predicate | Maximal satisfiable survey lattice element ID |
|---|---|
| 6_cyl(x) | 1 |
|  | 3 |
| 8_cyl(x) | 2 |
| FWD(x) | 1 |
| RWD(x) | 2 |
|  | 3 |
| Sunroof(x) | 1 |
|  | 2 |
|  | 3 |

In both of these examples, computation and storage have been applied in advance of need in order to reduce computation during interactive surveying, effectively shifting load. Note that the maximal satisfiable fact table as index is less than one third the size of the fact table as index presented in the first example, significantly reducing storage used for the fact structure and reducing computation when the table is utilized.

The amount of computation and storage that is shifted can be adjusted by the choice of predicates upon which the facts are based. Range value, set value, and abstract (semantic) predicates can stand in for potentially many single value predicates. The use of such predicates in a fact table means that less storage and computation is utilized in advance, deferring more computation—but not all—till later. We now provide a basic example of this.

EXAMPLE 3

Indexing Range, Set, and Abstract Predicates for Survey Lattices

For this example we shift to a different data set, as seen below, capturing automobile performance data on fuel economy and acceleration.

| Entity_key | EPA_City | 0-60 MPH |
|---|---|---|
| 30925 | 25 MPG | 8.4 sec |
| 44942 | 20 | 9.5 |
| 44973 | 40 | 12.7 |
| 55525 | 18 | 6.9 |
| 64312 | 14 | 4.2 |
| 78794 | 32 | 10.7 |
| 87463 | 18 | 7.2 |
| 92726 | 17 | 7.4 |
| 92727 | 16 | 6.3 |

While it is possible to create single value predicates to represent this data, for this example we instead form the following set of range value predicates and abbreviate them as indicated.

10 mpg<EPA_City(x)<=15 mpg, abbreviated as 10-15 MPG (x)

15 mpg<EPA_City(x)<=20 mpg, abbreviated as 15-20 MPG (x)

20 mpg<EPA_City(x)<=25 mpg, abbreviated as 20-25 MPG (x)

25 mpg<EPA_City(x)<=30 mpg, abbreviated as 25-30 MPG (x)

30 mpg<EPA_City(x)<=40 mpg, abbreviated as 30-40 MPG (x)

3 sec<0-60 MPH(x)<=5, abbreviated as 3-5 to 60(x)

5 sec<0-60 MPH(x)<=7, abbreviated as 5-7 to 60(x)

7 sec<0-60 MPH(x)<=10, abbreviated as 7-10 to 60(x)

10 sec<0-60 MPH(x)<=15, abbreviated as 10-15 to 60(x)

Next, we derive the fact table for these entities and their performance data based on this set of range predicates.

| Satisfied Predicate | Entity_key |
|---|---|
| 10-15MPG(x) | 64312 |
| 15-20MPG(x) | 44942 |
|  | 55525 |
|  | 87463 |
|  | 92726 |
|  | 92727 |
| 20-25MPG(x) | 30925 |
| 25-30MPG(x) |  |
| 30-40MPG(x) | 44973 |
|  | 78794 |
| 3-5to60(x) | 64312 |
| 5-7to60(x) | 55525 |
|  | 92727 |
| 7-10to60(x) | 30925 |
|  | 44942 |
|  | 87463 |
|  | 92726 |
| 10-15to60(x) | 44973 |
|  | 78794 |

In passing we note that we equally well could have used set value predicates, e.g., "EPA_City(x) in (16 MPG, 17 MPG, 18 MPG)" and/or abstract predicates, e.g., Miser(x), Gas_hog (x), and Speed_demon(x).

Proceeding by the method described earlier, from the fact table one may derive the satisfiable survey lattice elements and the maximal satisfiable survey lattice elements, as can be seen below.

| Maximal satisfiable survey lattice element ID | Satisfied Predicate |
|---|---|
| 1 | 20-25MPG(x) |
| 1 | 7-10to60(x) |
| 2 | 15-20MPG(x) |
| 2 | 7-10to60(x) |
| 3 | 30-40MPG(x) |
| 3 | 10-15to60(x) |
| 4 | 15-20MPG(x) |
| 4 | 5-7to60(x) |
| 5 | 10-15MPG(x) |
| 5 | 3-5to60(x) |

It is also possible to join maximal satisfiable survey lattice elements to reduce their number. For instance, the maximal element {20-25 MPG(x), 7-10 to 60(x)} may be joined with the maximal element {15-20 MPG(x), 7-10 to 60(x)} to produce the more general maximal element {15-25 MPG(x), 7-10 to 60(x)}, but doing so also reduces the specificity.

One may equally use a range, set, and/or abstract predicate based fact table to determine the satisfiability of one or more survey lattice elements by finding facts that support them.

The discussion now turns to what happens when one needs to determine the satisfiability of a survey lattice element that is not based on exactly the same set of predicates that the fact table is based on (e.g., is the survey lattice element {17<EPA_City(x), 0-60 MPH<7 sec} satisfiable?).

The full data set need not be consulted in such an instance. Instead, one may selectively choose and combine entries in the fact table to reduce the overall effort. In this instance the entries for 15-20 MPG(x), 20-25 MPG(x), 30-40 MPG(x), 3-5 to 60(x), and 5-7 to 60(x) may be employed to create a "short list" of potential points of evidence. These are only potential points of evidence as the ranges so constructed include values not in the given survey lattice element, e.g., MPG between 15 and 17 and 0-60 of exactly 7 sec. The entities possessing such values, such as the entity with key 92727, may be removed from consideration. The source data for only the entities in this short list is then interrogated to reduce the potential points of evidence to the actual points, if any. This identifies the entity with key 55525 as a point of evidence that the given survey lattice element is indeed satisfiable.

With the survey method, it is also possible to employ transformation of the survey niche (see the section on transformation) to take a set of predicates for which a fact structure is not available and transform the set, in whole or in part, into a set for which a fact structure is available, thus enabling the fact table's employment to reduce overall computation.

EXAMPLE 4

Employing Bitmap Indexes with Survey Lattices

Bitmap indexes, supported by the major relational database and data warehousing products, are another means of tuning the storage/computation trade-off. A bitmap index on an attribute delineates all distinct values the attribute takes on and records the distinct value for each entity so attributed. Below we illustrate a bitmap index on the "Drive layout" attribute of the sports car information resource.

| Bitmap index on Drive_layout of the sports car information resource | | | | | | | | | | | |
|---|---|---|---|---|---|---|---|---|---|---|---|
| Drive | 10123 | 20728 | 20729 | 70291 | 63225 | 10135 | 11222 | 38423 | 89724 | 89725 | 42895 |
| FWD | 1 | 0 | 0 | 0 | 0 | 0 | 1 | 0 | 0 | 0 | 0 |
| RWD | 0 | 1 | 1 | 1 | 1 | 1 | 0 | 1 | 1 | 1 | 1 |

A bitmap index is typically used to speed retrieval of data entities based on a query condition. Were one to employ a SQL query with the phrase "and Drive_layout='FWD'" as part of its WHERE clause then the bitmap index can improve selectivity by retrieving only those rows that have a "1" in the row for the FWD value of the Drive_layout attribute.

One can create such a bitmap index on each predicate in the set of predicates upon which a survey lattice is based. We now create a bitmap index on each predicate in the sports car information resource. For convenience and simplicity of illustration, we bring together these separate bitmap indexes into one table below.

| Consolidated bitmap index on all attributes of the sports car information resource | | | | | | | | | | | | |
|---|---|---|---|---|---|---|---|---|---|---|---|---|
| Attribute | Value | 10123 | 20728 | 20729 | 70291 | 63225 | 10135 | 11222 | 38423 | 89724 | 89725 | 42895 |
| #_cyl. | 6 | 1 | 0 | 0 | 0 | 0 | 1 | 1 | 1 | 0 | 0 | 0 |
| #_cyl. | 8 | 0 | 1 | 1 | 1 | 1 | 0 | 0 | 0 | 1 | 1 | 1 |
| Drive | FWD | 1 | 0 | 0 | 0 | 0 | 0 | 1 | 0 | 0 | 0 | 0 |
| Drive | RWD | 0 | 1 | 1 | 1 | 1 | 1 | 0 | 1 | 1 | 1 | 1 |
| Sunroof | Y | 1 | 0 | 0 | 0 | 1 | 1 | 1 | 1 | 0 | 1 | 1 |
| Sunroof | N | 0 | 1 | 1 | 1 | 0 | 0 | 0 | 0 | 1 | 0 | 0 |

Multiple bitmap indexes may be employed together, so long as they index the same set of data entities (the same tuples, in the case of a relation). When multiple bitmap indexes are employed in the same retrieval operation the appropriate rows of the index may be logically combined. For instance, execution of a SQL statement with a WHERE clause including the phrase "and Drive_layout='FWD' and #_cyl=6" can logically AND the bitmap index row for the FWD value of Drive_layout with the bitmap index row for 6 value of the #_cyl., the resulting row having a bit value of 1 only for those tuples satisfying both conditions, e.g., the tuple with key=123.

This approach may be used to determine the satisfiability of any survey lattice element, but we can do better with a simple reorganization. We note that one may treat such a consolidated bitmap as a matrix and perform a transposition operation on it, interchanging columns with rows, as is seen below. From an information-theoretic point of view the resulting transpose is equivalent to the un-transposed form, representing the same facts.

| Transposed consolidated bitmap index on sports car information resource | | | | | | |
|---|---|---|---|---|---|---|
| Attribute | #_cyl. | #_cyl. | Drive | Drive | Sunroof | Sunroof |
| Value | 6 | 8 | FWD | RWD | Y | N |
| 10123 | 1 | 0 | 1 | 0 | 1 | 0 |
| 20728 | 0 | 1 | 0 | 1 | 0 | 1 |

-continued

Transposed consolidated bitmap index on sports car information resource

| Attribute | #_cyl. | #_cyl. | Drive | Drive | Sunroof | Sunroof |
|---|---|---|---|---|---|---|
| 20729 | 0 | 1 | 0 | 1 | 0 | 1 |
| 70291 | 0 | 1 | 0 | 1 | 0 | 1 |
| 63225 | 0 | 1 | 0 | 1 | 1 | 0 |
| 10135 | 1 | 0 | 0 | 1 | 1 | 0 |
| 11222 | 1 | 0 | 1 | 0 | 1 | 0 |
| 38423 | 1 | 0 | 0 | 1 | 1 | 0 |
| 89724 | 0 | 1 | 0 | 1 | 0 | 1 |
| 89725 | 0 | 1 | 0 | 1 | 1 | 0 |
| 42895 | 0 | 1 | 0 | 1 | 1 | 0 |

The transpose consolidated bitmap index can be used to enumerate the maximal satisfiable survey lattice elements. We first project the right-most column away, create a virtual column as the numerical sum (not logical sum) of the bit values, and sort the entity rows in descending order by bit sum.

| Attribute | #_cyl. | #_cyl. | Drive | Drive | Sunroof | Bit sum |
|---|---|---|---|---|---|---|
| Value | 6 | 8 | FWD | RWD | Y | na |
| 10123 | 1 | 0 | 1 | 0 | 1 | 3 |
| 63225 | 0 | 1 | 0 | 1 | 1 | 3 |
| 10135 | 1 | 0 | 0 | 1 | 1 | 3 |
| 11222 | 1 | 0 | 1 | 0 | 1 | 3 |
| 38423 | 1 | 0 | 0 | 1 | 1 | 3 |
| 89725 | 0 | 1 | 0 | 1 | 1 | 3 |
| 42895 | 0 | 1 | 0 | 1 | 1 | 3 |
| 20728 | 0 | 1 | 0 | 1 | 0 | 2 |
| 20729 | 0 | 1 | 0 | 1 | 0 | 2 |
| 70291 | 0 | 1 | 0 | 1 | 0 | 2 |
| 89724 | 0 | 1 | 0 | 1 | 0 | 2 |

Next, we project away entity keys and enforce tuple uniqueness (e.g., relational first normal form).

| #_cyl. | #_cyl. | Drive | Drive | Sunroof | Bit sum |
|---|---|---|---|---|---|
| 6 | 8 | FWD | RWD | Y | na |
| 1 | 0 | 1 | 0 | 1 | 3 |
| 0 | 1 | 0 | 1 | 1 | 3 |
| 1 | 0 | 0 | 1 | 1 | 3 |
| 0 | 1 | 0 | 1 | 0 | 2 |

We then select away all tuples that we call contained tuples. A contained tuple has a bit sum strictly less than the bit sum of another tuple, called a containing tuple, and the logical AND of the contained tuple with the bit array of the containing tuple equals the bit array of the contained tuple. For instance, the bit array (0 1 0 1 0) is a contained tuple as it has a bit sum of 2 while the bit array (0 1 0 1 1) has a bit sum of 3, and the logical AND of the two bit maps is (0 1 0 1 0), the same as the contained tuple.

| #_cyl. | #_cyl. | Drive | Drive | Sunroof | Bit sum |
|---|---|---|---|---|---|
| 6 | 8 | FWD | RWD | Y | na |
| 1 | 0 | 1 | 0 | 1 | 3 |
| 0 | 1 | 0 | 1 | 1 | 3 |
| 1 | 0 | 0 | 1 | 1 | 3 |

This reduced transposed consolidated bitmap index identifies all 3 maximal satisfiable lattice elements. Furthermore, we can identify these by unique identifier (which we assign so as to match the IDs assigned earlier to the maximal satisfiable elements).

| Element ID | #_cyl. | #_cyl. | Drive | Drive | Sunroof |
|---|---|---|---|---|---|
| na | 6 | 8 | FWD | RWD | Y |
| 1 | 1 | 0 | 1 | 0 | 1 |
| 3 | 0 | 1 | 0 | 1 | 1 |
| 2 | 1 | 0 | 0 | 1 | 1 |

By matching these bit arrays against the unreduced consolidated bitmap index entries, we may identify the entity keys for each maximal satisfiable survey lattice element. Thus, bitmap index technology can be employed to determine satisfiability of arbitrary survey lattice elements, but may also be employed to determine the maximal satisfiable survey lattice elements. Once again, these methods are equally applicable to predicate lattices and their elements.

EXAMPLE 5

Bitmap Index of Maximal Satisfiable Survey Lattice Elements

If we do a second matrix transpose on this array, we get what looks to be a conventional bitmap index, but it is in fact something novel—a bitmap index of the maximal satisfiable survey lattice elements (compared with a conventional bitmap index that indexes entities). This index can be used to rapidly identify the maximal survey lattice elements within a survey niche.

Bitmap index of maximal satisfiable survey lattice elements

| Element ID | na | 1 | 3 | 2 |
|---|---|---|---|---|
| #_cyl. | 6 | 1 | 0 | 1 |
| #_cyl. | 8 | 0 | 1 | 0 |
| Drive | FWD | 1 | 0 | 0 |
| Drive | RWD | 0 | 1 | 1 |
| Sunroof | Y | 1 | 1 | 1 |

Note that this bitmap index of maximal satisfiable survey lattice elements can be formed from a standard bitmap index, as we have just exemplified, but it may also be constructed directly from a previous enumeration of the maximal satisfiable survey lattice elements by reorganization.

While our bitmap examples have employed single value predicates, the methods may utilize predicates of any and all types, including range, set, and abstract (semantic).

Also note that a similar structure may be formed to index the minimal unsatisfiable survey lattice elements, though in that case a bit value of 1 indicates that a minimal unsatisfiable survey lattice element does not attain the value of the attribute (or satisfy the predicate).

Furthermore, although in the last two examples we began with a consolidated bitmap index, one could equally well have begun with data represented in standard relations and/or views (relational, object, or aspect), derived the data structures from these that resulted in our example from transposing the consolidated bitmap index, and then proceeding as we have illustrated. Similarly, one need not strictly follow the procedure above as numerous sequences of similar operations perform the same novel function.

EXAMPLE 6

Employing a Bitmap Index with a Topological Theme Survey Method

Let us say a user initializes a survey niche by providing a set of predicates (A(x), B(x), C(x), D(x)), and the survey method performs transformation on this set, resulting in the set of predicates (A(x), B(x), D(x), G(x)). Furthermore, for the purposes of this example, a bitmap index of maximal satisfiable survey lattice elements is available, based on a set of predicates formed from all distinct values of all attributes on the information resource. The user supplied set of predicates, as well as the transformed set, are both proper subsets of this much larger set of predicates.

One can consult the bitmap index of all maximal satisfiable survey lattice elements, a consultation that is simplified if it is expressed in a certain way. For example, consider the table below depicting just a small portion of a such a bitmap index, with maximal satisfiable survey lattice elements as tuples and predicates as columns (this is a transposed bitmap index of maximal satisfiable survey lattice elements). For the purposes of this discussion, we will assume that the portion of the index that is visible below reveals all maximal satisfiable survey lattice elements for which any of the predicates A(x), B(x), D(x), or G(x)=1.

| Element ID | A(x) | B(x) | C(x) | D(x) | E(x) | F(x) | G(x) | ... |
|---|---|---|---|---|---|---|---|---|
| 1 | 1 | 0 | 0 | 0 | 1 | 0 | 1 | |
| 2 | 0 | 1 | 1 | 0 | 1 | 1 | 1 | |
| 3 | 1 | 0 | 1 | 0 | 0 | 1 | 1 | |
| 4 | 1 | 0 | 1 | 1 | 1 | 1 | 0 | |
| 5 | 0 | 0 | 1 | 1 | 0 | 1 | 0 | |
| ... | | | | | | | | |

The goal of using this index is to find the maximal satisfiable survey lattice elements for the transformed set of predicates with less work than doing so from scratch. To use this as an index for this purpose we can treat the transposed bitmap index as not just a set, but also as a relation.

We start by projecting the relation on columns A, B, D, and G, selecting only those tuples for which the numerical sum A+B+D+G<>0, and sorting in descending order based on the sum A+B+D+G, with the result below. For the purposes of this example we will show a calculated column that presents the sum.

| Element ID | A(x) | B(x) | D(x) | G(x) | Sum |
|---|---|---|---|---|---|
| 1 | 1 | 0 | 0 | 1 | 2 |
| 2 | 0 | 1 | 0 | 1 | 2 |
| 3 | 1 | 0 | 0 | 1 | 2 |
| 4 | 1 | 0 | 0 | 0 | 1 |
| 5 | 0 | 0 | 1 | 0 | 1 |

We may also consolidate, as Element 1 is identical to Element 3 (following the projection). To do this we project on A, B, D, and G only, omitting the unique identifier. Since the result of the projection may be a relation, and relations admit no duplicate tuples, we obtain the result below.

| A(x) | B(x) | D(x) | G(x) | Sum |
|---|---|---|---|---|
| 1 | 0 | 0 | 1 | 2 |
| 0 | 1 | 0 | 1 | 2 |
| 1 | 0 | 0 | 0 | 1 |
| 0 | 0 | 1 | 0 | 1 |

We may now remove dominated tuples. In this example, the third tuple is dominated by the first tuple because the first tuple states that predicate A(x) can be satisfied, as does the third tuple, but provides additional information (that predicate G(x) can be satisfied as well, together with A(x)).

We can achieve the removal by selecting only those tuples for which, embodied in SQL, a correlated subquery returns no tuples whose sum exceeds the sum of the outer query tuple's sum and logically ANDing together the inner query tuple with the outer query tuple (on a column by column basis) produces the inner query tuple.

Let's consider this tuple by tuple.
The outer query first looks at tuple 1. The inner query finds no tuples whose sum exceeds the sum of tuple 1. So tuple 1 is returned.
The outer query next looks at tuple 2. Once again, the inner query finds no tuples whose sum exceeds the sum of tuple 2. So tuple 2 is returned.
The outer query now looks at tuple 3. The inner query finds two tuples whose sum exceeds the sum of tuple 3, namely tuple 1 and tuple 2. ANDing together tuple 3 with tuple 1 on a column by column basis produces tuple 1, meaning that tuple 3 is dominated by tuple 1. As the inner query has already found a qualifying tuple it is not necessary for it to look any further (specifically, to determine if tuple 2 dominates tuple 3). So the outer query does not return tuple 3.
The outer query now looks at tuple 4. The inner query finds two tuples whose sum exceeds the sum of tuple 4, namely tuple 1 and tuple 2. ANDing together tuple 4 with tuple 1 produces something new—it does not reproduce tuple 1, so tuple 1 does not dominate tuple 4. The inner query next ANDs together tuple 4 with tuple 2. This does not reproduce tuple 2, so tuple 2 does not dominate tuple 4. The inner query returns no tuples to the outer query so tuple 4 is returned by the outer query.

The resulting relation is seen below.

| A(x) | B(x) | D(x) | G(x) |
|---|---|---|---|
| 1 | 0 | 0 | 1 |
| 0 | 1 | 0 | 1 |
| 0 | 0 | 1 | 0 |

This table represents all maximal satisfiable survey lattice elements for the transformed set of predicates, derived from the bitmap index of all maximal satisfiable survey lattice elements. It was not necessary to perform any retrieval operations against the information resource directly, only against the bitmap index of maximal satisfiable survey lattice elements.

Transformation of a Set of Predicates for Surveys and Survey Lattices

A set of predicates or their functional equivalents is useful for forming survey partitions, including survey lattices and their elements. Recall that, within the survey methods presented earlier, a set of predicates represents the survey niche and a transformation operation transforms the set of predicates and may also transform survey monitors. We now examine various means and apparatus for conducting the transformation as well as important properties of said conduction, all of which may be employed singularly or in any of numerous combinations, said examination is indicative but not exhaustive.

Transformation may be embodied as multiple transformations, applied cumulatively, as a composite transformation, or sequentially.

Transformation may add predicates to the set of predicates, remove predicates from the set, modify predicates in the set, or any or all of these in combination. When a predicate is transformed the original may remain in the set and be supplemented by the transformed predicate, or the original may be replaced.

Transformation may be wholly deterministic, wholly non-deterministic, or partly deterministic and partly non-deterministic.

Transformation may take a single value into a range of values, into a set of values, or into another single value.

Transformation may take a range into another range (contained, containing, overlapping, or disjoint), into a set of values, or into a single value.

Transformation may take a set of values into a single value, a range, or another set of values.

Transformation may negate a predicate.

Transformation may take a data type into another data type, as in an integer to a floating point.

Transformation may bind a number of predicates into a compound predicate or resolve a compound predicate into single predicates or simpler compound predicates.

Transformation may apply semantic operators based on one or more conceptual structures, including but not limited to lexicons, thesauri, taxonomies, ontologies, conceptual graphs, topic maps, rule systems, schemas and metadata, semantic networks, frame systems, and high level models.

Transformation may be applied to survey monitors. Transformation may take a survey monitor into a predicate, or transform a predicate into a survey monitor.

Transformation by Generalization/Specialization

Figure 17:
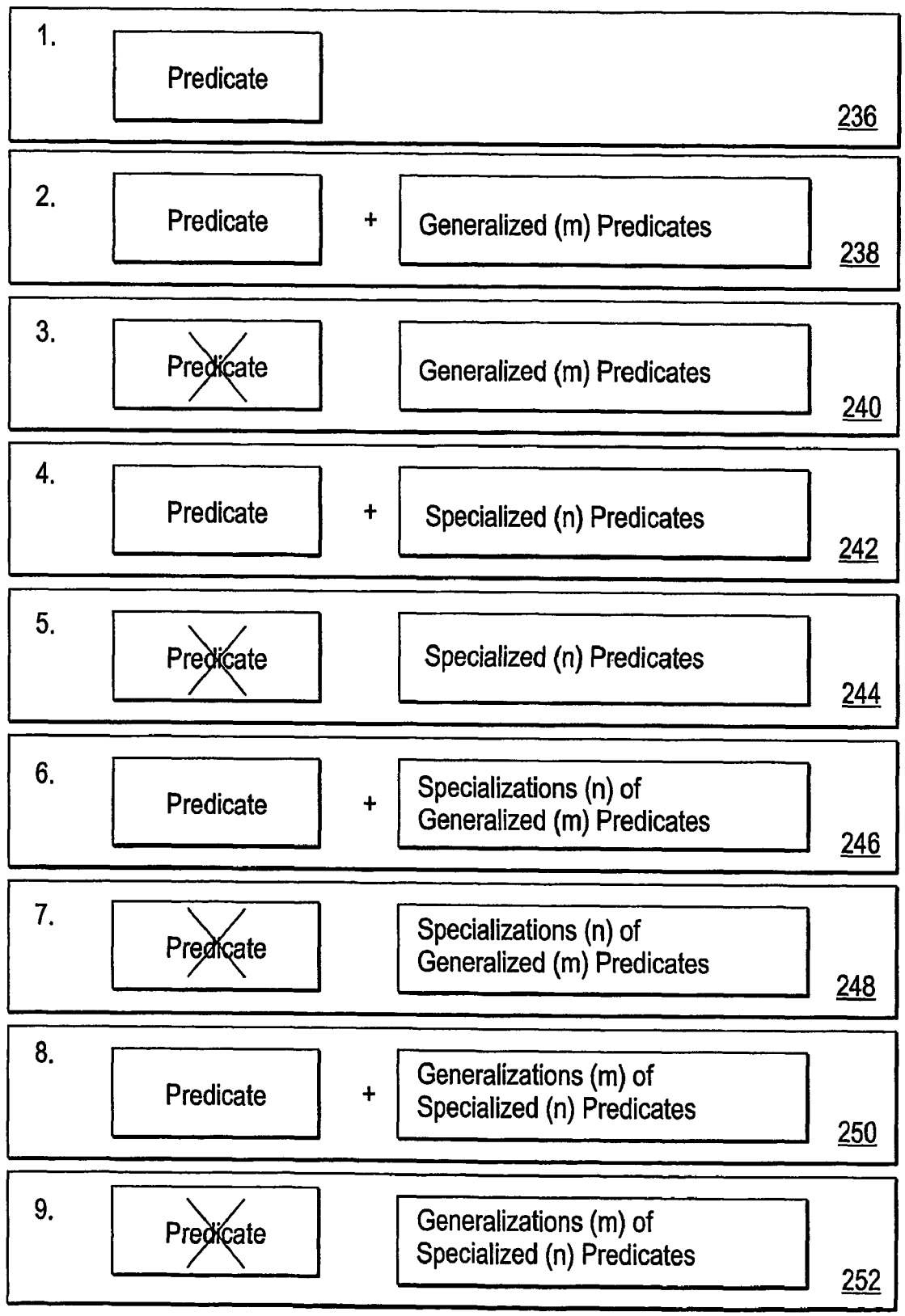
FIG. 17 is a diagrammatic representation of transformation methods using generalization and specialization, according to one embodiment of the present invention.

In one exemplary embodiment of the present invention, a class of semantic transformations is applying m levels of generalization and/or n levels of specialization, singularly or in numerous combinations. Referring to FIG. 17, block 236 is a predicate, block 238 is a combination of the predicate and a generalized predicate, block 240 is the generalized predicate, block 242 is the predicate and a specialized predicate, block 244 is the specialized predicate, block 246 is a predicate and a specialization of the generalized predicate, block 248 is the specialization of the generalized predicate, block 250 is a predicate and a generalization of the specialized predicate, and block 252 is the generalization of the specialized predicate.

Figure 18:
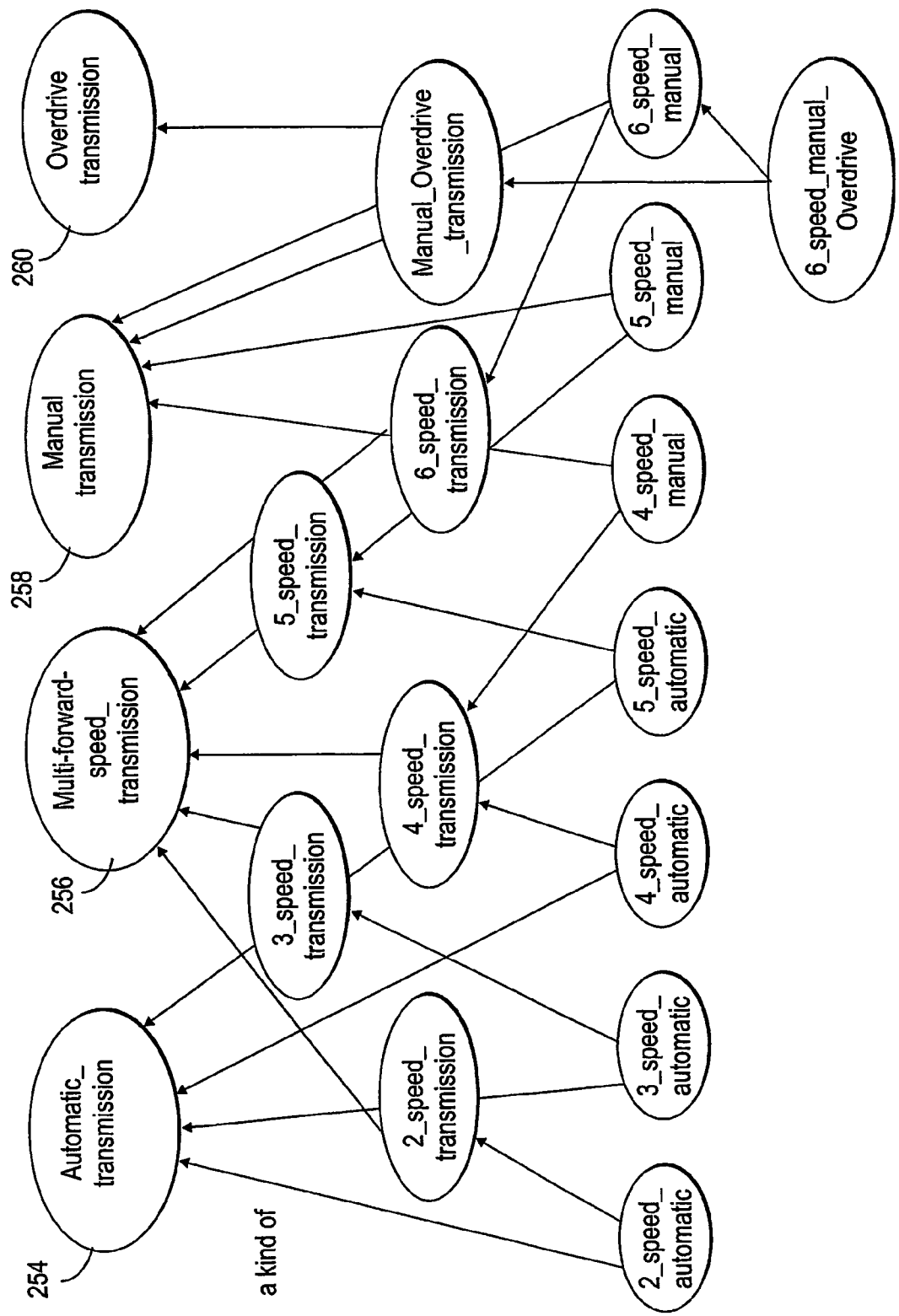
FIG. 18 is a diagrammatic representation of part of a taxonomy for generalization/specialization examples, according to one embodiment of the present invention.

FIG. 18 is an illustration of an exemplary taxonomy. Thus, node 254 "Automatic transmission" can be specialized as a "2_speed_automatic", a "3_speed_automatic", a "4_speed_automatic", and a "5_speed_automatic". Node 256 "Multi-forward-speed_transmission" can be specialized as a "2_speed_transmission", a "3_speed_transmission", a "4_speed_transmission", a "5_speed_transmission", and a "6_speed_transmission", as well as a "2_speed_automatic", a "3_speed_automatic", a "4_speed_automatic", a "5_speed_automatic", a "4_speed_manual", a "5_speed_manual", and a "6_speed_manual". Node 258 "Manual_transmission" can be specialized as a "Manual_Overdrive_transmission", a "4_speed_manual", a "5_speed_manual", a "6_speed_manual", and a "6_speed manual_Overdrive". Node 260 "Overdrive_transmission" can be specialized as a "Manual_Overdrive_transmission", and a "6_speed_manual_Overdrive". The examples below are based upon the exemplary taxonomy illustrated in FIG. 18.

EXAMPLES

1. Generalize(n) Predicates—Generalizes n Levels
   Generalize(1) [6_speed_manual_Overdrive(x)]= {6_speed_manual(x), Manual_Overdrive_transmission(x)}
   Generalize(2) [6_speed_manual_Overdrive(x)]= {6_speed_transmission(x), manual_transmission(x), Overdrive_transmission(x)}
2. Specialize(n) Predicates—Specializes n Levels
   Specialize(1) [manual_transmission(x)]={6_speed_manual(x), 5_speed_manual(x), 4_speed_manual(x), Manual_overdrive_transmission(x)}
3. Specialize(n) Generalize(m) Predicates—Generalizes First, Then Specializes the Generalization
   Specialize(1) generalize(1) [6_speed_manual(x)]= {6_speed_manual(x), 5_speed_manual(x), 4_speed_manual(x), Manual_overdrive_transmission(x)}
4. Generalize(m) Specialize(n) Predicates—Specializes First, Then Generalizes the Specializations
   Generalize(2) specialize(1) [6_speed_manual(x)]= {6_speed_transmission(x), manual_transmission(x), Overdrive_transmission(x)}

We note in passing that deterministic and non-deterministic transformation may be used together to produce a transformation that is partly deterministic and partly non-deterministic. The generalization of example 1 above takes a single predicate, 6_speed_manual_Overdrive(x), and transforms it into 2 predicates, 6_speed_manual(x) and Manual_Overdrive_transmission(x). A non-deterministic transformation operator combined with this generalization transformation operator could randomly choose one of these, say Manual_Overdrive_transmission(x). Alternatively, a non-deterministic transformation operator may randomly select a specialization transformation operator rather than a generalization transformation, or may randomly select the number of levels to generalize and or specialize (selected from some specified range).

Transformation of Merelogical Predicates

Transformation of merelogical predicates, often but not exclusively conducted by semantic operators, may take an assembly or aggregate into its subcomponents or subcomponent assemblies, or take a component or component assembly into an aggregate or assembly that contains it. Merelogical transformation may also transform the part-whole relationship by constraining or de-constraining it or qualifying or un-qualifying it.

EXAMPLES

1. The predicate part_of_shortblock(x) may be transformed into part_of_engine(x).
2. The predicate piston_assembly(x) may be transformed into piston_ring_set(x).
3. The predicate part_of_the_state(x) may be transformed into Western_part_of_the_state(x) or Largest_part_of_the_state(x).

Transformation of Relationships

Transformation of predicates that represent a general relationship may transform the relationship, the participant(s) in the relationship, and/or constrain or de-constrain or qualify or de-qualify the relationship. Relationships subject to transformation include but are not limited to spatial, geo-spatial, temporal, historical, geometrical, topological, algebraic, statistical, classical logical, non-classical logical, lexical, semantic, syntactic, philosophical, computational, psychological, biological, chemical, optical, astronomical, physical, electrical, sequential, parallel, and network.

EXAMPLES

1. The predicate less_than(x, y) may be transformed into greater_than_or_equal_to(x, y).
2. The predicate above(x) may be transformed into highest_above(x).
3. The predicate connected_to(x, y) may be transformed to rigidly_connected_to(x, y), fastened_to(x, y), not_connected_to(x, y), adjacent_to(x, y), bi-directionally_connected(x, y), and connected_to(y, x).

Transformation of Actions

Transformation of predicates that represent actions may transform the action, the participants in the action, and/or constrain or de-constrain or qualify or de-qualify the action.

EXAMPLE

The predicate torque_to__50_foot_pounds(x, y) may be transformed to MIG_Weld(x, y), or torque_to__60_foot_ pounds(x, y), or incrementally_torque_to__50_foot_ pounds(x, y), or torque_to__50_foot pounds(x, z).

Transformation to Meet a Goal

A method to transform a set of predicates such that the generated survey lattice possesses specified properties and conforms to specified criteria, comprising:

Transformation of a set of predicates such that the transformed set of predicates is not itself satisfiable.

Transformation of a set of predicates such that the number of minimal unsatisfiable survey lattice elements of the transformed survey lattice are bounded by an upper and/or a lower bound.

Transformation of a set of predicates such that the number of maximal satisfiable survey lattice elements of the transformed survey lattice are bounded by an upper and/or a lower bound.

Transformation of a set of predicates to partly or fully match a set of predicates for which survey lattice elements are already formed.

Transformation of a set of predicates to accomplish specific or general contraction, expansion, or shifting of the set of predicates.

Transformation of a set of predicates to achieve differentiation of partitions and entities.

Sources and Apparatus for Transformation

Sources and apparatus for conducting transformation may include but are not limited to any or all of the following, taken individually or in any and all combinations, singularly and in plural:

The interaction, input, selections, commands, peer-to-peer information, or profiles of user(s).

Figure 19:
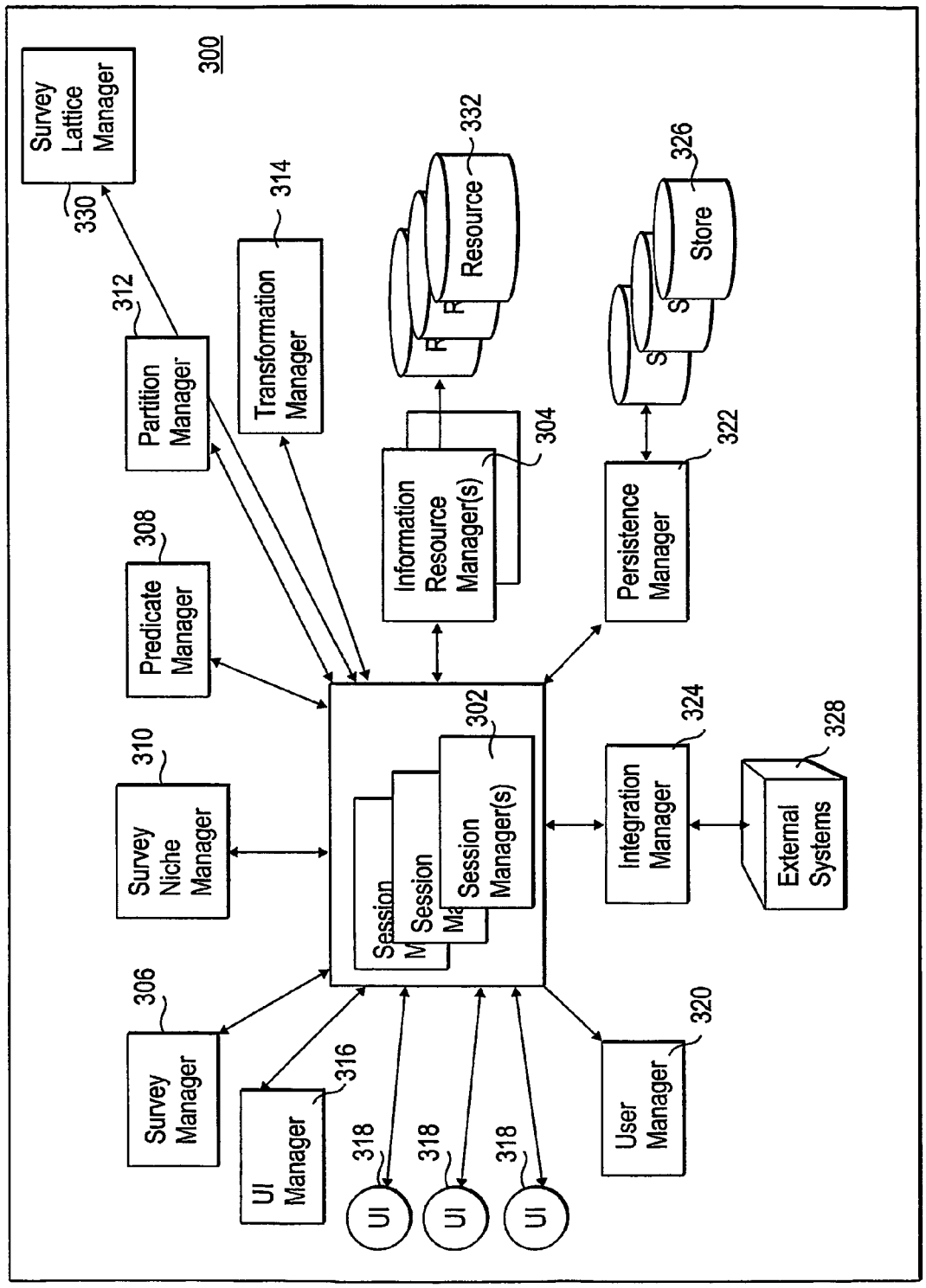
FIG. 19 is a diagrammatic representation of an apparatus for information surveying, according to one embodiment of the present invention.

1. Application of algorithmic, heuristic, connectionistic, random, stochastic, statistical, chaotic, non-deterministic, analog, and/or mathematical processes.
2. Application of knowledge discovery, data mining, evolutionary computation, and/or artificial neural network processing.
3. Application of physical processes, including electrical, mechanical, kinematic, quantum mechanical, optical, chemical, biochemical, biological, thermal, astronomical, and nuclear.
4. Application of a database, data warehouse, data mart, content repository, an unstructured data repository, an index, structured or unstructured file, a link base, a rules base, a knowledge base, or a case base.
5. Application of a semantic network, conceptual graph, topic map, schema and/or metadata, formal model, ontology, taxonomy, thesaurus, directory, or an artificial or natural neural network
6. Application of a symbolic inferencing process and/or output, including but not limited to deductive reasoning, inductive reasoning, abductive reasoning, and analogical reasoning.
7. Application of lexical analysis, including but not limited to latent semantic indexing.
8. Application of non-classical logic reasoning, case-based and/or memory-based reasoning.
9. Application of recommender knowledge or peer-to-peer information.
10. Application of topological and/or geometric information and/or processing.
11. Application of spatial information and/or processing, including but not limited to location, boundary, region, volume, path, subspace, or a plurality of locations, boundaries, regions, volumes, or paths.
12. Application of historical/temporal information and/or processing including but not limited to a temporal point, coordinate, or duration or a plurality and/or sequence of temporal points, coordinates, or durations A System and Apparatus for Knowledge and Information Surveying Referring to FIG. 19, reference numeral 300 generally indicates a system for surveying an information resource incorporating the principles of the invention, according to an exemplary embodiment of the present invention. System 300 may conveniently be referred to as a surveyor 300. The below described elements may be implemented as software modules and have been so identified merely to illustrate the functionality of an exemplary embodiment of the present invention.

System 300 may include a session manager 302 responsible for managing survey sessions and obtaining services from other managers; an information resource manager 304 responsible for connecting the surveyor with information resources; a survey manager 306 to maintain survey configuration information and manage the multiple generations of survey configuration; a predicate manager 308 to manage terms, concepts, and predicates; a survey niche manager 310 to maintain each individual generation of a survey niche; a partition manager 312, responsible for generating or retrieving partitions according to a survey niche and one or more information resources; a transformation manager 314, which is responsible for offering, selecting, and/or applying a transformation scenario to a survey niche; a user interface (UI) manager 316, responsible for creating and managing UI 318 displays and handling UI input.

The information resource manager 304 may be internal or external to the surveyor 300. In one exemplary embodiment, surveyor 300 may include an information resource manager 304 internal to the surveyor 300 as well as an information resource manager 304 external to the surveyor 300. The information resource manager 304 may be configured for (1)

acquiring information on entities and their satisfiable and unsatisfiable predicates, (2) determining satisfiability and unsatisfiability of predicates, (3) performing abstraction and meta-abstraction on predicates, and (4) sourcing general transformation(s) for predicates. Functions (1) and (2) may be performed on databases and inverted indexes over unstructured content. Functions (3) and (4) may be performed on, e.g., database schemas, taxonomies, ontologies, semantic networks, formal models, thesauri, topic maps, peer-to-peer recommenders. These types of information resources may also have functions (1) and (2) applied to them, e.g., where concrete abstractions, or nodes serve as entities. The information resource manager 304 may be configured to perform read operations against information resources, as well as write operations.

The predicate manager 308 may be configured to perform disambiguation of terms, resolving a term to a concept, or resolving an unambiguous referent or token.

With regard to the survey niche manager 310, for each generation of the survey niche, the niche management may include a predicate set, one or more applied transformations, one or more partitions, one or more partitions selected by the user, one or more survey monitors, metadata relating to predicates, and metadata relating to monitors. The survey niche manager 310 additionally assumes responsibility for maintenance of the survey lattice, particularly the maximal satisfiable survey lattice elements and the minimal unsatisfiable survey lattice elements and lattice elements selected by the user.

When transformation manager 314 is utilizing a transformation scenario, it may accept and take into account transformation policy, hints, and bounds on the requested transformation, as well as a hard selector of the type(s) of transformation to apply. Transformation scenarios may specify the types of transformations to apply. When a user chooses to perform manual or semi-automated transformation, the transformation manager 314 can offer possible transformations, categorized by type or basis of transformation, e.g., generalization, specialization, recommender, analogical, numerical range adjustment, or random.

The surveyor 300 may also include a user manager 320, a persistence manager 322, and an integration manager 324. The user manager 320 may be configured for managing user information such as preferences, configuration data, and profiles. The persistence manager 322 may be configured for persisting information to non-volatile storage, e.g., a store 326 on behalf of other managers. The integration manager 324 may be configured for connecting the surveyor with external systems 328. The external systems 328 can then utilize the capabilities of the surveyor 300 without traversing UI 318 associated with the surveyor 300, and vice versa.

In one exemplary embodiment, the surveyor 300 may incorporate a topological scheme for information surveying. The topological theme incorporates specialized macro components and modules. The partition manager 312 is replaced or enhanced by a survey lattice manager 330 that is responsible for generating or retrieving a survey lattice. This includes generating the maximal satisfiable survey lattice elements, the minimal unsatisfiable survey lattice elements, as well as non-maximal satisfiable survey lattice elements when these are requested. To perform this function, the survey lattice manager 330 may be able to acquire a set of unique entity identifiers, such as primary keys, GUIDs, URLs, URNs, URIs, OIDs, etc., for all of the appropriate entities, from one or more information resources. These unique identifiers may be unique surrogates; they need not be the unique identifiers of the source information resource.

In some embodiments, the transformation manager 314 may be more closely coupled with the partition manager 312 (with the survey lattice manager 330 in the case of topological theme survey methods), as the partition manager 312 (survey lattice manager 330) may need to try out a transformed predicate set, in whole or in part, to determine if the resulting repartitioning (reformed survey lattice), based on the trial transformation, meets transformation requirements, e.g., the resultant trial repartitioning achieves suitable differentiation and characterization, or in the case of a topological theme survey, the transformed set of predicates is not a maximal satisfiable survey lattice element, or the number of maximal satisfiable survey lattice elements falls between supplied lower and upper bounds, or similarly for the number of minimal unsatisfiable survey lattice elements.

Operation of the Apparatus in Conducting an Information Survey

We now discuss the operation of the exemplary apparatus in conducting an information survey. For this purpose we will specifically address conductance of the general survey method and simply note where conductance of a survey method employing a survey lattice would differ. This operation description is provided for illustrative purposes only: changes subtle and significant to what is described herewith can be made without functionally impacting its operation.

Session Initiation

A user initiates a session by a request to the pool of session managers 302. An available session manager 302 consumes the request and creates a session. This session manager 302, in turn requests services from the UI manager 316, in order to carry on a dialogue with the user. If a user manager 320 is present, which in this walk-thru example it is, then the session manager 302 requests services of it, in order to authenticate the user, obtain authorization for services the user has been approved for, and obtain user preferences and configuration information for this user, all by way of named user, user role, and/or user group. In this example walk-thru, a user profile is available, the user profile specifying an information resource and transformation means, policies, and sources, along with configuration information, for the current user. The user is authenticated and authorized.

The session manager 302 now delegates survey management tasks to the survey manager 306 for the duration of the session, but still intermediates interaction with the user. Interaction between managers may henceforth be conducted directly in a peer-to-peer fashion between managers; interactions may be coordinated through one or more session managers 302 acting as hubs, or a combination of these interaction architectures. For the remainder of this operation description we shall use the peer-to-peer form for simplicity of description.

Survey Initiation

The survey manager 306 now delegates specific aspects of survey configuration to various managers, as appropriate to their function to, for example, UI configuration to the UI manager 316, interaction with information resources to the pool of information resource managers 304, and similarly to the persistence manager 322 if needed, and the integration manager 324, if needed and available.

The survey manager 306 requests a UI 318 for survey initiation from the UI manager 316, which is communicated to the user. For illustrative purposes, the user begins a new survey by suitably interacting with the UI 318 and returning it. The survey manager 306 creates a new survey based on the configuration information from this user's profile.

Survey Niche Initialization

As part of initiating a new survey, the survey manager 306 initiates a first generation of the survey. The survey manager 306 delegates this task to the survey niche manager 310, which requests that the UI manager 316 create a UI 318 for survey niche initialization, which is communicated to the user. The user then receives the UI 318 for survey niche initialization. The user enters a number of predicates to initialize the niche. This information is returned and forwarded to the survey manager 306 and passed by the survey manager 306 to the survey niche manager 310.

The survey niche manager 310 may now disambiguate and verify the predicates in the initialized niche, and requests services of the predicate manager 308 to do this. The survey niche manager 310 also evaluates the initialized survey niche for well-formedness. If it is not well-formed then the survey manager 306, with the services of the predicate manager 308, the survey niche manager 310, and the UI manager 316, enters into a dialogue with the user until the initialized survey niche is well formed. Throughout this process, the information resource managers 304 are used to support the achievement of a well-formed survey niche. In this example walk-thru the survey niche is unambiguous and well-formed as entered, so the survey manager 306 proceeds.

Survey Niche Transformation and Partitioning

Having obtained a well-formed survey niche, the survey niche manager 310 now requests the services of the transformation manager 314, which conducts an automatic transformation of the survey niche and returns the transformed survey niche to the survey niche manager 310.

The survey niche manager 310 now requests services of the partition manager 312 (the survey lattice manager 330 for survey methods using such). The partition manager 312 now forms characterized partitions of the entities residing in the transformed survey niche, utilizing the services of the information resource managers 304 and predicate manager 308 as needed. The resulting characterized partitions are returned to the survey niche manager 310, which requests that the survey manager 306 return these to the user. The survey manager 306 now requests the services of the UI manager 316 to create a UI 318 with which to view and manipulate the characterized partitions. The session manager 302 then returns this UI 318 to the user. In this example walk-thru, the user selects two characterized partitions and requests a second generation of the survey.

Second Survey Generation

The user request is accepted by the session manager 302, and passed to the survey manager 306, which creates a second generation of the survey, and requests the survey niche manager 310 to form a new survey niche based on the characterized partitions selected by the user.

The survey niche manager 310 forms this new survey niche, and once again requests the services of the transformation manager 314, which transforms the new survey niche and returns the transformed new survey niche to the survey niche manager 310. Once again, the survey niche manager 310 requests services of the partition manager 312 (the survey lattice manager 330 for survey methods using such), this time to partition the transformed new survey niche. The characterized partitions of the transformed new survey niche are, like the first generation partitions, returned to the user via a UI 318 created by the UI manager 316.

In this example walk-thru, the user now selects one of the partitions and requests to see the entities of that partition. The session manager 302 delegates this task to the survey manager 306, which in turn is delegated to the survey niche manager 310, who then uses the services of the partition manager 312 and the information resource managers 304 to retrieve and/or infer the entities. The session manager 302 then returns said entities to the user via a UI 318 created by the UI manager 316. The user names and saves the survey and ends the survey. The session manager 302 passes this on to the survey manager 306, which utilizes the services of the persistence manager 322 to persist this named multi-generation survey. The session manager then performs clean-up duties, delegating these as appropriate to the other managers, and returning session resources to the session manager pool.

User Interface

A user interface, according to various exemplary embodiment of the present invention, enabling a user to survey an information resource can be built with various user interface structures, algorithms, processes, and presentation facilities to initialize, transform, form, present, modify, analyze and evaluate, select, and reform the survey niche, survey predicates, survey monitors, partitions, and entities. Methods include but are not limited to any or all of the following, singularly or in combination: tables, tabs, windows, lists, multi-shading and multi-color, direct manipulation, animation, 3D interface, dynamic query, fisheye lenses, tree maps, cone trees, Infocrystals, Perspective walls, hyperbolic visualizations, and Dendograms. The interface can be a thin client as in a browser or a fat client as in a Java application.

In its core implementation, the interface may accomplish certain tasks related to initializing and transforming a survey niche and forming and presenting its characterized partitions, in whole or in part, to the user.

In its basic implementation, the interface may additionally allow the user to directly modify a survey niche, to select partitions, and to initialize a new survey niche based on the selected partitions with subsequent reformation of characterized partitions.

Extended interface capabilities additionally include enabling the user to manage and persist the survey, to manage the survey niche including survey monitors and survey niche metadata, and to manage transformation of the survey niche.

The enhanced interface can be added to the basic or extended capabilities to enable interaction with the survey for purposes of assessing trade-offs between partitions including comparing and contrasting partitions, to view and interact with the entities in the partitions, to select entities in addition to partitions, and to initialize a new survey niche based on the selected partitions and/or entities with subsequent reformation of characterized partitions.

We will discuss an exemplary embodiment of the core interface and illustrate exemplary implementations of the basic interface, the extended interface, and the enhanced interface and survey tables. We then show an implementation of an interface modified for the topological theme survey, and finally illustrate an exemplary use case and user interface for the sports car survey example.

The drawings are samples of a user's display during a survey using the survey apparatus. The drawings are merely exemplary and provided solely for explanatory purposes. Therefore the layout of various keys, buttons, and icons is exemplary, but immaterial.

The Core Interface

The core interface provides an exemplary implementation of the basic survey method without the optional iteration. The core interface requires a means such as a field for inputting predicates, a mechanism such as a button to initiate the survey, and a technique to return the partitions to the user. In one exemplary implementation, this would be sufficient; a survey complete with its survey niche and partitions has been initialized, formed, and presented to the user. In the guise of a services interface, this interface is also sufficient for machine-to-machine survey interfaces.

The Basic Interface

Figure 20:
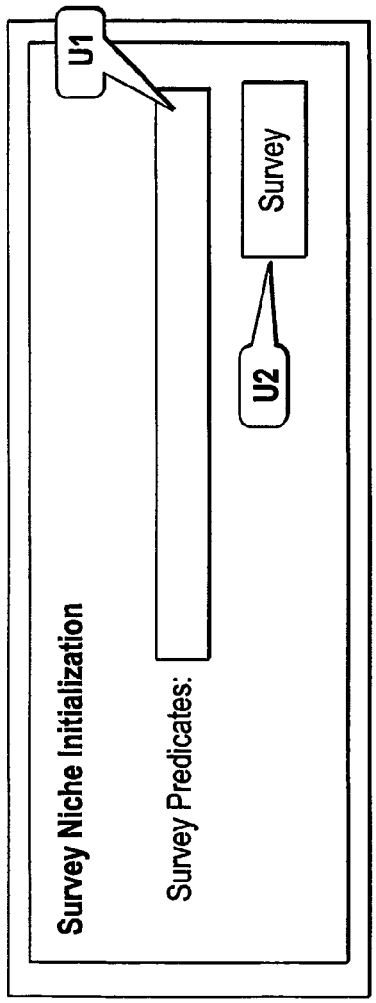
FIG. 20 is a diagrammatic representation of a basic user interface for initialization, according to one embodiment of the present invention.
Figure 21:
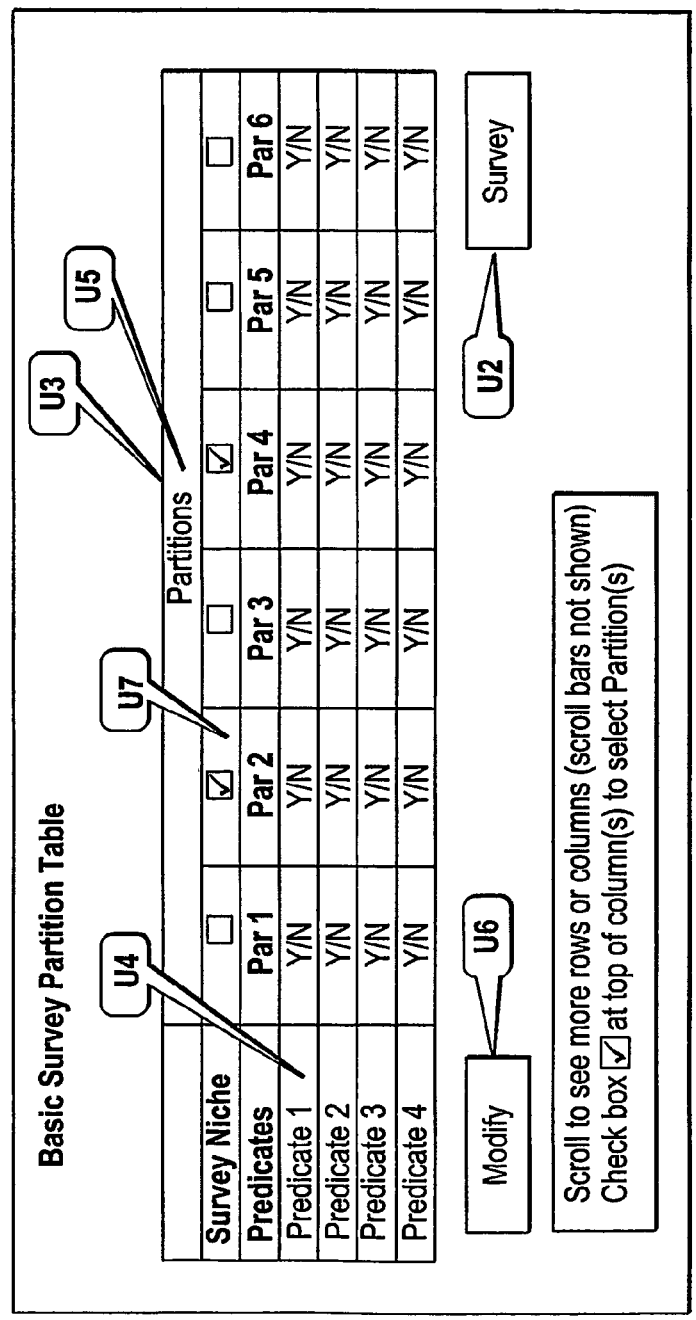
FIG. 21 is a diagrammatic representation of a user interface for a survey partition table, according to one embodiment of the present invention.

The basic interface provides an exemplar implementation of the general survey method and is shown in FIGS. 20-21. It provides an interface mechanism to initialize and modify the survey niche enabling the user to enter, modify, or delete predicates of any type. In the basic example shown in FIG. 20 the user may enter predicates for the Survey Niche into field U1.

An interface mechanism is needed to initiate transformation of the survey niche. In the basic example, in FIG. 21 the "Survey" button U2 is used to initiate transformation of the survey niche; and to automatically retrieve, form, and present the characterized partitions to the user.

The example presentation is via a tabular UI which could be embodied as viewing relational tables, object tables, HIML or XML tables, or even an interactive spreadsheet, with cells displaying values, abstractions, logical binary (e.g., Y/N), or even color coding. In FIG. 21 a basic survey partition table, U3, is presented wherein the first column shows the survey niche, rows represent the survey niche predicates, U4, and columns represent characterized partitions, U5. This table could also be transposed such that columns represent predicates and rows represent characterized partitions. This presentation enables the user to compare and contrast the partitions in order to assess trade-offs between them.

In order to continue to develop a survey it is required that the user be able to initiate the reformation of the survey niche and partitions. This is accomplished by several mechanisms, three of which are represented in FIG. 21. The user can use the "Modify" button U6 to return to the initialization screen and manually add, change, or delete the predicates in the survey niche. The user can use the "Survey" button U2 to automatically transform the survey niche and present the reformed partitions. This can be done multiple times. Most importantly, if the user first selects one or more partitions via check boxes, U7, and then uses the "Survey" button U2, the survey niche and its partitions will be reformed based on the selected partitions, in this case partitions 2 and 4.

The Enhanced Interface

The enhanced interface is an exemplar interface of the general survey method, as shown in FIG. 22 that provides enhanced survey tables that include survey monitors and an additional survey table to present the entities of selected partition(s).

The survey tables can present much more information and interaction than the minimalism presented by table U3 in FIG. 21. Alternatives include a survey spreadsheet wherein a survey table can be embedded into an interactive spreadsheet, interactive survey tables wherein a user can interact directly with the table to modify the survey niche, to select partitions and/or entities, to reorder the predicates or partitions, etc.

The enhanced survey tables may be utilized to support user interaction for purposes of assessment of trade-offs between partitions, including comparing and contrasting partitions: using drag and drop, rules (e.g. alphabetical or by number of predicates satisfied), and/or other user interaction methods for ordering/sorting predicates, monitors, partitions and/or entities. The enhanced survey tables can present survey monitors along with predicates as in FIG. 22 section U20. Some survey monitors are always present, such as the "# of Entities in Partition" monitor.

An additional survey table is provided to display the entities that are found within selected partitions. In FIG. 22, table U21 illustrates presentation of entities. Note that in this case, the table can display Y/N to indicate a predicate or can display the actual value. The survey monitors always present their actual values here including a hyperlink U22, or a query to an entity's source. Further presentation of entities can lead to display of the schema and/or data values for the entity—as available from the information resource.

The user can also select partitions and/or entities on which to form a new survey niche and further transformations. In FIG. 22, U7 and U8 partitions #2 and entities #1 and #5 are shown as selected. If the user now uses "Survey" button U2, the survey will be reformed based on partition #2, entities #1 and #5.

The Extended Interface

Figure 23:
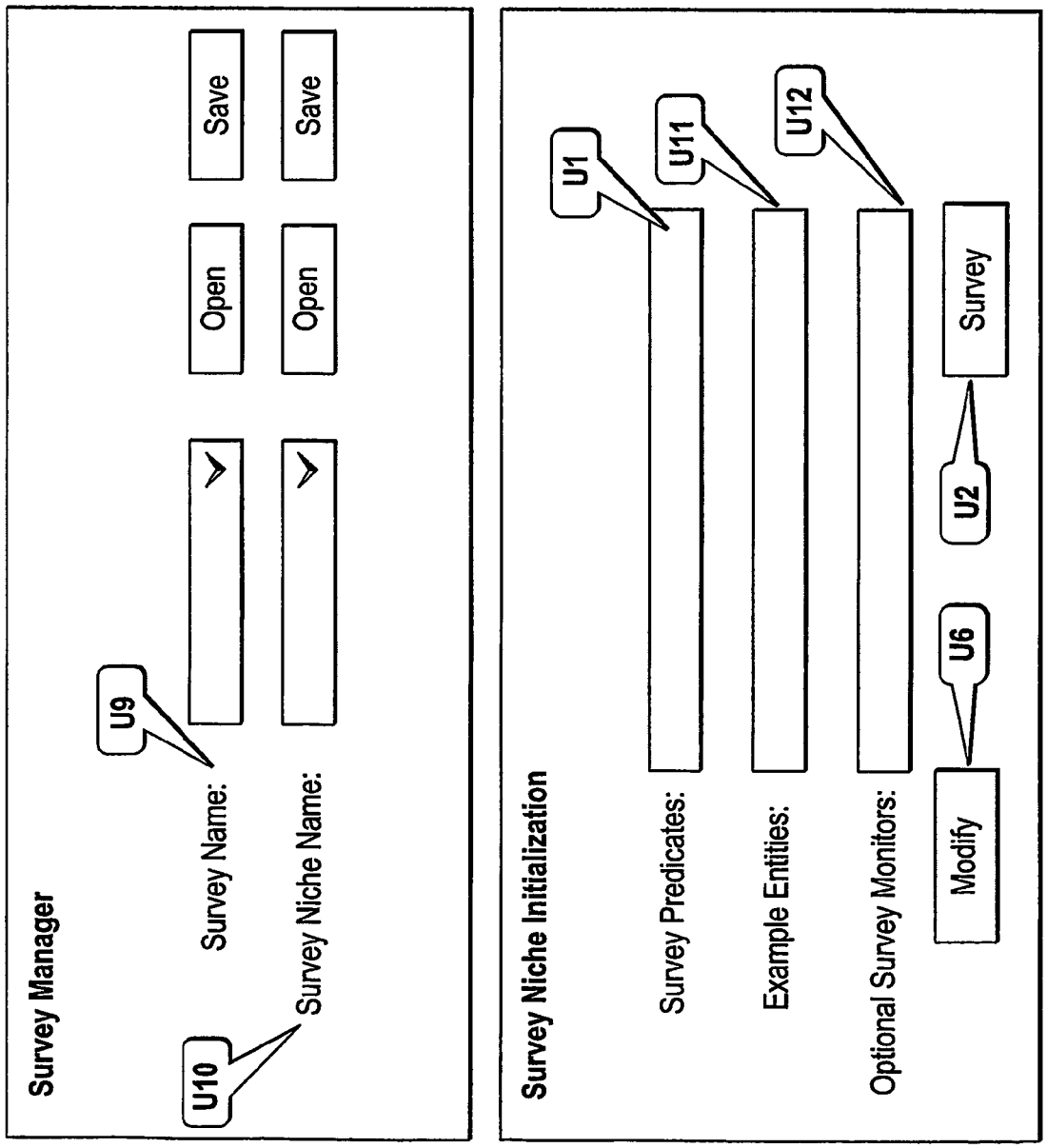
FIG. 23 is a diagrammatic representation of a survey manager and survey niche initialization, according to one embodiment of the present invention.

The extended interface shows an exemplary interface, as in FIGS. 23-24, which goes beyond the general survey method, adding user controls such as the Survey Manager, extended Survey Niche Initialization, the Survey Niche Manager, and Survey Monitors.

In the extended interface, the user is able to manage and persist the survey and its various survey niches. This can be accomplished with standard menu options or, as in the Survey Manager shown in FIG. 23, by using the drop-down list U9, to open, name, and save a survey with all it's iterations and associated survey niches, with or without data by selecting options in the save dialog box (not shown). It is also possible to similarly open, name, and save a single survey niche, with or without data, as with the drop-down list U10. Not shown but included in a full user interface, the user can always return to the Manage Survey panel at anytime. Also not shown, there can be panels by which to manage a survey's properties and to manage the transformation of the survey niche including transformation and evaluation policies defined by a variety of means such as guidelines, hints, and boundary settings.

In the extended Survey Niche Initialization screen in FIG. 23, the user can use the "Example Entities" field U11 to provide entities having desirable features, from which the niche manager will derive predicates. This provides an alternative method of providing the predicates to the system.

The "Optional Survey Monitors" field U12, enables users to add, modify, or delete optional survey monitors. Survey monitors are used to provide additional information to the user but are not technically part of the survey niche (monitors do not act as constraints). Since not all entities of a partition will have the same values for survey monitors, they are reported to the user via statistics (e.g., mean, median, mode, standard deviation) or abstraction (e.g., semantic generalization) when presented for a partition, and via their values when presented for entities. Survey monitors can also be determined and inserted by the transformation manager, not only by the user. Some survey monitors are always included, for instance—a count of the number of entities in any partition.

The Survey Niche Manager provides the user with a variety of mechanisms by which to modify or control the transformation of the survey niche. In the extended interface, the "Modify" button U6 takes the user to the Survey Niche Manager as in FIG. 24 rather than back to the initialization screen. The "Undo" button U13 can be used to back out of transformations and modifications.

The Survey Niche Manager provides metadata about the predicates or monitors as in section U15. In this example the Survey Niche Manager identifies predicates and monitors by source, i.e., the user or the transformation manager. It also shows the state of the metadata fields such as the "Mandatory field", which can be toggled by selecting the predicate or monitor and pressing button U18. Similarly there could be fields to indicate a predicate should be ignored, that a predicate should "Not" be satisfied (i.e., the negation of the predicate should be satisfied), etc. The metadata can be supplied by the system and/or extended by the user.

Several additional buttons are also available, each modifying a selected predicate or monitor. Button U16, "View Ontology", allows the user to view the ontology on which the transformation was based and possibly provides a mechanism such as a list, tree, taxonomy or ontology browser, etc . . . from which to browse, add, and remove predicates and/or survey monitors. Predicates and monitors can also be added by typing them into an appropriate cell and they can be removed by deleting them from their cells. Button U19 is a toggle that allows the user to "Bind" together multiple selected predicates (but not monitors) into an explicit neologism or "Unbind" those previously bound. This composition of predicates is then treated and presented as a single predicate, not shown in the drawing.

The "Transform this" button U17 can be used to initiate automatic transformation of the entire survey niche or selected predicates or monitors, while remaining in the Survey Niche Manager. When the survey niche is modified or transformed in any of these ways, the changes are immediately apparent in the Survey Niche Manager.

When the user has finished their modifications they can use the "OK" button U14 to complete the survey without further transformation. Alternatively they can use the "Survey" button U2 to automatically transform the survey niche again. In either case the partitions will be reformed and presented in a survey table. This could be a basic survey table, as in FIGS. 21, table U3 or could be enhanced survey tables as in FIG. 22.

Survey Lattice Tables

The topological survey theme provides unique interface elements, illustrated in FIG. 25. An exemplar interface mechanism for presentation and interaction with the survey lattice elements, table U23 presents partitions defined as minimal unsatisfiable survey lattice elements. This unique feature shows the user the predicates that are not available together and that won't become available by any transformation or modification of the survey niche. In this example we show the value of the predicate if it is an unsatisfiable element and leave the cell blank otherwise. Table U24 presents the dominant partitions, i.e. maximal satisfiable survey lattice elements. This invention minimizes the redundancy and irrelevancy of many partitions and displays only those that the user needs to know about in order to be fully informed. All other interface mechanisms remain the same. For instance, the $1^{st}$ partition, Max1, is selected so its entities are displayed.

Use Case Example

Figure 26:
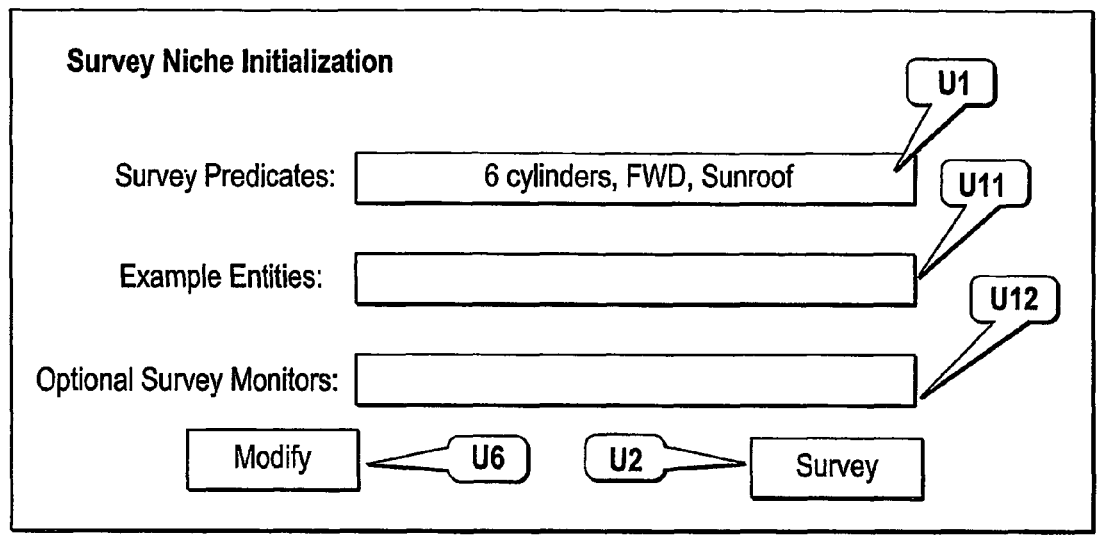
FIG. 26 is a diagrammatic representation of a sports car example initialization, according to one embodiment of the present invention.

The use case utilizes the sports car survey lattice example and is shown in FIGS. 26-27. In FIG. 26 the user has initialized the survey by entering "6 cylinders, front wheel drive, sunroof" into field U1. The user then uses the "Survey" button U2 to transform the survey niche and form the survey lattice. The transformed survey niche is not presented to the user but now contains 6 cylinders, 8 cylinders, FWD, RWD, and Sunroof. The survey lattice and its various tables are presented in FIG. 27.

Table U25 presents those sets of predicates that cannot be met, the minimal unsatisfiable survey lattice elements. This informs the user that you cannot get a car with both 6 cylinders and 8 cylinders, that you cannot get a car with both FWD and RWD. Most importantly, Min3 shows that you cannot get a car with both 8 cylinders and FWD, informing the user that the presence or absence of the sunroof in the survey will not make a difference relative to other traits.

Table U26 presents the maximal satisfiable survey lattice elements. These partitions inform the user about what is available, based on the survey niche. The table also includes a default survey monitor showing the number of entities in each partition. In this case the Max1 partition includes 2 cars with 6 cylinders, FWD, and a sunroof. The Max2 partition has 2 cars with 6 cylinders, RWD, and sunroof, and the Max3 partition has 3 cars, each with 8 cylinders, RWD, and a sunroof. The user compares and contrasts the trade-offs presented and decides that they would rather have the power of 8 cylinders than FWD. When they select Max3, using the checkbox at the top of the column, they are shown table U27 that presents the 3 entities belonging to Max3 as well as links to the resource directly. Even though the user has not added any survey monitors, the system has entered default monitors for the name and primary key. The user learns that the Aston Martin, Jaguar, and the Lexus are in partition Max3.

If there were 30 or 300 or 3 million entities that belonged to Max3, the user would press the "Survey" button again, causing the survey niche to be reformed based on the selected partition, in this case, Max3. They would be presented with a new set of survey lattice tables. This process may be continued indefinitely.

Applications

Information surveying, surveys, and survey lattices can be applied to virtually all endeavors that rely on information.

Information survey applications can be targeted to areas that require fast, efficient, and thorough analysis of large volumes of data such as homeland security, defense and national intelligence, and counter-terrorism.

Bioinformatics is a prime candidate, including genomics and gene expression data, proteomics, as well as information related to the transcriptome, metabolome, and higher order structures and processes.

Matchmaking systems such as real estate, dating, and job recruitment are naturally suited to information surveys. Content classification systems and taxonomies are better accessed via information surveys than through walking their trees. Information survey applications can enhance search, portal, and business intelligence systems.

Sales automation and e-commerce in all its variants, including comparison-shopping, guided sales, configuration, specification, customization, and aggregation, can be implemented as information surveys.

Efficient network usage makes surveys especially well suited to mobile and location-based services.

Information surveys can also exploit the Semantic Web, Web services, and the Global Grid by enabling discovery and self-provisioning of web services and utility computing through usage of standards such as the Global Grid's OGSA, the Semantic Web's RDF(S), OWL, and DAML+OIL, and Web Services' UDDI and WSDL.

Figure 28:
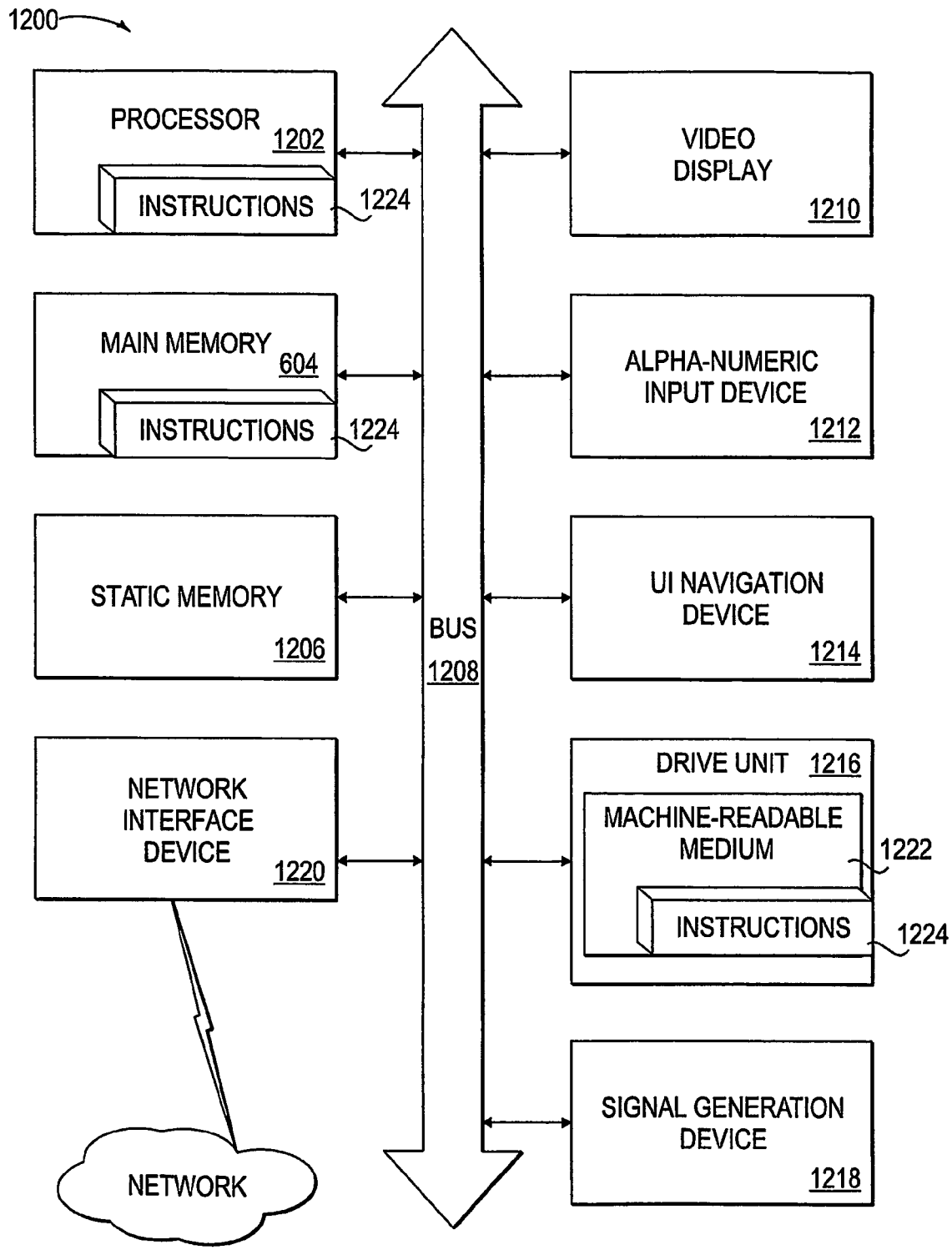
FIG. 28 is a diagrammatic representation of a machine in the exemplary form of a computing system within which a set of instructions, for causing the machine to perform any one of the methodologies discussed herein, may be executed.

FIG. 28 shows a diagrammatic representation of machine in the exemplary form of a computing system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computing system 1200 includes a processor 1202 (e.g., a central processing unit (CPU) a graphics processing unit (GPU) or both), a main memory 604 and a static memory 1206, which communicate with each other via a bus 1208. The computing system 1200 may further include a video display unit 1210 (e.g., a liquid crystal display (LCD) or a cathode ray tube (CRT)). The computing system 1200 also includes an alpha-numeric input device 1212 (e.g., a keyboard), a UI navigation device 1214 (e.g., a mouse), a disk drive unit 1216, a signal generation device 1218 (e.g., a speaker) and a network interface device 1220.

The disk drive unit 1216 includes a machine-readable medium 1222 on which is stored one or more sets of instructions 1224 (e.g., software) embodying any one or more of the methodologies, structures or functions described herein. The software may also reside, completely or at least partially, within the main memory and/or within the processor during execution thereof by the computing system, the main memory 604 and the processor 1202 also constituting machine-readable media.

The software may further be transmitted or received over a network via the network interface device 1220.

While the machine-readable medium 1222 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical and magnetic media, and carrier wave signals.

Thus, a method and system for surveying information have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

Appendix I
Information Resource

An information resource may be any single or plurality of systems capable of meeting a request for information from a user. Information resources include but are not limited to: accounting systems and financial information, agents and agent systems, architecture description information; artificial neural networks; aspect libraries and collections (as in aspect-oriented systems); biomolecular computing systems and bioinformatics systems; business process management (BPM) information; case bases (as in case-based reasoning); catalogs; categorization systems; classification hierarchies; client-tier programs; code libraries; compilers; computational grids and data grids; computer aided design (CAD) information; computer aided engineering (CAE) information; computer aided manufacturing (CAM) information; computer networks; computing fabrics; conceptual graphs; configurators; connectionistic networks; constraint bases; content management systems (CMS) information; customer relations management (CRM) information; web ontology language (OWL), DARPA agent mark-up language (DAML), & DARPA agent mark-up language plus ontology inference language (DAML+OIL); data marts; data warehouses; databases and database management systems; dictionaries; directories; distributed information; document and content repositories; encyclopedias; enterprise resource planning (ERP) information; evolutionary computing including but not limited to genetic algorithms, Alife systems, and evolutionary programs and strategies; extranets; file systems; formal models and collections, including but not limited to those expressed in Unified Modeling Language (UML), Meta Object Facility (MOF), and Specification Description Language (SDL); frame systems; genetic and proteomic repositories including but not limited to reads, contigs, sequences, expression profiles, and molecular topologies; geographic information systems (GIS); geometric information repositories; indexes and inverted indexes; information retrieval systems; interface repositories; internet; interpreters; intranets; libraries; link bases and collections; log files, memory and cache management systems; memory-based reasoning systems; meta-search results; model driven architecture (MDA) information; nanotechnology information; network device, hardware, and software-based information repositories including but not limited to management information bases (MIB), common information models (CIM), managed object format (MOF) information, and web based enterprise management (WBEM) information; non-classical logic systems, including but not limited to non-monotonic reasoning with exceptions and quantum logics; ontologies; peer-to-peer information including but not limited to JXTA; portals; product data management (PDM) information; project management information; quantum computing systems; registries; rule systems; schedules; schemas; search results; semantic networks; semantic web; servers; software component collections and repositories; specifications and specification repositories; taxonomies; thesauri; topic maps; universal description, discovery, and integration (UDDI) information and registries; web; weB Logs (BLOGS); web log usage files; web services collections and repositories; workflow information; and XML files and bases.

What is claimed is:

1. A method implemented by an information resource manager executed in a memory by a processor of a data processing system to conduct an information survey of an information resource that represents at least a single informational entity, the method comprising:

initializing, by a processor a survey niche having a set of at least one predicate, wherein the predicate represents at least one of a property, attribute, trait, characteristic, function, relation, relationship, measurement, constraint, semantic property, action, coding sequence, objective, goal, and criteria of an information survey problem;

transforming, by said processor, the survey niche by applying a first computable function to the initial set of predicates to produce a transformed set of predicates not identical to the initial set and not a proper subset of the initial set such that the transformed set is not satisfiable when evaluated against the information resource, wherein not satisfiable means that no entities of the information resource satisfy all predicates in the transformed set of predicates; and executing an algorithm, by said processor, to identify a characterized partition of the transformed survey niche where said partition is a survey lattice element wherein the survey lattice represents a partial order of subsets of the transformed set of predicates;

repeat executing an algorithm, by said processor, to generate the survey lattice element that is a satisfiable subset of the transformed set of predicates that results in at least one entity of the information resource that satisfies all predicates in subset, and identifying at least a portion of the characterized partition of the transformed survey niche the as an option to the information survey problem.

2. The method of claim 1, wherein the at least one survey lattice element is at least one of dominant and maximal in the survey lattice, such that adding any additional single predicate from the transformed set into the at least one satisfiable subset would cause the at least one satisfiable subset to become unsatisfiable against the information resource.

3. The method of claim 1, wherein results of the information survey are used to specify modification operations on the information resource surveyed.

4. The method of claim 1, further including enabling selection of at least one entity that satisfies all predicates of the survey lattice element.

5. The method of claim 1, wherein the first computable function applies an operator that is at least one of a crossover operator and a mutation operator.

6. The method of claim 5, wherein the operator is further selected from a group of operators including a random operator, a non-random operator, and a partly random operator.

7. The method of claim 1, wherein the first computable function applies one of a semantic operator and a conceptual structure.

8. The method of claim 1, further including associating a survey monitor with the survey niche, wherein the survey monitor represents a non-constraining predicate.

9. The method of claim 1, wherein algorithm includes at least one operation selected from a group of operations including forming maximal satisfiable elements of the survey lattice, forming non-maximal satisfiable elements of the survey lattice, forming minimal unsatisfiable elements of the survey lattice, and forming non-minimal unsatisfiable elements of the survey lattice.

10. The method of claim 1, wherein the first computable function applies at least one of a single transformation and a composite transformation.

11. The method of claim 1, wherein the first computable function applies at least one of a deterministic transformations, non-deterministic transformations, and a combination of partly deterministic and partly non-deterministic transformations.

12. The method of claim 1, wherein the first computable function is at least one of adding, deleting, negating, modifying, binding, and resolving predicates.

13. The method of claim 1, wherein the at least one predicate is at least one of single valued, set valued, range valued, and of a complex type.

14. The method of claim 7, wherein the semantic operator is one of a group of semantic transformation operators including generalization/specialization, mereological transformation, relationship transformation, data type transformation, and action transformation.

15. The method of claim 2, further including selecting the first computable function such that the number of survey lattice elements that are at least one of dominant and maximal are bounded by at least one of an upper bound and a lower bound.

16. The method of claim 2, further including selecting the first computable function such that the number of unsatisfiable survey lattice elements that are at least one of minimal and dominated are bounded by at least one of an upper bound and a lower bound.

17. The method of claim 1, further including transforming the set of predicates such that the transformed set of predicates at least partly matches a set of predicates for which survey lattice elements are already formed.

18. The method of claim 1, further including transforming the set of predicates in order to achieve transformation goals from a group including a specific or general contraction, a specific or general expansion, and a specific or general shifting of the survey niche.

19. The method of claim 1, further including selecting the first computable function to achieve differentiation of entities that satisfy subsets of the transformed set of predicates.

20. The method of claim 1, further including performing at least one operation on the survey lattice, in whole or in part, selected from the group of operations including representing the survey lattice, localizing the survey lattice, distributing the survey lattice, replicating the survey lattice, storing the survey lattice, retrieving the survey lattice, forming the survey lattice on-demand, using survey lattices singly or in plurality, indexing the survey lattice, presenting the survey lattice to the user, enabling the user to interact with the survey lattice, and enabling the user to communicate the survey lattice.

21. The method of claim 1, further including:
identifying one or more facts for the satisfiability of each predicate;
grouping the one or more facts by point of evidence to generate one or more groups of facts;
sorting the one or more groups of facts by a number of predicates satisfied;
rejecting duplicate groups of facts from the one or more groups of facts; and
using at least one of group dominance and group containment of the one or more groups of facts as a partial order of the lattice.

22. The method of claim 21 wherein to form a maximal satisfiable element of a survey lattice, the method further includes rejecting groups from the one or more groups of facts those that are at least one of contained and dominated.

23. The method of claim 21 wherein to form minimal unsatisfiable elements of a survey lattice, the method further includes:
identifying one or more negative facts for unsatisfiability of each predicate;
grouping the one or more negative facts by point of evidence to generate one or more groups of negative facts;
sorting, in ascending order, the one or more groups of negative facts by a number of negative facts in a respective group;
rejecting groups of negative facts that contain a same subset of the set of predicates;
rejecting groups of negative facts for which another group is a subset from the one or more groups of negative facts; and
rejecting groups of negative facts that are subsets of maximal satisfiable predicate lattice elements.

24. The method of claim 21, wherein the forming of the survey lattice, in whole or in part, includes performing at least one operation on a fact structure selected from a group of operations including generating, storing, applying, and maintaining fact structures.

25. The method of claim 24, wherein the fact structure includes at least one of a fact table and a fact index.

26. The method of claim 21, wherein the forming of the survey lattice, in whole or in part, includes performing at least one operation on a bitmap index selected from a group of operations including generating, storing, applying, and maintaining bitmap indexes.

27. The method of claim 1, further including:
putting predicates which are atoms of a survey lattice into a strict order, using a computing system; and
associating a survey lattice element with a predicate in the strict order using the computing system, where the associated survey lattice element contains the predicate.

28. The method of claim 1, further comprising augmenting an index by associating a survey lattice element with an index entry, wherein the survey lattice element contains the index entry.

29. The method of claim 1, further comprising augmenting a conceptual structure by associating a survey lattice element with a component of a conceptual structure, wherein the survey lattice element contains the component of the conceptual structure.

30. The method of claim 1, further comprising augmenting a category system by associating a survey lattice element with a category of a category system, wherein the survey lattice element contains the category of the category system.

31. The method of claim 1, further comprising augmenting a database system by associating a survey lattice element with an attribute of a database system, wherein the survey lattice element contains the attribute of the database system.

32. A computer-implemented system to conduct an information survey of an information resource, the system including:
a processor;
a memory coupled to the processor; and
an information resource manager executed in the memory by the processor to access the information resource and at least a single entity represented by the information resource,
a survey niche manager executed in the memory by the processor to consume an initial set of at least one predicate, wherein the predicate represents at least one of a property, attribute, trait, characteristic, function, relation, relationship, measurement, constraint, semantic property, action, coding sequence, objective, goal, and criteria of an information survey problem predicates a transformation manager executed in the memory by the processor to apply a first computable function to the initial set of predicates at least one predicate to produce a transformed set of predicates not identical to the initial set and not a proper subset of the initial set such that the transformed set is not satisfiable when evaluated against the information resource, wherein not satisfiable means that no entities of the information resource satisfy all predicates in the transformed set of predicates,
a survey lattice manager executed in the memory by the processor to execute an algorithm to identify a characterized partition of the transformed survey niche where said partition is a survey lattice element wherein the survey lattice represents a partial order of subsets of the transformed set of predicates;
a survey lattice manager executed repeatedly to generate the survey lattice element that is a satisfiable subset of the transformed set of predicates that results in at least one entity of the information resource that satisfies all predicates in subset, and to identify at least a portion of the characterized partition of the transformed survey niche as an option to the information survey problem.

33. The system of claim 32, wherein the system includes at least one manager selected from a group of managers including:
a survey manager to maintain survey configuration information and manage multiple survey generations;
a session manager to manage survey sessions and obtain services from other managers;
a predicate manager to manage terms, concepts, and predicates, and perform disambiguation;
a user manager to manage user information;
a persistence manager to store and retrieve information for other managers;
an integration manager to connect with external systems other than information resources; and
a user interface manager for creating and managing displays and handling user input.

34. The system of claim 32, wherein a survey lattice element augments an information structure where the information structure belongs to a group including an index, a conceptual structure, a database, and a category system.

35. The system of claim 32, further including a user interface subsystem for information surveying, the subsystem including::
a means for capturing user input to initialize a set of predicates;
and a displaying means for presenting at least one survey lattice element to the user.

36. The user interface subsystem of claim 35, wherein the interface includes a survey lattice table for presenting at least one survey lattice element.

37. The system of claim 32, further including a data structure, wherein survey lattice elements are based on a source from a group of sources including an index, a conceptual structure, a database, and a category system.

* * * * *